US008164721B2

(12) United States Patent
Tan et al.

(10) Patent No.: US 8,164,721 B2
(45) Date of Patent: Apr. 24, 2012

(54) GRATING TRIM RETARDERS

(76) Inventors: Kim L. Tan, Santa Rosa, CA (US);
Karen D. Hendrix, Santa Rosa, CA (US); Charles A. Hulse, Sebastopol, CA (US); Curtis R. Hruska, Windsor, CA (US)

( * ) Notice: Subject to any disclaimer, the term of this patent is extended or adjusted under 35 U.S.C. 154(b) by 1574 days.

(21) Appl. No.: 11/591,623

(22) Filed: Nov. 1, 2006

(65) Prior Publication Data

US 2007/0070276 A1 Mar. 29, 2007

Related U.S. Application Data

(63) Continuation-in-part of application No. 11/009,476, filed on Dec. 10, 2004, now Pat. No. 7,170,574.

(60) Provisional application No. 60/529,315, filed on Dec. 11, 2003, provisional application No. 60/587,924, filed on Jul. 14, 2004, provisional application No. 60/589,167, filed on Jul. 19, 2004, provisional application No. 60/586,542, filed on Jul. 9, 2004, provisional application No. 60/734,072, filed on Nov. 7, 2005, provisional application No. 60/821,313, filed on Aug. 3, 2006.

(51) Int. Cl.
*G02F 1/1335* (2006.01)

(52) U.S. Cl. .......................... 349/117; 349/118; 349/119

(58) Field of Classification Search ........... 349/117–121
See application file for complete search history.

(56) References Cited

U.S. PATENT DOCUMENTS

| | | | |
|---|---|---|---|
| 2,478,385 A | 8/1949 | Gaiser et al. | |
| 3,185,020 A | 5/1965 | Thelen et al. | |
| 3,463,574 A | 8/1969 | Bastien et al. | |
| 3,565,509 A | 2/1971 | Sulzbach | |
| 3,604,784 A | 9/1971 | Louderback et al. | |
| 3,781,090 A | 12/1973 | Sumita | |
| 3,799,653 A | 3/1974 | Ikeda | |
| 3,822,926 A | 7/1974 | Dalbera et al. | |
| 3,936,136 A | 2/1976 | Ikeda et al. | |
| 4,313,647 A | 2/1982 | Takazawa | |
| 4,666,250 A | 5/1987 | Southwell | |

(Continued)

FOREIGN PATENT DOCUMENTS

WO WO2005/101112 10/2005

OTHER PUBLICATIONS

"General Methodology for LcoS Panel Compensation", Chen et al, SID 04 Digest, pp. 990-993.

(Continued)

*Primary Examiner* — David Nelms
*Assistant Examiner* — David Chung
(74) *Attorney, Agent, or Firm* — Matthew A. Pequignot; Pequignot + Myers LLC

(57) ABSTRACT

A grating trim retarder fabricated from a form-birefringent multi-layer dielectric stack including at least one anti-reflection coating and supported on a transparent substrate is provided. The form-birefringent dielectric stack includes an axially-inhomogeneous element in the form of a –C-plate grating and a transversely-inhomogeneous element in the form of an A-plate grating. Each of the –C-plate and the A-plate gratings are fabricated with dimensions to form a zeroth order sub-wavelength grating structure. Fabricating the grating trim retarder with anti-reflection coatings and/or a segment where the –C-plate and A-plate grating overlap enables the in-plane and out-of-plane retardances to be tailored independently according to the desired application.

46 Claims, 41 Drawing Sheets

U.S. PATENT DOCUMENTS

| | | | |
|---|---|---|---|
| 5,196,953 | A | 3/1993 | Yeh et al. |
| 5,278,680 | A | 1/1994 | Karasawa et al. |
| 6,532,111 | B2 | 3/2003 | Kurtz et al. |
| 6,585,378 | B2 | 7/2003 | Kurtz et al. |
| 6,590,707 | B1 | 7/2003 | Weber .......................... 359/498 |
| 6,857,747 | B2 | 2/2005 | Pentico et al. |
| 7,079,209 | B2 | 7/2006 | Nakagawa ................... 349/119 |
| 7,203,001 | B2 | 4/2007 | Deng |
| 2002/0047968 | A1 | 4/2002 | Yoshida et al. |
| 2003/0128320 | A1 | 7/2003 | Mi et al. |
| 2004/0218270 | A1 | 11/2004 | Wang et al. |
| 2005/0045799 | A1 | 3/2005 | Deng et al. |
| 2005/0128391 | A1 | 6/2005 | Tan et al. |
| 2006/0001969 | A1 | 1/2006 | Wang et al. |
| 2006/0127830 | A1 | 6/2006 | Deng et al. |
| 2007/0139771 | A1 | 6/2007 | Wang et al. |
| 2007/0165308 | A1 | 7/2007 | Wang et al. |

OTHER PUBLICATIONS

"Achromatic phase retarder by slanted illumination of a dielectric grating with period comparable with the wavelength", Bokor et al, Applied Optics, vol. 40, No. 13, May 1, 2001; pp. 2076-2080.

"Mechanism of shape formation of three-dimensional periodic nanostructures by bias sputtering", Kawakami et al, Applied Physics Ltrs, vol. 74, No. 8, Jan. 18, 1999, pp. 463-465.

"Photonic crystals for the visible range fabricated by autocloning technique and their application", Sato et al, Optical and Quantum Electronics 34: pp. 63-70.

"Design and Characterization of a compensator for high contrast LcoS projection systems", Tan et al, SID 05 Digest, pp. 1-4.

Tan et al, "Design and Characterization of a Compensator for High Contrast LcoS Projection Systems", 2005 SID International Symposium Digest of Technical Papers, Boston MA, May 24-27, 2005, SID International Symposium Digest of Technical Papers, San Jose, CA, SID, US, vol. Book II, vol. 36, May 24-27, 2005, pp. 1810-1815.

Chen et al, "General methodology for LcoS Panel Compensation", Journal of Society for Information Display (SID), vol. 12, No. 4, 2004, pp. 423-428.

Tyan R-C et al, "Polarizing Beam Splitter based on the Anisotropic Spectral Reflectivity Characteristic of Form-Birefringent Multilayer Gratings", Optics Ltrs, OSA, Optical Society of America, Washington, DC, Vo. 21, No. 10, May 15, 2006, pp. 761-763.

Joubert et al, TN-LCD Compensation Film with Holographic Form Birefrigence Proceedings of 18th International Display Research Conf., Asia Display 98, Seoul, Sep. 28-Oct. 1, 1998, International Display Research Conf. IDRC, San Jose, CA: SID, US, Voln. CONf. 18, Oct. 28, 1998, pp. 1119-1122.

Robbie et al, "Ultrahigh Vacuum Glancing Angle Deposition System for Thin Films with Controlled Three-Dimensional Nanoscale Structure", Rev. Sci. Instrum. 75(4), pp. 1089-1097, 2004.

Pentico et al, "Ultra High Contrast Color Management System for Projection Displays", SID 03 Digest, pp. 130-133, 2003.

Anderson et al, "Off-Axis LcoS Compensation for Enhanced Contrast", SID 03 Digest, pp. 1433-1435, 2003.

Haggans et al, "Effective Medium Theory of Zeroth Order Lamellar Gratings in Conical Mountings", J. Opt. Soc. AM. A, 10, pp. 2217-2225, 1993.

S-T. Wu, J. Appl. Phys., 76 (10), pp. 5975-5980, 1994.

Hong et al, "Precision Compensation for Polarization Anisotropies in Metal Reflectors", Opt. Eng. 43(6) pp. 1276-1277, 2004.

Berreman, "Optics in Stratified and Anisotropic Media: 4×4 Matrix Formulation", J. Opt. Soc. Am. 62, pp. 502-510, 1972.

Eblen et al, SID'94 Digest, p. 245, 1994.

Rytov, "Electromagnetic Properties of Finely Stratified Medium", Soviet Physics JETP, 2, p. 461, 1956.

Gu et al, "Form Birefringence Dispersion in Periodic Layered Media", Optics Letters, vol. 21, No. 7, 1996, pp. 504.

Tan et al, "Dynamic holography for optical interconnections. II. Routing Holograms with predictable location and intensity of each diffraction order", J. Opt. Soc. Am. A, 18(1), pp. 205-215, 2001.

Karen Hendrix et al., "Birefringent Films for Contrast Enhancement of Liquid Crystal on Silicon Projection Systems", Journal of Vacuum Science and Technology A. Vacuum, Surfaces and Films, American Institute of Physics, New York, NY, vol. 24, No. 4, Jun. 23, 2006, pp. 1546-1551.

Marcus Duelli et al., "P-155: High Performance Contrast Enhancing Films for VAN-Mode LCoS Panels", , 2005 SID International Symposium Digest of Technical Papers, Boston, MA, May 24-27, 2005, pp. 892-895.

J. Chen, et al., "Impact of the Orientation of Panel Pretilt Directional and Quarter-wave Plate on LCoS Projection System Contrast", SID 2006 SID International Symposium, Society for Information Display, LO, vol. XXXVII, Jun. 4, 2006, pp. 1606-1609.

GRATING TRIM RETARDERS

CROSS-REFERENCE TO RELATED APPLICATIONS

This application is a continuation-in-part of U.S. application Ser. No. 11/009,476 filed on Dec. 10, 2004 now U.S. Pat. No. 7,170,574 and which claims priority from U.S. patent application Ser. Nos. 60/529,315 filed Dec. 11, 2003; 60/587,924 filed Jul. 14, 2004; 60/589,167 filed Jul. 19, 2004, and 60/586,542 filed Jul. 9, 2004, all of which are hereby incorporated by reference. This application claims priority from U.S. Provisional Application Nos. 60/734,072 filed Nov. 7, 2005, 60/821,313 filed Aug. 3, 2006, all of which are hereby incorporated by reference.

MICROFICHE APPENDIX

Not Applicable.

TECHNICAL FIELD

The present application relates generally to optical retarders, and in particular, to grating trim retarders and/or liquid crystal display based micro-display projection systems including the same.

BACKGROUND OF THE INVENTION

Liquid-crystal displays (LCDs) are widely used in projection displays for large screen televisions and monitors. In these LCD-based projection systems, a high power beam of light is passed through a polarizer before being incident on a LCD panel. The LCD panel controls the polarization of the incident light pixel-by-pixel and redirects it towards the corresponding polarizer/analyzer, which then redirects light having the proper polarization to a projection lens that projects an image onto a screen.

One particularly successful LCD-based projection system is a WGP-based LCoS microdisplay system, which uses both wire grid polarizers (WGPs) and liquid crystal on silicon (LCoS) panels. This microdisplay system, which has been proven to exhibit both high resolution and high image contrast when compared to other microdisplay technologies such as transmissive liquid crystal (xLCD), digital light processor (DLP), and direct-view LCD, typically uses three or more microdisplay panels (e.g., one for each primary color band) to improve on-screen brightness.

Referring to FIG. 1, a conventional 3-panel WGP-based LCoS microdisplay system is shown. The microdisplay system includes a light source 5, which for example is a high-pressure discharge lamp, and a light rod 7. The light rod 7 homogenizes the cone of light produced by the light source 5 to ensure a spatially uniform light distribution. Optionally, the light rod 7 is a polarization conversion light pipe (PCLP) for producing linearly polarized light. A first lens 8a passes the light from the light pipe 7 to a first folding mirror 9, which directs the light to a first dichroic filter 10. The dichroic filter 10 separates out the blue light from the remaining light, and directs the blue light via second 8b and third 8c lenses, and second 17 and third 16 folding mirrors to a first LCoS display panel 20a. The remaining light, which is transmitted through the dichroic filter 10, is directed via fourth and fifth lenses 8d and 8e and a fourth folding mirror 11 to a second dichroic filter 12. The second dichroic filter 12 separates the remaining light into green and red light, the former of which is directed to a second LCoS display panel 20b and the latter of which passes to a third LCoS display panel 20c.

Prior to reaching each LCoS display panel 20a, 20b, and 20c, the incident light first passes through a WGP 15, 14, and 13 and a trim retarder compensator 21a, 21b, and 21c, respectively. Each WGP 15, 14, and 13 is a polarizer/analyzer formed from a plurality of parallel micro-wires that transmits light having a polarization orthogonal to the direction of the parallel micro-wires and reflects light having a polarization parallel to the direction of the wires (e.g., if the polarizers are designed to pass horizontal or P-polarized light, as illustrated in FIG. 1, the micro-wires will be perpendicular to the plane of FIG. 1). Each LCoS panel 20a, 20b, and 20c alters the polarization of the linearly polarized incident light pixel-by-pixel and reflects the modulated light back to the corresponding WGP 15, 14, and 13. Since each WGP 15, 14, and 13 is orientated at approximately ±45° with respect to the principal direction of light propagation, in addition to serving as a polarizer/analyzer, each WGP 15, 13 and 14 also serves as a beamsplitter for separating the incoming light from the outgoing light by steering or deflecting the light reflected from the each LCoS panel along an output optical path orthogonal to the incoming optical path. More specifically, each WGP 15, 14, and 13 reflects S-polarized light (e.g., polarized light rotated by 90° by pixels in an ON state) to the X-cube 19. The X-cube 19 aggregates (i.e., converges) the image from each of the three color channels and, via the projection lens 18, projects the final image onto a large screen (not shown). Optionally, each color channel further includes a pre-polarizer (not shown) and/or a clean-up analyzer (not shown), which for example, may include one or more WGPs and/or dichroic sheet polarizers.

The trim retarder compensators 21a, 21b, and 21c (herein simply referred to as trim retarders), are compensating elements used to improve the contrast performance level of the microdisplay system, which is otherwise limited by the residual birefringence of the LCoS panels in the dark (e.g., off) state. In particular, each trim retarder 21a, 21b, and 21c introduces a phase retardance that cancels the retardance resulting from the inherent birefringence of the corresponding LCoS panel. The term 'retardance' or 'retardation', as used herein, refers to linear retardance magnitude as opposed to circular retardance magnitude, unless stated otherwise. Linear retardance is the difference between two orthogonal indices of refraction times the thickness of the optical element. Linear retardance causes a phase difference between two orthogonal linear polarizations, where one polarization is aligned parallel to the extra-ordinary axis of the linear retarder and the other polarization is aligned parallel to the ordinary axis of the linear retarder. In contrast, circular retardance causes a relative phase difference between right- and left-handed circular polarized light.

Linear retardance may be described as either in-plane or out-of-plane retardance. In-plane retardance, expressed as optical path length difference, refers to the difference between two orthogonal in-plane indices of refraction times the physical thickness of the optical element. Out-of-plane retardance refers to the difference of the index of refraction along the thickness direction (z direction) of the optical element and one in-plane index of refraction (or an average of in-plane indices of refraction), times the physical thickness of the optical element. Normal incidence rays in a cone bundle see only in-plane retardance, whereas off-axis rays including oblique rays (i.e. non-normal but along the principal S- and P-planes) and skew rays (i.e. non-normal and incident away from the principal S- and P-planes) experience both out-ofplane retardance and in-plane retardance. Notably, in-plane retardance is not observed for the trivial case of 90° ray angle in the birefringent medium.

In the absence of trim retarders 21a-c, the P-polarized polarized light that illuminates each microdisplay panel in the dark (off) state is slightly elliptically polarized upon reflection due to the residual birefringence of the LCoS panels 20a-c. When the elliptically polarized light, which contains both a P- and an S-component, is transmitted to the corresponding WGP 15, 14, 13, the S component is reflected to the X-cube thus allowing dark state light leakage onto the large screen and limiting the contrast of the projection system.

The use of trim retarders 21a-c improves the contrast level by providing in-plane retardance that compensates for the retardance resulting from the residual birefringence in the LCoS panels 20a-c. More specifically, the trim retarders 21a-c are oriented such that their slow axes are configured at orthogonal azimuthal alignment to the slow axes of the LCoS panels 20a-c (termed "crossed axes"), while their fast axes are configured at orthogonal azimuthal alignment to the fast axes of the LCoS panels 20a-c. The terms slow axis (SA) and fast axis (FA), as used herein, refer to the two orthogonal birefringent axes when the linear retardance is measured at normal incidence. Notably, the SA and FA locations change with off-axis illumination as well as reversing the SA/FA roles for a negative out-of-plane retardance component at a large angle of incidence.

Since the slow axes of the trim retarders 21a-c and LCoS panels 20a-c are configured at orthogonal azimuthal orientations, the role of the fast/slow axes switches from the trim retarder 21a-c to the LCoS panel 20a-c for normal incidence light. In other words, light having a specific polarization is alternately delayed more then less, or vice-versa, in the trim retarder 21a-c and the LCoS panel 20a-c, respectively. The net effect is zero relative delay for the incoming polarization, and as a result, an unchanged polarization (i.e., the output light is not elliptically polarized). The corresponding WGP 15, 14, 13 and/or optional clean-up polarizer then rejects the output light so that the dark-state panel light leakage does not appear on the screen. Since the trim retarders 21a-c do not alter significantly the throughput of the panel on-state, the resulting sequential contrast (full on/full off) is excellent.

The operating principle of each trim retarder 21a-c is further illustrated in FIG. 2, with reference to the core optics of a single-channel light engine. These core optics include a pre-polarizer 30, a WGP 31, a trim retarder 32, a vertical aligned nematic (VAN)-mode LCoS panel 33, and a clean-up polarizer (not shown). In operation, unpolarized or partial polarized light output from a prior stage illumination (not shown) is passed through the pre-polarizer 30 to obtain P-polarized light. The light is transmitted through the WGP 31 and its polarization extinction ratio is enhanced. The trim retarder 32 preconditions the incoming P-polarization beam and creates an elliptical output. Ideally, the ellipticity in the polarized light incident onto the LCoS panel 33, which is in a dark (off) state, is undone by the residual panel retardance. The reflected light, after completing a double pass through the VAN-LCoS panel 33 and the trim retarder 32, thus remains P-polarized. The remaining P-polarization component transmitted by the WGP 31 is injected back into the illumination system and is eventually lost.

As discussed above, the trim retarder 32 ideally provides an A-plate retardance that matches the in-plane retardance of the corresponding LCoS panel 33 in the off-state. In practice, however, the A-plate retardance of both the LCoS panel 33 and the trim retarder 32 tends to vary within each component due to manufacturing tolerances in device thickness and material birefringence control, as well as operational drifts (temperature, mechanical stress etc). As a result, to ensure adequate compensation it is common to provide a higher A-plate retardance in the trim retarder 32 than that exhibited by the LCoS panel 33. For example, a trim retarder with an A-plate retardance of 10 nm (at λ=550 nm) is often provided to compensate for a VAN-mode LCoS exhibiting a 2 nm A-plate retardance (at λ=550 nm).

As is known to those of skill in the art, this mismatch in A-plate value requires offsetting of the optic axis of the trim retarder 32, relative to the nominal crossed axes configuration described above. In other words, the trim retarder is 'clocked-in' by rotating its azimuth orientation away from the crossed-axes configuration. For example, see J. Chen, M. G. Robinson and G. D. Sharp, "General methodology for LCoS panel compensation", SID 04, Digest, pp. 990-993, 2004. FIG. 3, which shows the relative azimuthal orientations of the LCoS panel and the trim retarder slow axes, illustrates how the higher value trim retarder is "clocked" away from the bisector of S- and P-polarization planes, in the adjacent quadrant, by an angle φ. When the slow and fast axes of the VAN-LCoS panel bisect the S- and P-polarization planes, as discussed above, when the LCoS retardance is very small (e.g., <<λ/50), and for a trim retarder A-plate retardance up to a quarterwave, the over-clocked angle, φ, is approximately given by:

$$\phi \approx \frac{\cos^{-1}([\Gamma_a(LC)/\Gamma_a(TR)])}{2}$$

where $\Gamma_a(TR)$ is the trim retarder A-plate retardance and $\Gamma_a(LC)$ is the LCoS A-plate retardance. Accordingly, the over-clocked angle is about 39° when the LCoS exhibits a 2 mm in-plane retardance and the trim retarder provides about 10 nm of in-plane retardance.

In addition to providing in-plane retardance, it is common for the trim retarder 32 to also provide out-of-plane retardance to increase the field of view. More specifically, it is common for trim retarders to include both an A-plate compensation component for compensating the in-plane retardance and a –C-plate compensation component, which exhibits negative birefringence, for compensating for out-of plane retardance. These full function A/–C-plate trim retarders optionally also include an O-plate component. An A-plate is a birefringent optical element having its extraordinary axis oriented parallel to the plane of the plate. A C-plate is birefringent optical element having its extraordinary axis oriented perpendicular to the plane of the plate (i.e. parallel to the direction of normally incident light). An O-plate is a birefringent optical element having its extraordinary axis (i.e., its optic axis or c-axis) oriented at an oblique angle with respect to the plane of the plate.

Some examples of materials used to form A-plate components include uniaxially stretched polymer films such as polyvinylalcohol (PVA) or polycarbonate (PC) films, uniaxially aligned films of liquid crystal polymer (LCP) material, non-tilted biaxial organic foils such as cellulose acetate, birefringent crystals, and inorganic thin films. Some materials used to form –C-plate components include discotic films and liquid crystal polymer (LCP) aligned with linear photopolymerization (LPP) technology. With regard to the latter, the layer of cholesteric LCP must have a short helical pitch (i.e., much shorter than the shortest wavelength in the operational wavelength range) and a reflection wavelength peak in the UV light range. The resulting LCP/LPP-based trim retarder has been proven to be very versatile in terms of reliability, uniformity and ease of retardance targeting, and furthermore, has been proven to provide excellent contrast compensation as well as be environmentally stable.

Also of increasing interest are trim retarders wherein the birefringence is generated from the arrangement of diffractive elements (i.e., form birefringence) rather than the molecular birefringence discussed above.

It is known that a diffraction grating, configured as thin holographic element (i.e., not a volume hologram) and having a feature size much larger than the wavelength of light used for creating the diffracted output, is approximately polarization insensitive. According to scalar diffraction theory, wherein paraxial ray propagation is assumed, the diffracted output at each $m^{th}$ order is calculated from:

$$\sin(\theta_m) = \frac{m\lambda}{\Lambda}, \text{ and}$$

$$I_m = \left(\frac{2}{m\pi}\right)^2,$$

where $\lambda$ is the wavelength of light, m is the odd order of diffraction, $\theta$ is the angle of diffraction (assuming normal incidence in air entrance and exit medium), and $\Lambda$ is the grating pitch.

This intensity expression includes an implicit assumption of a transverse, phase-only binary grating. In other words, it is assumed that the grating has a modulation pattern substantially perpendicular to the device normal, that the grating is substantially lossless, and that the modulation is effected by phase encoding rather than intensity encoding. It is also assumed that the grating is regular without pixelation and dead-space effects. For cases with pixelation/dead-space (i.e., non-50% duty cycle square-wave grating) and general hologram patterns, more involved expressions are available to predict the output at each diffracted angle. For example, see K. L. Tan et al., "Dynamic holography for optical interconnections. II. Routing holograms with predictable location and intensity of each diffraction order," *J. Opt. Soc. Am. A*, 18(1), pp. 205-215, 2001, hereby incorporated by reference.

If, however, the traverse diffraction grating has a feature size that is only a fraction of the wavelength of light used for creating the diffracted output, only the zeroth diffraction order will be reflected/transmitted. All other orders are evanescent (i.e., non-zero orders decay beyond some appreciable distance from the grating plane). The grating is now polarization dependent. For a one-dimensional grating, the P-plane (also TM-wave) and S-plane (TE-wave), parallel and perpendicular to the grating vector, respectively, complex amplitude transmittance/reflectance have different characteristics. Furthermore, at normal incidence, the effective refractive indices along and orthogonal to the grating vector differ non-negligibly. The grating is now a birefringent element having effective extraordinary and ordinary refractive indices. This zeroth order sub-wavelength grating (ZOG) is a form-birefringent element, wherein the index modulation (and hence phase modulation) of the grating is transversely-inhomogeneous (i.e., along the grating vector direction). A vector diffraction calculation tool (either modal-analysis or rigorous coupled-wave analysis) is required to predict the transmitted/reflected complex amplitude quantities.

Grid-structure elements, such as metallic grid polarizers, have been available for IR wavelengths and microwave frequencies for many years. The requirement that these elements are fabricated with sub-wavelength feature sizes is readily met, since these applications require the wavelength of the electromagnetic (EM) radiation to range from microns to sub-millimeters. In recent years, advances in semiconductor IC (integrated circuit) technology have made available lithography techniques that allow for transistor gate sizes less than about 90 nm to be fabricated, and thus is capable of providing the approximately 100 nm feature size required for visible band applications (i.e., ranging from approximately 400 nm to 700 nm).

Referring to FIG. 4, a simple, one-dimensional binary grid structure is shown. The transverse grid structure 100 includes three major elements: a first set of parallel lines 110 of a first material, a second set of parallel lines 120 of a second material interleaved with the first set of lines, and a substantially transparent substrate 130 on which both sets of wires are mounted. This basic surface-relief structure in available as a commercial wire-grid polarizer (e.g., by Moxtek), wherein the first set of lines is formed from evaporated Aluminum (and/or other dielectric materials) and the second set of lines are simply air gaps (e.g., a space that is created when the Al layer has been partially etched). Other optical stacks, such as anti-reflection (AR) layers commonly coated on the second surface of the substrate, are not shown. Also not shown are potential etch stop and capping layers for the grating structure.

Although a binary (rectangular) grating pattern is depicted, the transversely-inhomogeneous profile (along the x-direction) could also be saw-tooth-like (triangular), blazed, sinusoidal, trapezoidal etc. Each period of modulation includes two or more optical path length modulations along the device normal direction. This can be accomplished by creating two or more distinct materials at the same height (i.e., same physical thickness) or by combinations of material and physical layer thickness changes. Note that although the two materials/regions provide different phase delays in theory, in practice, an averaging effect results due to the fact that the light is unable to resolve the sub-wavelength pitch. The grating device is shown in a conical mount in a Right-handed XYZ coordinate system and with the incident electromagnetic radiation in plane 141 along the direction of the wavevector 140. The plane of incidence 141 makes an azimuthal angle 146 with the plane that contains the grating vector (i.e., XZ plane). The incident vector 140 is inclined at a polar angle of incidence (AOI) 147 relative to the device normal direction 145. In display applications, the azimuthal angles 146 range from 0 to 360 degrees and the polar angle 147 is given by half-cone angle. In a typical application, the cone axis of incident EM waves may or may not coincide with the device normal.

For a metallic grid polarizer, the grid device transmits a first polarization, substantially linear and parallel to the grating vector (i.e., parallel to the X-axis) and reflects a second polarization, substantially linear and parallel to the wire direction (i.e., parallel to the Y-axis or perpendicular to the grating vector). Effective medium theory (EMT) is applied to yield approximate effective ordinary index, $n_o$, and effective extraordinary index, $n_e$, for the grid device. The zeroth-order effective indices, $n_o^0$ and $n_e^0$, are given by, $$n_o^0 = \sqrt{f(n_1)^2 + (1-f)(n_2)^2} \text{ and } n_e^0 = 1/\sqrt{f/(n_1)^2 + (1-f)/(n_2)^2}, \quad (1)$$

where $n_1$ and $n_2$ are the refractive indices of a first material and a second material, respectively, and f is the duty cycle of the width of the first material versus the grating period. The above EMT equations are applicable in the quasi-static limit, where the grating period approaches 0 width. In real applications, a set of second order EMT expressions provides a better approximation for the effective $n_o$ and $n_e$ indices, $$n''_o = \sqrt{(n_o^0)^2 + \left(\frac{p}{\lambda}\right)^2 \frac{\pi^2}{3} f^2 (1-f)^2 [(n_1)^2 - (n_2)^2]^2} \quad \text{and} \quad (2)$$

$$n''_e = \sqrt{(n_e^0)^2 + \left(\frac{p}{\lambda}\right)^2 \frac{\pi^2}{3} f^2 (1-f)^2 [1/(n_1)^2 - 1/(n_2)^2]^2 (n_o^0)^2 (n_e^0)^6},$$

where the zeroth order effective indices, $n_e^0$ and $n_o^0$, are used to further refine the second order approximate effective indices, $n''_e$ and $n''_o$, with the information of wavelength of operation, $\lambda$, grating pitch, p and duty cycle, f.

According to EMT theory, the transversely-inhomogeneous grating is effectively a birefringent medium, with its e-wave axis, having an effective index $n_e$, aligned parallel to the grating vector (X-axis). This is shown by the equivalent device 150 in FIG. 5. The o-wave axis 152, with an ordinary index $n_o$, is perpendicular to the e-wave axis 153, with extraordinary index $n_e$, and is contained within YZ plane. This EMT layer has negative birefringence where $n_e < n_o$. If the lamellar grating contains a dielectric grid, rather than a metal grid, the diattenuation property is substantially zero and the retardation property is substantially unity. Under this condition, an A-plate retarder having an in-plane retardance is created. The retardance for such a grating is $(n_o - n_e)h$, where h is the grating layer thickness 151. This retarder is referred to as a −A-plate, meaning it is an A-plate retarder with negative birefringence. The significance of this is that the retardance profile vs. AOI along the e-wave plane shows a modest increase with AOI, rather than a weak decrease as in the case of positive A-plate elements.

In U.S. Pat. No. 6,532,111, Kurtz et al. propose a dielectric wire-grid polarizer formed from transversely-inhomogeneous non-conducting wire grid structures, wherein the etched pedestals are formed from multi-layer dielectric stacks. While this wire-grid device is suitable for visible band applications, the polarizing (diattenuation) characteristics of the wire grid are high, and as a result, this device is too reflective to be used as a trim retarder.

Dielectric grid optical retarders for achromatic, high-magnitude retardance applications have been proposed by Bokor et al (i.e., N. Bokor et al., "Achromatic phase retarder by slanted illumination of a dielectric grating with period comparable with the wavelength," Appl. Opt. 40, (13) pp. 2076-2080, 2001). However, since the proposed device requires a high-angle conical mount and it is meant for parallel beam applications, it is not suitable for conventional LCD-based micro-display imager applications. Furthermore, a lack of −C-plate functionality renders the device particularly unsuitable for projection contrast compensation.

In US Pub. No. 20050045799, Deng et al. propose that a substantially achromatic optical retarder formed from dielectric grids can be fabricated with super-resolution lithography methods. The proposed device 200, which is depicted in FIG. 6, includes a transversely-inhomogeneous grating 210 mounted on top of an etch-stop layer 230 and capped by a cap-layer 240. The grating includes at least two profiles, 211 and 216, where each of the profiles may be a multi-layer. It is typical to leave structure 216 as spaces between the "walls" 211. These walls are the pedestals left by an etching process. The cap-layer is coated by oblique evaporation, so as not to substantially fill in the spaces between the walls. The grating 210, as well as its process-required layers 230 and 240 are mounted on a transparent substrate 220 and the external surfaces of the resulting device are coated with multi-layer AR stacks, 250 and 260. An expanded view of the grating structure 210 is depicted in FIG. 7. The grating 210 has a layer thickness, h, while the width of the walls 211 and spaces 216 are $w_1$ and $w_2$, respectively. The duty cycle ratio, f, is given by, $$f = w_1/(w_1 + w_2) \quad (3)$$

Again, the EMT expressions (1) and (2) can be used to approximate the effective ordinary and extraordinary indices. The difference of these indices gives the effective birefringence, which is a negative value. While the optical retarder taught by Deng et al. has been used in a variety of optical applications, including polarizers, isolators, and AR design, it not generally suitable for LCD-based micro-display imager applications, and in particular projection applications, due to the lack of a −C-plate component and a high crossed polarization reflectance, the latter of which is due to the use of high effective in-plane birefringence.

In U.S. Pat. No. 5,196,953, Yeh et al. propose a form-birefringent optical retarder, wherein the form-birefringence arises from an axially-inhomogeneous structure rather than the transversely-inhomogeneous structure described above. The axially-inhomogeneous structure includes a first series of layers having a first refractive index which alternate with a second series of layers having a second refractive index. The values of the first and second refractive indices, as well as the thicknesses of the layers in the first and the second series, are chosen such that the structure provides −C-plate functionality. More specifically, the following conditions are created:

$$|\Delta n_L| d_L = |\Delta n_C| d_C$$

wherein $\Delta n$ is the birefringence, d is the layer thickness, and subscripts 'L' and 'C' refer to the switchable LC-layer in the display panel and the dielectric form birefringent compensator, respectively. In a preferred embodiment the lower and higher index values of $n_o$ and $n_e$ in the LC layer and the compensator sections are matched. Unfortunately, this approach greatly restricts the type of dielectric form birefringent compensator material for use therein, and requires accurate measurement of material constants and coating thicknesses. Furthermore, limiting the $n_o$ and $n_e$ to those of the LC-layer necessitates very thick coating layers for large −C values.

In US Pub. No. 20050128391A1, which is hereby incorporated by reference, Tan et al. disclose a trim retarder wherein the form-birefringence also arises from an axially-inhomogeneous structure. More specifically, Tan et al. teach that the axially-inhomogeneous structure that provides the form-birefringence (FB) is readily combined with one or more anti-reflection (AR) coatings to provide an FBAR element with −C-plate functionality. Advantageously, since the FB exhibits negative (−C-plate) out-of plane retardance and AR coatings typically exhibit positive (+C-plate) out-of-plane retardance, both the overall reflectance and the net C retardance are conveniently tuned to meet the requirements necessary for compensating for LCoS panels and/or other polarization sensitive devices used in projection systems.

Referring to FIG. 8, the FBAR trim retarder 300 includes an A-plate element 310 and a −C-plate element 350, both of which are mounted on a transparent substrate 390. The A-plate element typically includes a molecularly birefringent layer 320, with index matching layers and/or process required layers 321 and 322. The −C-plate element includes the alternating-index multi-layer stack 360 that exhibits axially aligned form birefringence. Similarly, the −C-plate element 350 may include index matching layers 361 and 362. The entire stack 350, including the index matching layers 361 and 362, contributes to the overall −C-plate functionality and AR performance of the trim retarder 300.

Referring to FIG. 9 the axially-inhomogeneous structure 360 includes an alternating-index multi-layer stack having a first plurality of layers 370, each of which has a first index of refraction $n_1$ and a first thickness $d_1$, and a second plurality of layers 380, each of which has a second index of refraction $n_2$ and a second thickness $d_2$, alternating with the first plurality of layers 370. The duty-cycle ratio is given by, $$f = d_1/(d_1+d_2). \qquad (4)$$

EMT equations, eq. (1) and (2) can be used to approximate the birefringence characteristics, although a matrix based thin-film calculator handles the axially-inhomogeneous, otherwise transversely homogenous, isotropic thin layers adequately.

The −C-plate form birefringent AR can be abstracted to a negative uniaxial indicatrix, as depicted in the equivalent device 350 in FIG. 10. The indicatrix is disc-like, with the e-wave axis 353 aligned parallel to the z-axis and the o-wave axis 352 aligned perpendicular to the e-wave axis and is contained in the plane of multi-layer stack.

While this full-function A/−C-plate retarder, encompassing low reflectance design, has been shown to enhance the image contrast of VAN-mode LCoS display system from several hundreds to one to several thousands to one (e.g., see K. Tan et al., "Design and characterization of a compensator for high contrast LCoS projection systems," SID 2005, p. 1810, 2005, hereby incorporated by reference), there is still a desire to provide improved trim retarders.

SUMMARY OF THE INVENTION

The instant invention relates to optical retarders that include both transversely- and axially-inhomogeneous structures. In particular, the instant invention relates to trim retarders that include an A-plate grating, which has a periodic section along the transverse plane of the device, and a −C-plate grating, which has a periodic section along the device normal. The widths of the periodic walls in the A-plate grating, and the thicknesses of the periodic layers in the −C-plate grating, are selected to be a fraction of the operating wavelengths in order to provide form-birefringence effects. These zeroth order gratings are readily coupled with one or more AR coatings to provide a low-reflectance, full-function trim retarder that is valuable for improving image contrast in polarization-based micro-display imagers.

The instant invention further relates to polarization-based projection display systems (e.g., with reflective liquid-crystal-on-silicon (LCoS) or transmissive liquid crystal display (xLCD) panels) that include the full-function trim retarder (i.e., with both transversely- and axially-inhomogeneous structures). In these projection systems, the full-function trim retarder is typically included as a separate element or is integrated with another optical element. For example, with regard to the latter, the full-function trim retarder is easily integrated into one or both substrates sandwiching the liquid crystal display cell.

Advantageously, the birefringence of the full-function trim retarder arises largely from the A-plate and −C-plate gratings, which are both zeroth order diffractive structures (i.e., the transverse grating does not yield transverse spatial filtering and the axial grating does not yield longitudinal mode filtering (wavelength)). In other words, the birefringence of the full-function trim retarder arises largely from the structures (form) of the underlying optical elements. Accordingly, the trim retarder is readily fabricated from a variety of materials (e.g., all inorganic dielectric) and will not typically lose its birefringence with time and/or high flux exposure. Furthermore, since the birefringence arises largely from structure, the device specifications are readily adapted for different applications/environments by altering the structure. For example, the A-plate and −C-plate gratings may be individually tailored and/or overlapped to provide the desired device specifications.

Notably, the instant invention is expected to provide an optical retarder exhibiting an A-plate retardance ranging from 1 nm to 400 nm, and a −C-plate retardance ranging from 0 nm to −1000 nm, for any wavelength in the required AR range. In particular, the instant invention provides a full-function trim retarder exhibiting an A-plate retardance ranging from 1 nm to 250 nm, and a −C-plate retardance ranging from 0 nm to −1000 nm, for any wavelength in the required AR range. For embodiments wherein the A-plate and −C-plate gratings coincide, at least in part, the A-plate retardance will typically be lower.

In accordance with one aspect of the instant invention there is provided an optical retarder comprising: an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance; a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and at least one substrate for supporting the axially-inhomogeneous and the transversely-inhomogeneous elements.

In accordance with another aspect of the instant invention there is provided a method of using an optical retarder to improve system contrast in a liquid crystal display based projection system, the method comprising: positioning the optical retarder in the projection system such that residual retardance of a liquid crystal display panel in the projection system is substantially compensated for, the optical retarder comprising: an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance; a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and at least one substrate for supporting the axially-inhomogeneous and the transversely-inhomogeneous elements.

In accordance with another aspect of the instant invention there is provided a liquid crystal display based projection system comprising: a light source; a first polarizer for receiving light from the light source and transmitting a first linearly polarized light having a first linear polarization axis; a liquid crystal display panel for optically modulating the first linearly polarized light, the liquid crystal display panel having residual birefringence; a second polarizer for receiving the optically modulated light and for transmitting a second linearly polarized light having a second linear polarization axis; a projection lens for projecting the second linearly polarized light onto a screen; and an optical retarder for compensating for the residual birefringence of the liquid crystal display panel, the optical retarder comprising: an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance; a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and at least one substrate for supporting the axially-inhomogeneous and the transversely-inhomogeneous elements.

In accordance with another aspect of the instant invention there is provided a method of fabricating an optical retarder comprising: providing a textured surface on a substrate, the textured surface exhibiting in-plane birefringence; and depositing an alternating-index multi-layer thin-film stack on the textured surface such that the thin-film layers substantially contour the textured surface to provide a plurality of undulating layers, the plurality of undulating layers exhibiting both in-plane birefringence and out-of plane birefringence.

In accordance with another aspect of the instant invention there is provided a method of fabricating an optical retarder comprising: depositing an alternating-index multi-layer thin-film stack on a substrate, the alternating-index multi-layer thin-film stack providing a –C-plate grating structure; and etching a thickness segment of the alternating-index multi-layer thin-film stack into alternating transverse regions to provide an A-plate grating structure.

For the following defined terms, these definitions shall be applied, unless a different definition is given in the claims or elsewhere in this specification.

The term "coherent optical layer" will be understood to include a thin-film layer having a thickness equal to or less than the order of wavelength of illumination.

The term "incoherent optical layer" will be understood to include a substrate for thin films with a thickness much larger than the wavelength of illumination.

The term "coherent coupling" will be understood to include cascading multiple segments of thin-film stacks without the use of incoherent optical layers.

The term "incoherent coupling" will be understood to include cascading multiple segments of thin-film stacks separated by incoherent optical layers.

The term "homogeneous layer" will be understood to include a coherent optical layer wherein the index of refraction is substantially uniform over the depth and transverse dimensions of the layer.

The term "inhomogeneous layer" will be understood to include a coherent optical layer wherein the index of refraction is substantially non-uniform over the depth and/or transverse dimensions of the layer.

The term "homogeneous retarder" will be understood to include an optical retardation element wherein both in-plane and out-of-plane components of the retardance are distributed uniformly across the depth of the element.

The term "inhomogeneous retarder" will be understood to include an optical retardation element wherein the in-plane and out-of-plane component of the retardance is distributed over distinct segments of sub-elements, all of which can be coupled incoherently or coherently.

The term "EMT" will be understood to refer to Effective Medium Theory, wherein a periodic isotropic-index structure is described as a negative uniaxial birefringent layer having effective ordinary and extraordinary indices.

The term "IMM" will be understood to refer to a three dimensional Index Mixing Model, wherein a periodic thin isotropic-index structure is described as a biaxial birefringent layer having effective principal indices of refraction along x, y, z indicatrix directions.

The term "RCWA" will be understood to refer to Rigorous Coupled Wave Analysis, which uses vector diffraction equations for solving the boundary conditions of a diffractive structure having a width and depth profile of the order of wavelength of illumination.

The term "A-plate" will be understood to include a retarder element with its C-axis aligned parallel to the plane of device.

The term "C-plate" will be understood to include a retarder element with its C-axis aligned parallel to the device normal direction.

The term "in-plane" will be understood to describe being parallel to the plane of device, such as in-plane birefringence, in-plane retardance, in-plane retarder axis, etc.

The term "out-of-plane" will be understood to describe being parallel to the device normal, such as out-of-plane birefringence, out-of-plane retardance, etc.

The term "retardation or retardance" will be understood to refer to the difference between two orthogonal indices of refraction times the thickness of the optical element.

The term "in-plane retardation" will be understood to refer to the product of the difference between two orthogonal in-plane indices of refraction times the thickness of the optical element.

The term "out-of-plane retardation" will be understood to refer to the product of the difference of the index of refraction along the thickness direction (z direction) of the optical element and one in-plane index of refraction times the thickness of the optical element. Alternatively, this term will be understood to refer to the product of the difference of the index of refraction along the thickness direction (z direction) of the optical element and the average of in-plane indices of refraction times the thickness of the optical element.

The term "birefringent" will be understood to refer to having multiple different indices of refraction.

The term "uniaxial" will be understood to refer to having two different indices of refraction (e.g., where at least two of nx, ny and nz are substantially equal).

The term "polarizer" will be understood to include devices commonly referred to as "analyzers".

The term "transversely-inhomogeneous grating" will be understood to include structures having a periodic index modulation (and hence phase modulation) in a direction parallel to the plane of the device.

The term "axially-inhomogeneous grating" will be understood to include structures having a periodic index modulation (and hence phase modulation) in a direction parallel to the device normal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF PREFERRED EMBODIMENTS

Figure 11:
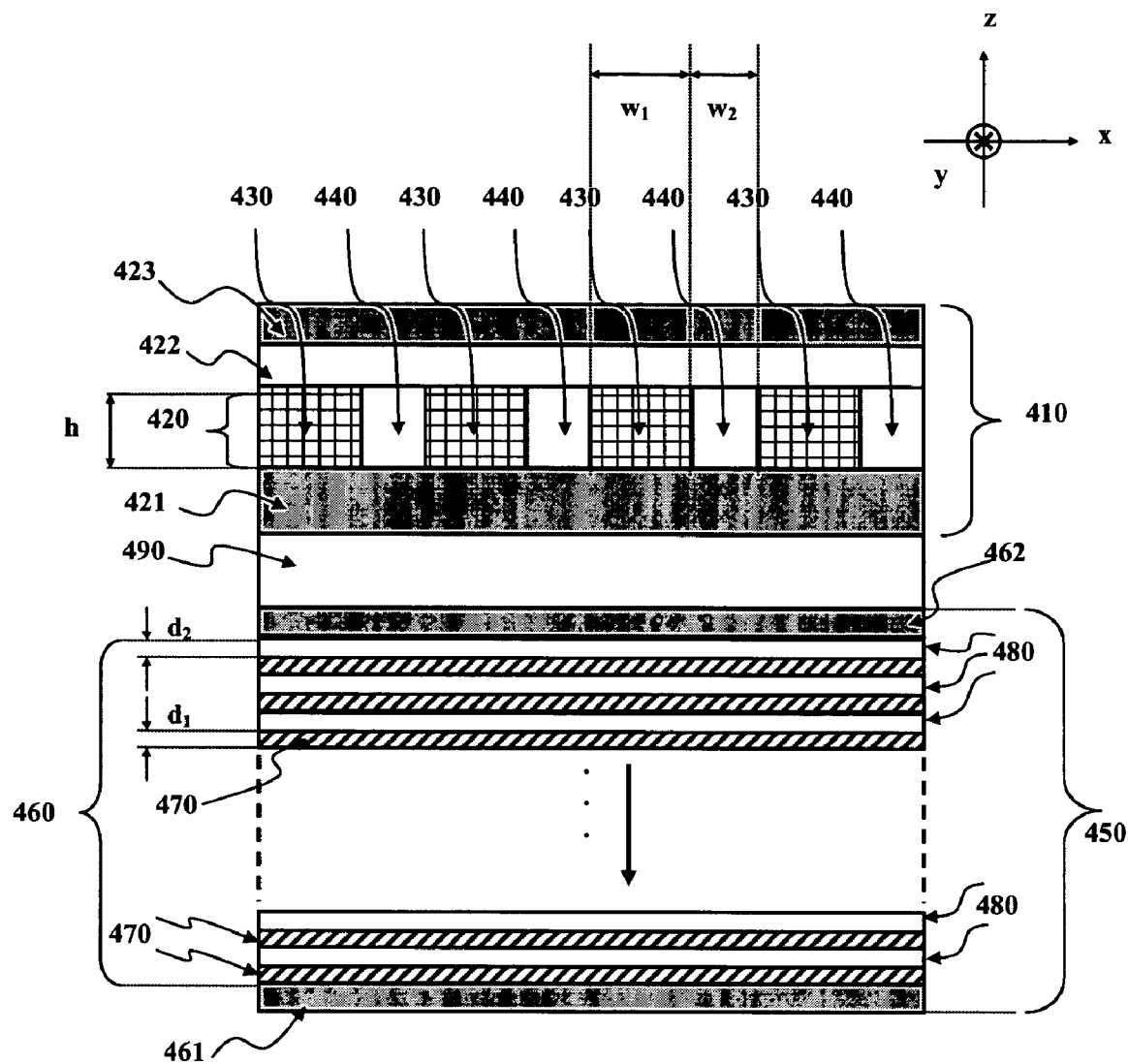
FIG. 11 is a schematic diagram of a full-function grating trim retarder in accordance with one embodiment of the instant invention, including an inhomogeneous cascade of transversely-inhomogeneous (A-plate) and axially-inhomogeneous (−C-plate) form birefringent elements on opposite sides of a substrate.

Referring to FIG. 11, there is shown a full function A/−C-plate grating trim retarder in accordance with one embodiment of the instant invention. The full function A/−C-plate grating trim retarder 400 includes a transversely-inhomogeneous A-plate grating element 410 and an axially-inhomogeneous −C-plate grating element 450, each coupled (incoherently) to opposite surfaces of a transparent substrate 490. More specifically the transversely-inhomogeneous A-plate grating element 410, which is a grating anti-reflection (AR) element, is mounted on a first surface of a transparent substrate 490, while the axially-inhomogeneous −C-plate grating element 450, which is a form-birefringence anti-reflection (FBAR) element, is mounted on a second surface of the transparent substrate 490.

The A-plate grating AR element 410 includes a transverse grating 420, an optional etch-stop stack 421 (e.g., including one or more etch-stop layers), an optional cap-stack 422 (e.g., including one or more layers) and an outer surface AR stack 423 (e.g., including one or more layers). The transverse grating 420 includes a first plurality of regions 430, each having a first width $w_1$ and a first integral phase delay at normal incidence, interleaved with a second plurality of regions 440, each having a second width $w_2$ and a second integral phase delay at normal incidence. Preferably, the widths of the first region $w_1$ and the second region $w_2$ are a fraction of the operating wavelengths in order to realize form birefringence effects. For example, for a wavelength range of 380 nm to 800 nm, a duty cycle ratio between 20% and 80%, and a pitch between 100 nm and 250 nm, the first $w_1$ and second $w_2$ widths will typically be between 20 nm and 200 nm, and the modulation height, h, will typically be between 10 nm and 3 μm. Notably, these parameters are described for exemplary purposes only. Other wavelength ranges, duty cycles, and/or pitches are selected according to the specific application. For example, providing a grating pitch of about 400 nm will allow for the optical retarder to be used as a zero-order sub-wavelength grating in the 780 nm and 1550 nm wavelength bands. In these cases, the grating height can be increased to realize an expected in-plane retardance from 100 nm up to about 400 nm, while not making the grating height versus grating feature width extremely high. Each period of modulation includes two or more distinct optical path length regions for normal incidence light. As a result, the transverse grating 420 typically requires two or more materials. A first material is used in the first plurality of regions 430, while a second material is used in the second plurality of regions 440. In the simplest case the first material is a solid and the second material is air, another gas, or vacuum. In this case, the first plurality of regions 430 form a plurality of pedestals (walls) and the second plurality of regions 440 are air gaps such that the cross-sectional view corresponds to a physical pedestal-groove periodic profile. Alternatively, both the first and second materials are solids, and are selected to provide an optical path difference between the first region 430 and the second region 440, at normal incidence. When both the first and second materials are solid, the grating may be fabricated using an etching process, as described above, or may be fabricated using exposure to interfering UV light beams. In general the first and second materials, in addition to the widths $w_1$ and $w_2$, are selected such that the structure forms a one-dimensional, zeroth order sub-wavelength grating that provides in-plane form birefringence. Suitable solid materials for the first and/or second materials include organic and inorganic dielectrics. For example, common dielectric thin-film coating materials include metal oxides such as $SiO_2$, $Al_2O_3$, $Ta_2O_5$, $Nb_2O_5$, $HfO_2$, $TiO_2$, niobia-tantala, niobia-titania, fluorides such as $MgF_2$, sulphides, silicon nitride, etc. Optionally, the first and/or second materials include a multi-layer stack. One method of fabricating an A-plate grating with multi-layer stack filled grooves includes etching out the grooves to provide the diffractive pattern, depositing a conformal multi-layer stack over the patterned substrate, and polishing down the entire stack to provide the desired structure. The use of multi-layer stacks pedestals advantageously allows the overall A-plate retardance dispersion profile to be tailored (e.g., to be achromatic over a broad wavelength band).

While the cross-sectional view of the transverse grating 420 is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

Similarly, while the transverse grating structure 420 has been described as a one-dimensional grating structure, a two-dimensional grating structure, wherein there exists well-defined orthogonal azimuthal directions that contain the slow-axis and the fast-axis of the effective in-plane retarder, is also within the scope of the instant invention. The in-plane retardance is given by the difference of the in-plane retardance values along the two orthogonal azimuthal directions (for 90° crossed A-plate gratings). For arbitrary two-dimensional A-plate gratings at non-90° grating vector offset, net A-plate retardance along with a pair of fast/slow axes can be determined. If multiple A-plate gratings (one- or two-dimensional gratings) are distributed over multiple thickness segments, a three-dimensional A-plate grating results. Similarly, net in-plane retardance and fast/slow axes can be determined.

The −C-plate FBAR element 450 includes an alternating-index stack 460, an outer index matching block 461, and inner index matching block 462. The axially periodic structure 460 includes a first plurality of layers 470, each having a first refractive index $n_1$ and a first thickness $d_1$, alternating with a second plurality of layers 480, each having a second refractive index $n_2$ and a second layer thickness of $d_2$. Preferably, the layer thicknesses of the first plurality of layers $d_1$ and the second material $d_2$ in the −C-plate grating are a fraction of the operating wavelength (e.g. $\lambda$=550 nm) in order to provide a one-dimensional grating structure and realize form birefringence effects. In general, each of the first and second plurality of layers will typically include between about 10 and 500 layers, and more typically between about 50 to 110 layers. For a wavelength range of 380 nm to 800 nm, and a duty cycle ratio between 20% and 80%, the layer thickness in the alternating-index stack $d_1$ or $d_2$ is typically greater than about 1 nm and less than about 100 nm. Notably, the layer thickness $d_1$ or $d_2$ will vary with the duty cycle and/or the wavelength range. For example, while the layer thickness $d_1$ or $d_2$ is typically less than about 70 nm for a duty cycle near 50%, it will range up to about 200 nm for narrow wavelength ranges near 800 nm. While the duty cycle will be typically between 5% and 95%, the form birefringence is usually maximized by selecting the layer thickness $d_1$ or $d_2$ to be substantially similar or the same (e.g., a duty cycle close to about 50%). Accordingly, it is more common for the duty cycle to be between 20% and 80%, or even more commonly between 30% and 70%. While the alternating stack 460 is illustrated with only two different layer materials, it is also within the scope of the instant invention to use more than two different layer materials. Suitable materials for the first and/or second layers include organic and inorganic dielectrics. A large difference (e.g. greater than 0.5 and preferably greater than 0.7) between the $n_1$ and $n_2$ will typically maximize the form birefringence and minimize the thickness of the coating. For example, an −C-plate grating including 71 pairs of tantala and silica layers, having nominal indices of 2.20 and 1.46 at $\lambda$=550 nm, respectively, has been estimated to provide a net retardation of approximately −6.3 nm at ±12 deg. angles of incidence in air.

The FBAR element 450 provides negligible retardance at normal incidence. At oblique incidence, the FBAR element 450 realizes a fraction of its nominal −C-plate retardance. The FBAR element 450 effectively acts as a C-cut uniaxial birefringent element, with its optic axis aligned parallel to the device normal.

In each of the −C-plate and A-plate grating elements, the AR layers 423, 421, 461 and 462 are added at the interfaces to reduce material interface reflections. These AR coating layers serve as refractive index matching layers at interfaces with an abrupt index changes. The AR coatings also provide an additional out-of-plane retardance component that should be factored in to the overall retardance and phase difference when the grating trim retarder is being manufactured. The optional etch-stop stack 421, which may include one or more layers, and the optional cap-stack 422, which may include one or more layers, are typically required for etched gratings. Typically, the cap-layer will coated by oblique evaporation so as not to substantially fill in the spaces between the walls. The glass substrate, 490, is typically a plane-parallel glass plate substrate, which for example, is about 1 mm thick. Alternatively, the substrate is fabricated from another transparent material that provides mechanical support.

Both the A-plate grating AR element 410, which is formed from homogeneous and patterned multiple thin-film layers, and the FBAR element 450, which includes an alternating-index multi-layer stack and the associated index matching layers, are basically AR function blocks. The term 'A-plate grating' refers to the grating structure that gives rise to an in-plane retardance (primary function) and in the instant application typically has a negative effective birefringence (i.e., a −A-plate element). The term 'C-plate grating' refers to the grating structure that gives rise to an out-of-plane retardance and in the instant application typically has a negative effective birefringence (i.e., a −C-plate element). Optionally, the A-plate grating also gives rise to a secondary out-of-plane retardance.

Using the A-plate retardance of the transverse grating (i.e., a surface-relief structure) to complement the −C-plate retardance of the FBAR stack advantageously provides a trim retarder that exhibits both in-plane and out-of-plane retardance, and hence is suitable for compensating for residual retardance of LCD panels, and in particular for LCD panels used in projection applications.

Furthermore since this full-function A/−C-plate trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Figure 12:
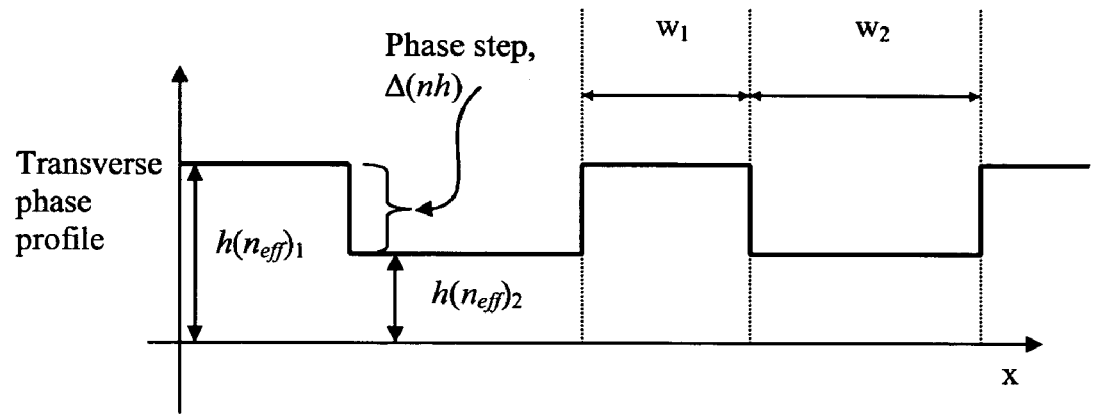
FIG. 12 illustrates the modelled binary optical path length modulation of an A-plate form birefringent element.

The full-function C/A grating trim retarder 400 can be modeled. Modelling calculations for the A-plate grating have been completed assuming a binary diffractive pattern, wherein a plurality of pedestals (walls) alternate with a plurality of air gaps. A schematic of the required transverse optical path modulation of the A-plate grating is depicted in FIG. 12. The difference in the integral phase delay in the first grating region (the pedestals) and the integral phase delay in the second grating region (the air filled grooves), in which the two regions are at the same physical thickness h (i.e., air space is counted as an optical layer), creates a transverse grating (with $\Delta(nh)$ index modulation). When the pitch of this grating is sub-wavelength, an effective extraordinary index along the grating vector and an effective ordinary index orthogonal to the grating vector are obtained. This is the form-birefringence effect. The difference in effective indices gives rise to the A-plate retardance. The approximate effective in-plane indices of the A-plate grating 410 are computed by taking into account the duty cycle ratio of the binary modulation based on $w_1$ width of the first modulation region and $w_2$ width of the second modulation region, the grating height, h, and by using equations (1) and (3).

Figure 13:
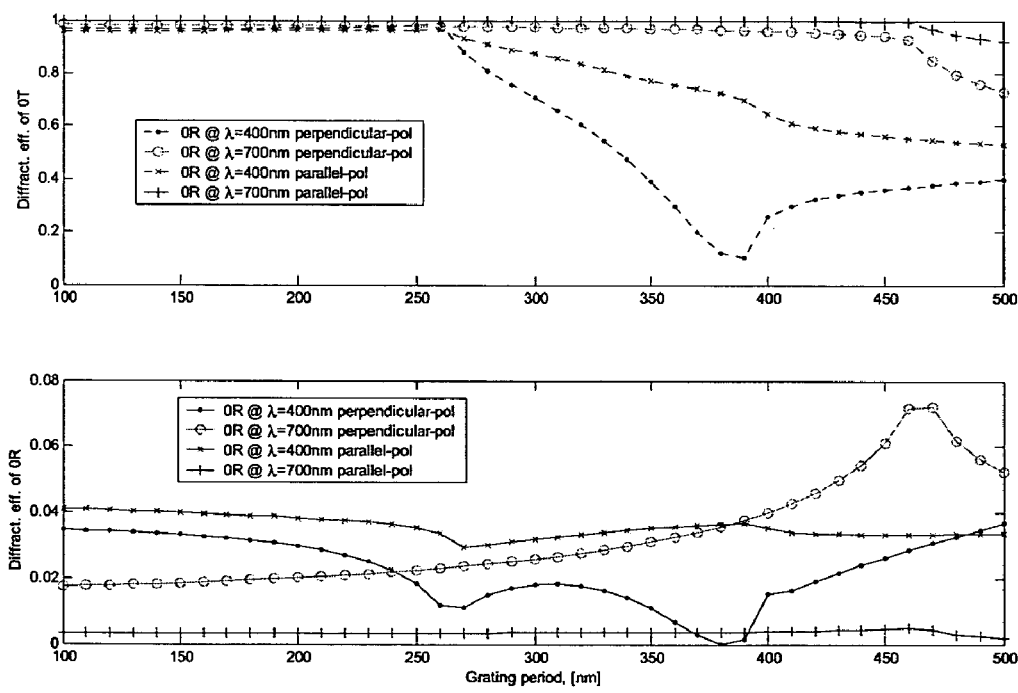
FIG. 13 illustrates the modelled minimum grating pitch lengths for visible band applications.

The model assumes that the binary grid is an Alumina (i.e., $Al_2O_3$ with an index of refraction of 1.65 at $\lambda=550$ nm) grid mounted on a transparent substrate, without the etch-stop, cap or additional AR layers. The modeling results reported here have been calculated with GSolver [by Grating Solver Development Company, Allen, Tex., version 4.20b] full-vector RCWA grating calculator. The complex amplitudes of the zeroth order transmission and reflections have been used for retardation calculations. The Alumina grid has been fixed at 47% of the grating pitch, with the pitch varied from 100 nm to 500 nm. The Alumina pedestal height has been fixed at 170 nm. The zeroth order transmittance (OT, in top figure) and reflectance (OR, in bottom figure) profiles, versus the grating pitch lengths, are shown in FIG. 13 for the visible band wavelengths of 400 nm and 700 nm (approximate band edges). The retained orders in GSolver calculation are ±20 and the full dispersion data for Alumina and Corning 1737F glass substrate have been used. It is evident that at about 50:50 duty cycle, the grating length has to be less than approximately 250 nm in order to realize the zeroth-order grating effects for the entire visible band applications from 400 nm wavelength or longer. The parallel- and perpendicular-polarization inputs refer to the linear polarization parallel and perpendicular to the grating vector (i.e., perpendicular and parallel to the wire direction, respectively). The perpendicular polarization diffracts to multiple orders with reduced diffraction efficiency for the zeroth order much more severely than the parallel polarization inputs, at a given grating pitch. In real system applications, it cannot be guaranteed that the incoming polarization is linear and parallel/perpendicular to the grating vector (i.e., cone incidence and azimuthal clocking of the retarder are involved).

Figure 14:
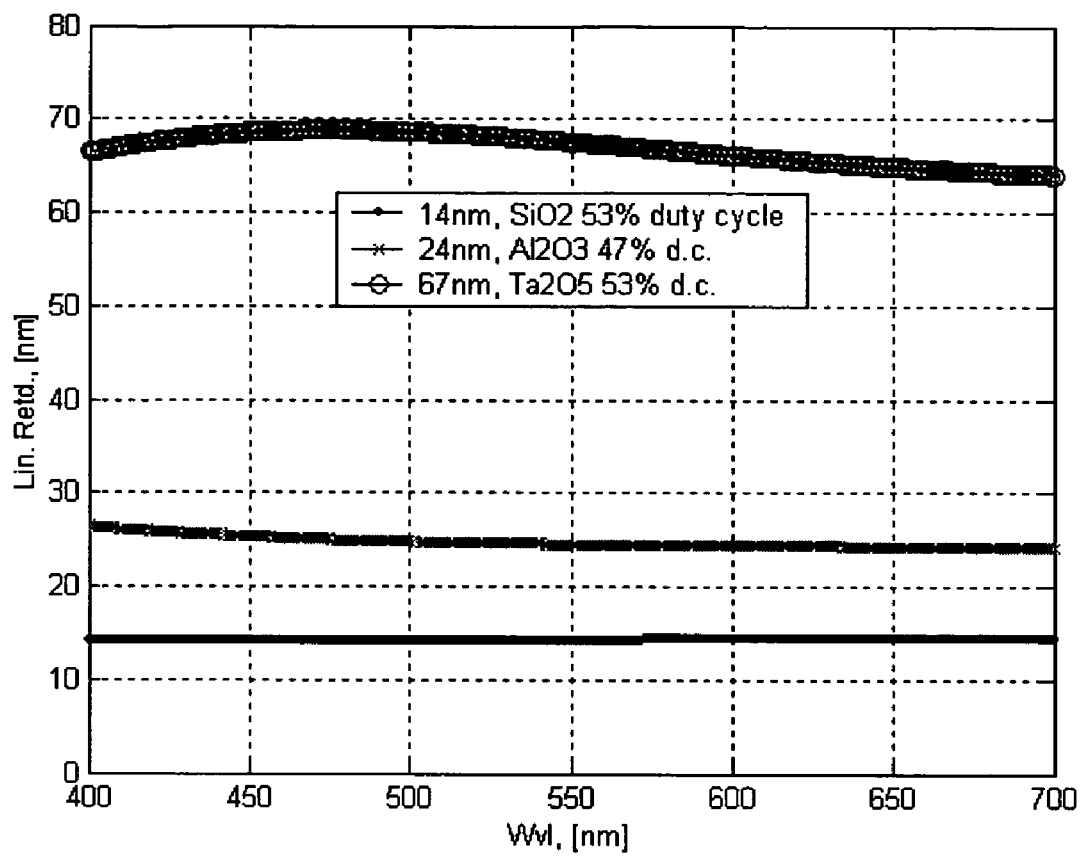
FIG. 14 illustrates GSolver calculated effective in-plane retardance for some modelled binary dielectric/air grating retarders.

Referring to FIG. 14, the in-plane retardance calculation results for Silica ($SiO_2$), Alumina ($Al_2O_3$) and Tantala ($Ta_2O_5$) dielectric grids having a duty cycle of 53%, 47% and 53%, respectively, are shown. The in-plane retardance calculations, which were obtained using Gsolver, assumed air gaps between the dielectric grid lines, an A-plate grating pitch of 150 nm, and a pedestal height of 170 nm. The nominal indices used for Silica, Alumina and Tantala at $\lambda=550$ nm were 1.485, 1.66 and 2.18, respectively. Full dispersion of Silica, Alumina and Tantala materials has been used. The results show that the dielectric/air grating yielded an A-plate retardance of approximately 14 nm, 24 nm and 67 nm, at $\lambda=550$ nm for Silica, Alumina and Tantala dielectric/air grid devices, respectively. These in-plane retardance values are adequate for compensating typical VAN-mode and Twisted-nematic (TN) LCoS panels. In fact, a large mismatch of the A-plate retarder and the LCoS in-plane retardance is not ideal in that the resulting tuning curve (contrast versus azimuthal angle rotation) is overly sensitive. Moreover, the use of high effective in-plane birefringence is associated with a high crossed polarization reflectance. These results clearly show that the dielectric grid realizes A-plate retarder elements with adequate retardance to compensate for typical LCoS panel residual in-plane retardance.

The complete contrast enhancement typically requires out-of-plane retardance compensation and low reflectance of the entire trim retarder compensator element. Examples of modelling calculations for the −C-plate grating have been provided in US Pub. No. 20050128391A1, which is hereby incorporated by reference. The approximate effective in-plane/out-of-plane indices of the −C-plate grating 450 is computed by taking into account the duty cycle ratio of the binary modulation based on $d_1$ and $d_2$ layer thicknesses of the first and the second plurality of layers in the alternating index stack, respectively, and by using equations (1) and (4).

Figure 15:
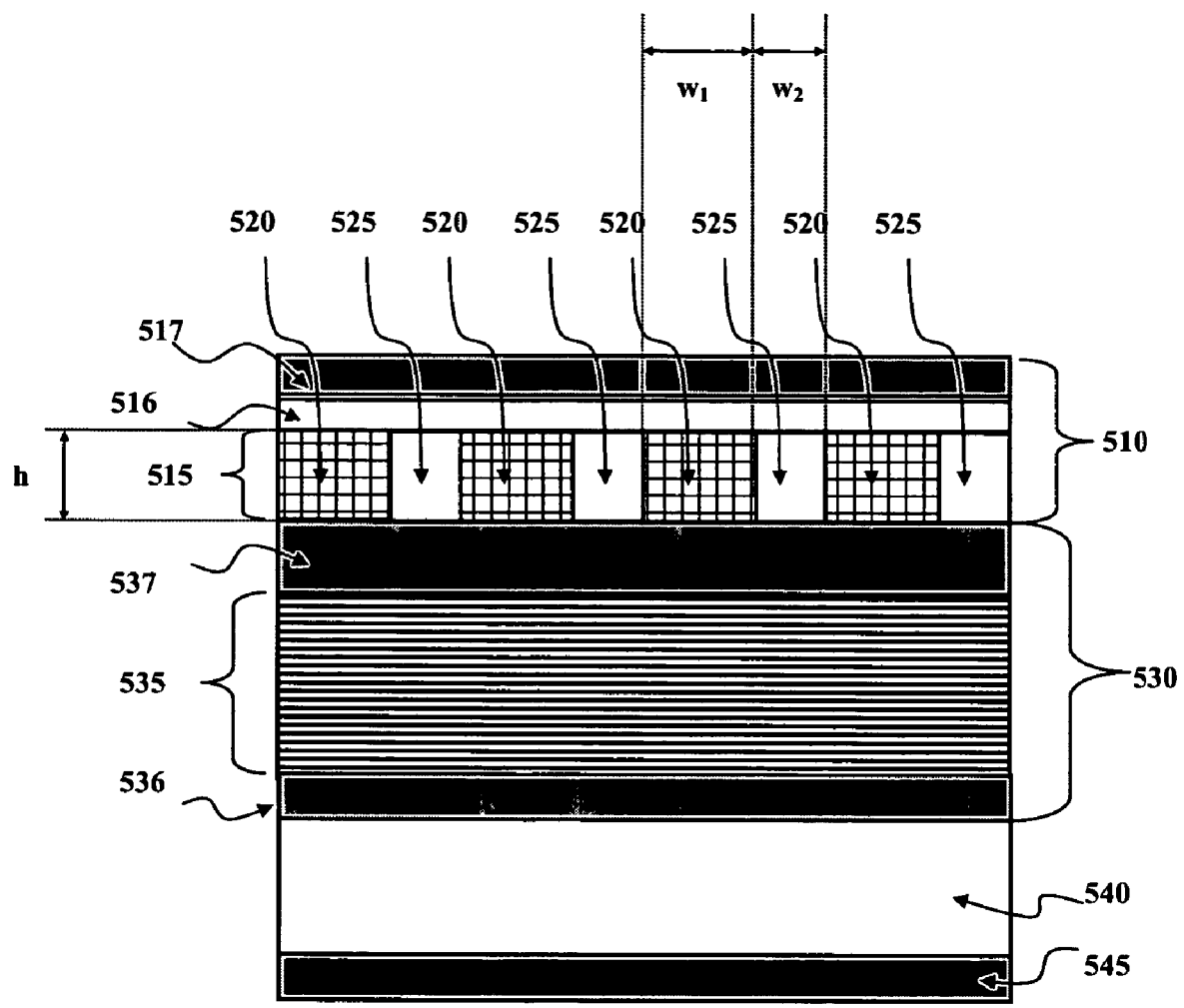
FIG. 15 is a schematic diagram of a full-function grating trim retarder in accordance with another embodiment of the instant invention, including an inhomogeneous cascade of transversely-inhomogeneous (A-plate) and axially-inhomogeneous (−C-plate) form birefringent elements on a same side of a substrate.

Referring to FIG. 15, there is shown a full function A/−C-plate grating trim retarder in accordance with another embodiment of the instant invention. The full function A/−C-plate grating trim retarder 500 includes an A-plate grating element 510, a −C-plate grating element 530, a transparent substrate 540, and an AR coating 545. More specifically, the A-plate grating element 510 and a −C-plate grating element 530 are coupled coherently and mounted on a first surface of the transparent substrate 540, while the AR coating 545 is mounted on the second surface of the transparent substrate 540.

The A-plate grating element 510 includes a transversely-inhomogeneous, periodic index modulation element 515, on which an optional cap-stack 516 and an outer-surface AR stack 517 are disposed. The periodic index modulation element 515 includes a first plurality of regions 520 interleaved with a second plurality of regions 525, wherein the width $w_1$ and $w_2$ and materials used for the first 520 and second 525 regions, respectively, are selected such that the structure forms a zeroth order sub-wavelength grating that provides in-plane form birefringence. For example, in a wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. Some examples of materials suitable for the first and/or second materials include air, organic dielectrics, inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides (e.g., $MgF_2$), sulphides and nitrides (e.g., silicon nitrides). Optionally, the first and/or second materials include a multi-layer stack. One method of fabricating an A-plate grating including a multi-layer stack includes etching out a plurality of grooves to provide the diffractive pattern, depositing a conformal multi-layer stack over the patterned substrate, polishing down the entire stack to provide the desired structure, optionally depositing a capping layer, and depositing an outer surface AR stack. The use of multi-layer stacks advantageously allows the overall A-plate retardance dispersion profile to be tailored (e.g., to be achromatic over a broad wavelength band). While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

The −C-plate grating element 530 includes an axially-inhomogeneous, periodic index modulation element 535, to which index matching stacks 536 and 537 are coupled. The axially periodic structure 535 includes a first plurality of layers, each having a first refractive index and a first thickness, alternating with a second plurality of layers, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Some examples of suitable materials for the first and/or second layers include organic and inorganic dielectrics.

In each of the −C-plate and A-plate grating elements, the AR layers 517, 537, 536, and 545 are added at the interfaces to reduce material interface reflections. These AR coating layers serve as refractive index matching layers at interfaces with an abrupt index change. The AR coatings also provide an additional out-of-plane retardance component that should be factored in to the overall retardance and phase difference when the grating trim retarder is being manufactured. The optional cap-stack 516, which may include one or more layers, is typically required for a dielectric/air grid etched grating. Typically, the cap-layer will be coated by oblique evaporation so as not to substantially fill in the spaces between the walls. The glass substrate is typically a plane-parallel glass plate substrate, which for example, is about 1 mm thick. Alternatively, the substrate is fabricated from another transparent material that provides mechanical support.

The coherent cascade of elements 510 and 530, both of which are coupled to one side of the transparent substrate, forms an overall AR stack that advantageously provides a compensating element that exhibits both in-plane and out-of-plane retardance, and hence is suitable for compensating for residual retardance of LCD panels, and in particular for LCD panels used in projection applications.

Furthermore since the resulting full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Figure 16:
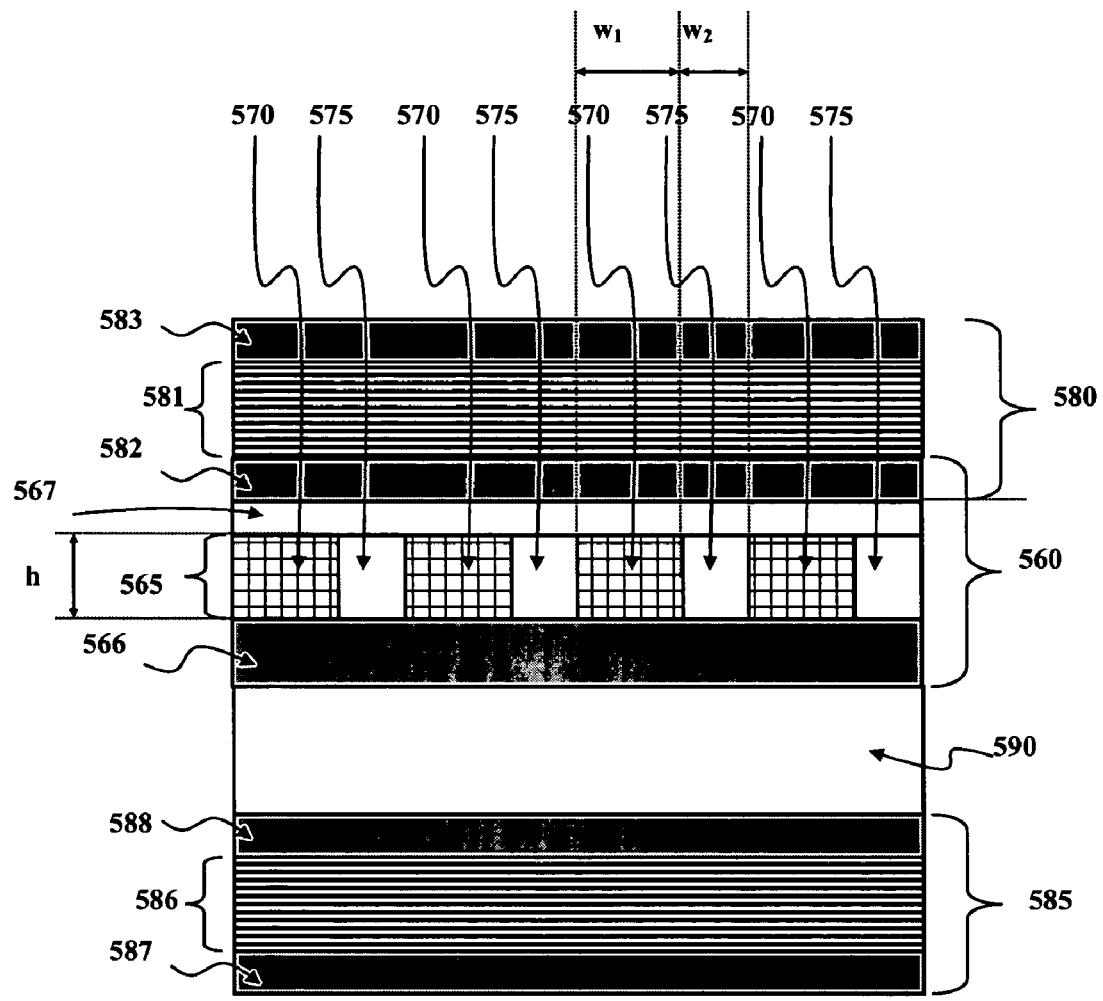
FIG. 16 is a schematic diagram of a full-function grating trim retarder in accordance with another embodiment of the instant invention, including an inhomogeneous cascade of transversely-inhomogeneous (A-plate) and axially-inhomogeneous (−C-plate) form birefringent elements on one side of a substrate and an axially-inhomogeneous (−C-plate) form birefringent element on the other side of the substrate.

Referring to FIG. 16, there is shown a full function A/−C-plate grating trim retarder in accordance with another embodiment of the instant invention. The full function A/−C-plate grating trim retarder 550 includes an A-plate grating element 560 disposed on a first surface of a transparent substrate 590, a first form-birefringence AR stack 580 disposed on the A-plate grating element 560, and a second form-birefringence AR stack 585 disposed on a second opposite surface of the transparent substrate 590. More specifically, the first −C-plate grating element 580 is integrated coherently to a first surface of the A-plate grating element, 560, while the second −C-plate grating element is incoherently cascaded on the second surface of the transparent substrate 590.

The A-plate grating element 560 includes a transversely-inhomogeneous, periodic index modulation element 565, an etch-stop stack 566, and a cap-stack 567, the latter two of which are optional etch process-required layers. The periodic index modulation element 565 includes a first plurality of regions 570 interleaved with a second plurality of regions 575, wherein the width (e.g., $w_1$ and $w_2$) and materials used for the first 570 and second 575 regions are selected such that the structure forms a zeroth order sub-wavelength grating that provides in-plane form birefringence. For example, in the wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 µm. Some examples of materials suitable for the first and/or second materials include air, organic dielectrics, inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides (e.g., $MgF_2$), sulphides and nitrides (e.g., silicon nitrides). Optionally, the first and/or second materials include a multi-layer stack. One method of fabricating an A-plate grating with multi-layer stack filled grooves includes etching out the grooves to provide the diffractive pattern, depositing a conformal multi-layer stack over the patterned substrate, polishing down the entire stack to provide the desired structure, and depositing any remaining layers/stacks). The use of multi-layer stacks advantageously allows the overall A-plate retardance dispersion profile to be tailored (e.g., to be achromatic over a broad wavelength band). While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

The first −C-plate grating element 580 includes an alternating index stack 581, to which index matching stacks 582 and 583 are coupled. Similarly, the second −C-plate grating element 585 includes an alternating index stack 586, to which index matching stacks 587 and 588 are coupled. Each of the alternating stacks 581 and 586 are similar to stack 360. More specifically, each alternating stack 581 and 586 includes a first plurality of layers, each having a first refractive index and a first thickness, alternating with a second plurality of layers, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Suitable materials for the first and/or second layers include organic and inorganic dielectrics.

In each of the −C-plate and A-plate grating elements, the AR layers 583, 582, 588, and 587 are added at the interfaces to reduce material interface reflections. These AR coating layers serve as refractive index matching layers at interfaces with an abrupt index change. The AR coatings also provide an additional out-of-plane retardance component that should be factored in to the overall retardance and phase difference when the grating trim retarder is being manufactured. The optional an etch-stop stack 566 and cap-stack 567, each of which may include one or more layers, are typically required for a dielectric/air grid etched grating. Typically, the cap-layer will be coated by oblique evaporation so as not to substantially fill in the spaces between the walls. The glass substrate is typically a plane-parallel glass plate substrate, which for example, is about 1 mm thick. Alternatively, the substrate is fabricated from another transparent material that provides mechanical support.

The coherent cascade of elements 560 and 580, both of which are coupled to one side of the transparent substrate, forms an overall AR stack that advantageously provides a trim retarder that exhibits both in-plane and out-of-plane retardance, and hence is suitable for compensating for residual retardance of LCD panels, and in particular for LCD panels used in projection applications. The incoherent cascade of element 585 provides additional design flexibility and/or mechanical stability.

Furthermore since this full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Notably, while the first −C-plate grating element 580 is shown to be coupled coherently to the A-plate grating element 560 on the upper surface thereof, it is also possible for the −C-plate grating element 580 to be coherently coupled to the lower surface of the A-plate grating element 560 such that it is sandwiched between the A-plate grating element 560 and the substrate 590.

In each of the embodiments described with respect to FIGS. 11, 15, and 16, the full-function grating is manufactured by forming the A-plate grating and the −C-plate grating as separate elements. Alternatively, the full-function grating is manufactured so that the A-plate grating and −C-plate grating, at least in part, coincide (i.e., take up the same place in space).

Figure 17:
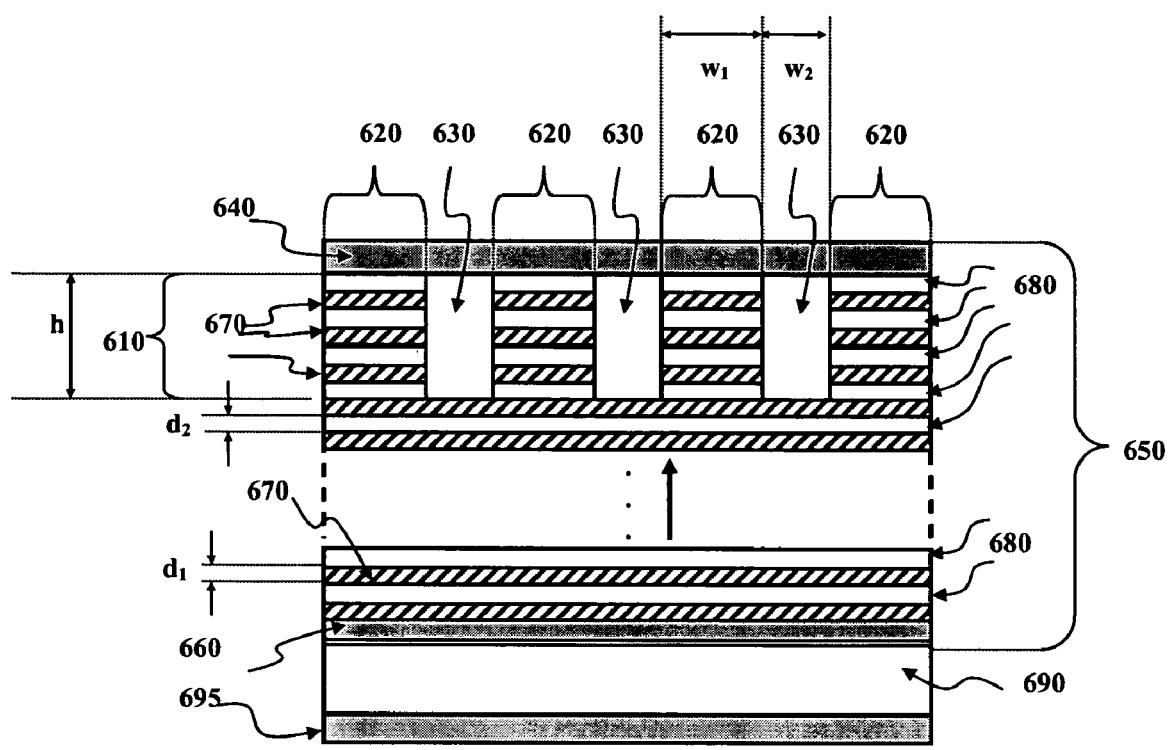
FIG. 17 is a schematic diagram of a full-function grating trim retarder in accordance with another embodiment of the instant invention, including a transversely-inhomogeneous (A-plate) form birefringent element co-located with an axially-inhomogeneous (−C-plate) form birefringent element, both disposed on a same side of a substrate.

Referring to FIG. 17, there is shown a full function A/−C-plate grating trim retarder in accordance with yet another embodiment of the instant invention. The full function A/−C-plate grating trim retarder 600 includes an A-plate grating 610, a −C-plate grating element 650, a transparent substrate 690, and an AR coating 695. More specifically, the A-plate grating 610 and a −C-plate grating element 650 overlap to form a homogeneous element that is disposed on a first surface of the transparent substrate 690, while the AR coating 695 is disposed on the second surface of the transparent substrate 690.

The A-plate grating 610 is a transversely-inhomogeneous, periodic index modulation element including a first plurality of regions 620, each having a first width $w_1$ and a first integral phase delay at normal incidence, interleaved with a second plurality of regions 630, each having a second width $w_2$ and a second integral phase delay at normal incidence. The widths $w_1$ and $w_2$ are selected such that the modulation element forms a zeroth order sub-wavelength grating that provides in-plane form birefringence. For example, in a wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

According to a preferred embodiment, the first 620 and second 630 plurality of regions are formed by etching the –C-plate grating element 650 (before providing the outer-surface AR coating 640) to form a plurality of grooves with depth, h. The grooves 630 are typically filled with air/atmosphere. Alternatively the grooves are filled (e.g., with another dielectric material), to reduce the index contrast of grating ridge 620 and grating groove 630, and thus reduce back reflections of the integrated A/–C-plate trim retarder.

The –C-plate grating element 650 includes an alternating index stack, and index matching stacks 640 and 660. The alternating index stack includes a first plurality of layers 670, each having a first refractive index and a first thickness, $d_1$, alternating with a second plurality of layers 680, each having a second refractive index and a second layer thickness, $d_2$. The material and layer thicknesses in each of the first 670 and second 680 plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Suitable materials for the first and/or second layers include organic and inorganic dielectrics. Some common examples of materials used to form thin film layers include $SiO_2$, $Al_2O_3$, $Ta_2O_5$, $Nb_2O_5$, $HfO_2$, $TiO_2$, niobia-tantala, niobia-titania, $MgF_2$, sulphides and silicon nitride.

The AR layers 640, 660 and 695 are added at the interfaces to reduce material interface reflections. These AR coating layers serve as refractive index matching layers at interfaces with an abrupt index change. The cap layer 640 optionally also serves as a protective layer. The AR coatings provide an additional out-of-plane retardance component that should be factored in to the overall retardance and phase difference when the grating trim retarder is being manufactured. The glass substrate is typically a plane-parallel glass plate substrate, which for example, is about 1 mm thick. Alternatively, the substrate is fabricated from another transparent material that provides mechanical support.

The overlapping cascade of elements 610 and 650, which is coupled to one side of the transparent substrate, forms an overall AR stack that advantageously exhibits both in-plane and out-of-plane retardance. More specifically, the sub-wavelength longitudinal index profile, including the alternating layers 670 and 680 in the first plurality of regions 620, gives rise to a form birefringent –C-plate component, whereas the sub-wavelength lateral index profile, including interleaving regions 620 and 630, gives rise to a form birefringent A-plate component. The un-patterned FBAR stack provides the remaining –C-plate retardance. In a VAN-mode LCoS light engine, the LC C-plate retardance often comes to $\lambda_o/2$ magnitude whereas the LC A-plate retardance relatively minuscule at about $\lambda_o/100$, where $\lambda_o$ is the nominal center wavelength. As a result, the A-plate grooves are typically a fraction of a micron thick (assuming a typical dielectric index of 1.50 and air binary grating) whereas the entire FBAR stack might be a few microns thick.

Advantageously, the fabrication of this full-function, homogeneous A/–C-plate trim retarder is relatively simple and requires a minimal number of materials. Furthermore since the resulting full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Figure 18:
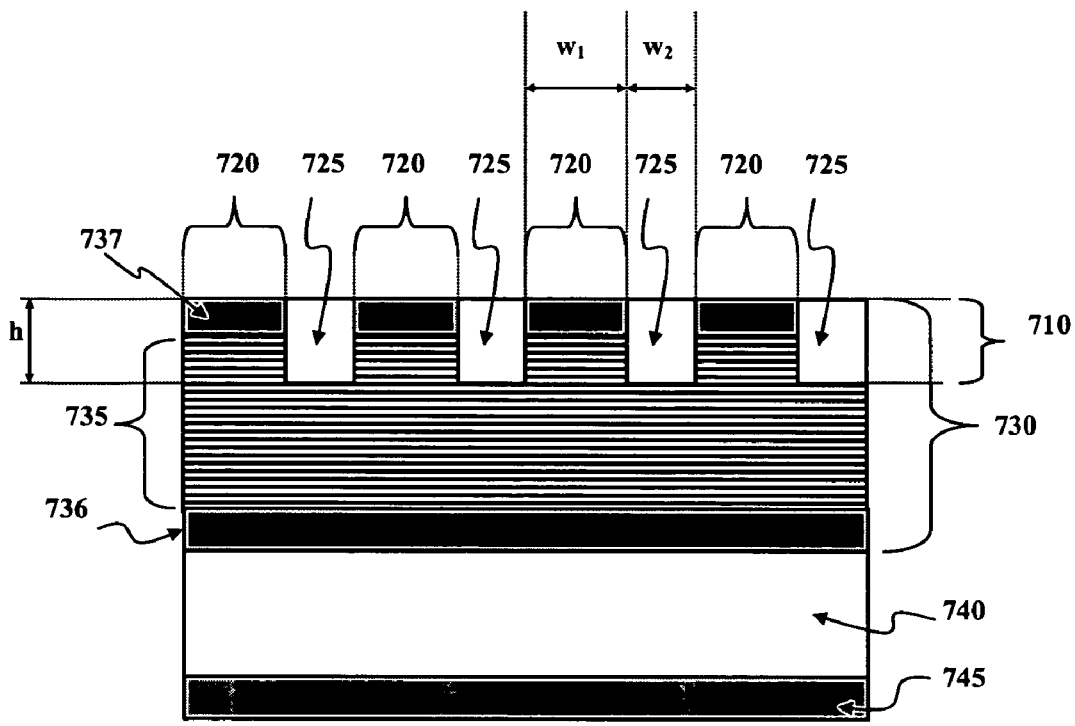
FIG. 18 is a schematic diagram of a full-function grating trim retarder in accordance with yet another embodiment of the instant invention, which is referred to as an etched FBAR, including a transversely-inhomogeneous (A-plate) form birefringent element co-located with an axially-inhomogeneous (−C-plate) form birefringent element, both disposed on a same side of a substrate.

Referring to FIG. 18, there is shown a full function A/–C-plate grating trim retarder in accordance with yet another embodiment of the instant invention. The full function A/–C-plate grating trim retarder 700 includes an A-plate grating element 710, a –C-plate grating element 730, a transparent substrate 740, and an AR coating 745. More specifically, the A-plate grating element 710 and the –C-plate grating element 730 overlap to form a homogeneous element that is disposed on a first surface of the transparent substrate 740, while the AR coating 745 is disposed on the second surface of the transparent substrate 740.

The A-plate grating element 710 is a transversely-inhomogeneous, periodic index modulation element including a first plurality of regions 720, each having a first width $w_1$ and a first integral phase delay at normal incidence, interleaved with a second plurality of regions 725, each having a second width $w_2$ and a second integral phase delay at normal incidence. The widths $w_1$ and $w_2$ are selected such that the modulation element forms a zeroth order sub-wavelength grating that provides in-plane form birefringence. For example, in a wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

According to a preferred embodiment, the first 720 and second 725 plurality of regions are formed by etching the −C-plate grating element 730 (after providing the outer-surface AR coating 737) to form a plurality of grooves with depth, h. Preferably, the desired effective indices of etched layers are taken into account when designing the AR-property of the FBAR stack. For example consider a typical FBAR stack, wherein the outer-most layer is $SiO_2$ (n=1.485) in a two-material low-high index system. With an $SiO_2$/air grid having a 50% duty cycle, the approximate effective extraordinary, ordinary indices and in-plane birefringence are:

$$n_e=1.1730, n_o=1.2659 \text{ and } \Delta n=-0.093. \quad (5)$$

Clearly, the large $\Delta n$ of a 50% duty cycle $SiO_2$/air dielectric grid provides high back reflectance, which is undesirable in ultra-high performance LCoS light engines. It is possible to fill in the air gaps with a second dielectric material such that the overall in-plane birefringence is reduced, however, the resultant effective uniaxial indices are likely to require additional AR coating to transition the A-plate grating to air. Both the filling of grating grooves and additional AR layers increases cost. Alternatively, the duty cycle ratio of the $SiO_2$/air grid is reduced or increased from 50:50. For example, a 20% $SiO_2$ pedestal width to grating pitch ratio gives the following approximate effective uniaxial properties:

$$n_e=1.0596, n_o=1.1140 \text{ and } \Delta n=-0.0544. \quad (6)$$

Since the in-plane birefringence is reduced, the resulting trim retarder is better for low reflectance applications.

The −C-plate grating element 730 is an FBAR element including an alternating index stack 735, and index matching stacks 736 and 737. The alternating index stack 735 is formed, for example, from a first plurality of layers, each having a first refractive index and a first thickness, alternating with a second plurality of layers, each having a second refractive index and a second layer thickness. The material and layer thicknesses in each of the first and second plurality of layers is selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ration between 20% and 80%, the layer thickness in each of the first and second plurality of layers is typically greater than about 1 nm and less than about 100 nm. While the alternating stack is discussed with only two different layer materials, it is also within the scope of the instant invention to use more than two different layer materials. Suitable materials for the first and/or second layers include organic and inorganic dielectrics. Some common examples of materials used to form thin film layers include $SiO_2$, $Al_2O_3$, $Ta_2O_5$, $Nb_2O_5$, $HfO_2$, $TiO_2$, niobia-tantala, niobia-titania, $MgF_2$, sulphides and silicon nitride.

The AR layers 737, 736 and 745 are added at the interfaces to reduce material interface reflections. These AR coating layers serve as refractive index matching layers at interfaces with an abrupt index change. The AR coatings provide an additional out-of-plane retardance component that should be factored in to the overall retardance and phase difference when the grating trim retarder is being manufactured. The glass substrate is typically a plane-parallel glass plate substrate, which for example, is about 1 mm thick. Alternatively, the substrate is fabricated from another transparent material that provides mechanical support.

The overlapping cascade of elements 710 and 730, which is coupled to one side of the transparent substrate, forms an overall AR stack that advantageously exhibits both in-plane and out-of-plane retardance. More specifically, the sub-wavelength longitudinal index profile, including the alternating layers 735 in the first plurality of regions 720, gives rise to a form birefringent −C-plate component, whereas the sub-wavelength lateral index profile, including interleaving regions 720 and 725, gives rise to a form birefringent A-plate component. The un-patterned FBAR stack provides the remaining −C-plate retardance. In a VAN-mode LCoS light engine, the LC C-plate retardance often comes to $\lambda_o/2$ magnitude whereas the LC A-plate retardance relatively minuscule at about $\lambda_o/100$, where $\lambda_o$ is the nominal center wavelength. As a result, the A-plate grooves are typically a fraction of a micron thick (assuming a typical dielectric index of 1.50 and air binary grating) whereas the entire FBAR stack might be a few microns thick.

Advantageously, the fabrication of this full-function, homogeneous A/−C-plate trim retarder is relatively simple and requires a minimal number of materials. Furthermore since the resulting full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Figure 19:
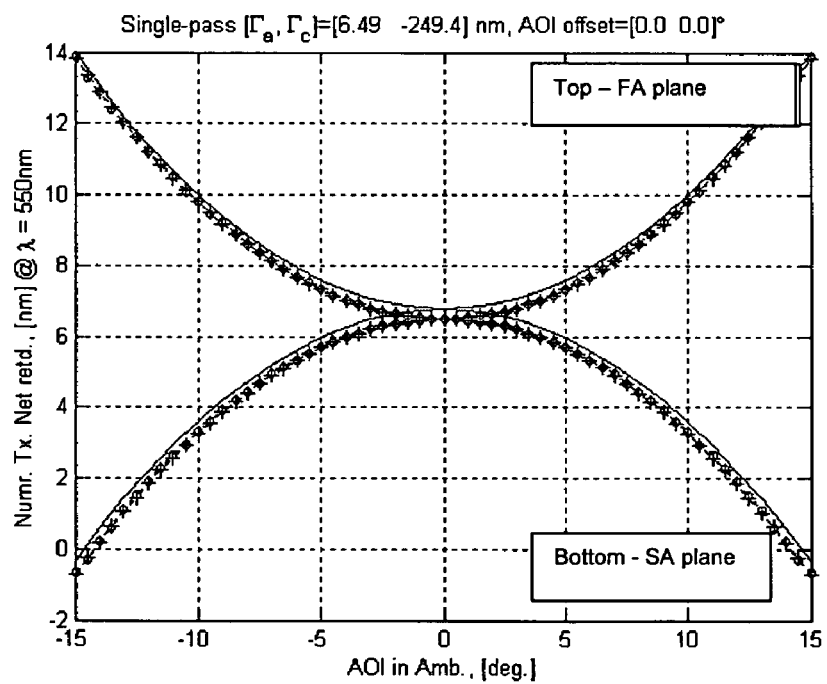
FIG. 19 shows the net retardance profiles along the effective slow-axis (bottom) and the effective fast-axis (top) of an etched FBAR coating, similar to that shown in FIG. 18, and modelled to provide a duty cycle of 20%, a height of 130 nm, and a period of 200 nm.
Figure 20:
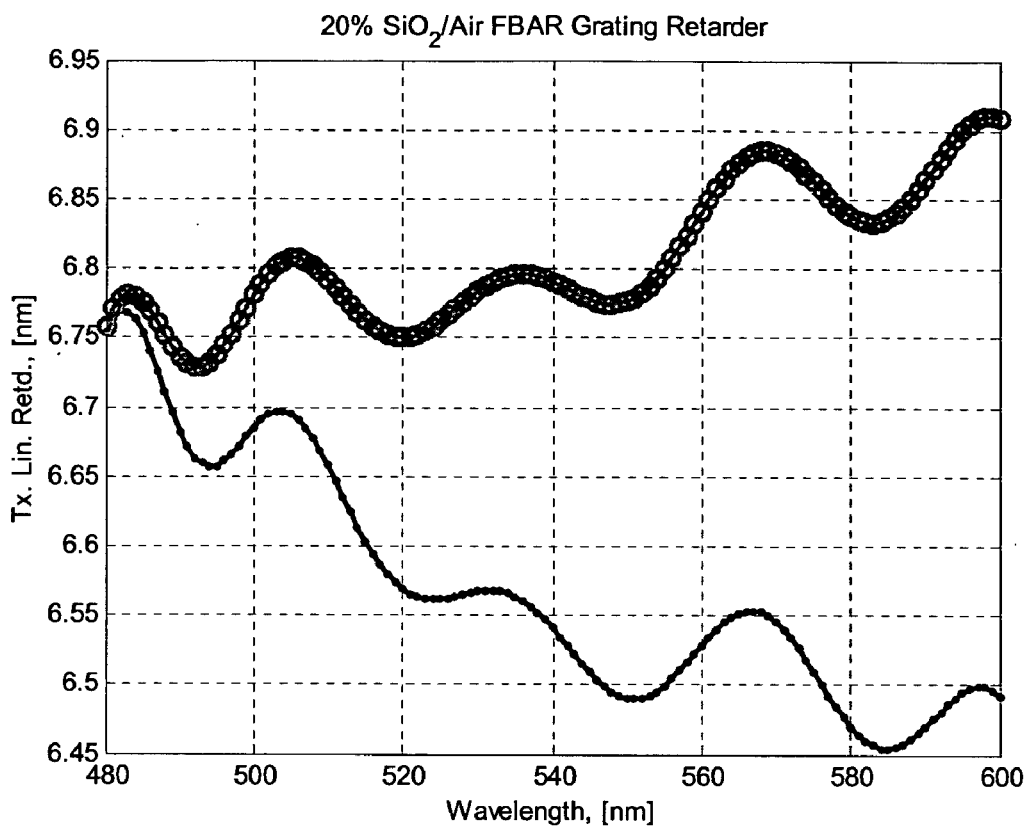
FIG. 20 shows the A-plate retardance of the etched FBAR coating, designed with a nominal −C-retardance of −250 nm at $\lambda=550$ nm, calculated using GSolver (bottom dotted line) and as an EMT retardance (top 'o' line)

The results of an off-axis and on-axis evaluation of a full-function A/−C-plate retarder, similar to that described with reference to FIG. 18, are plotted in FIG. 19 and FIG. 20, respectively. An FBAR design, targeting a nominal −C-retardance of −250 nm @$\lambda$=550 nm, produces slow-axis (SA) plane and fast-axis (FA) plane net retardance profiles as shown in FIG. 19. The 'crosses' are net retardance profiles along the effective slow-axis (trending to negative values, also the grid direction) and the effective fast-axis (trending to positive values, also the grating vector), whereas the thin solid lines are the thin-film interference modeled results with the A-plate grating layer represented by the effective uniaxial indices. In the interference thin-film model, the outer-most $SiO_2$/air grating has been represented by the effective-medium theory (EMT) effective uniaxial indices with a duty cycle of 20%. These retardance profiles closely match those produced by GSolver, with the exception of on-axis retardance. The A-plate grating has a perfect rectangular modulation profile with a 20% $SiO_2$ duty cycle, a period width of 200 nm, and a pedestal height of 130 nm. Over the design band of 490 nm to 590 nm wavelengths, the errors of the on-axis retardance incorporating an EMT layer model with respect to the on-axis retardance of GSolver calculation are less than 0.5 nm over the required wavelength band. These errors are given by the differences in the two plots in FIG. 20.

Figures 21A, 21B:
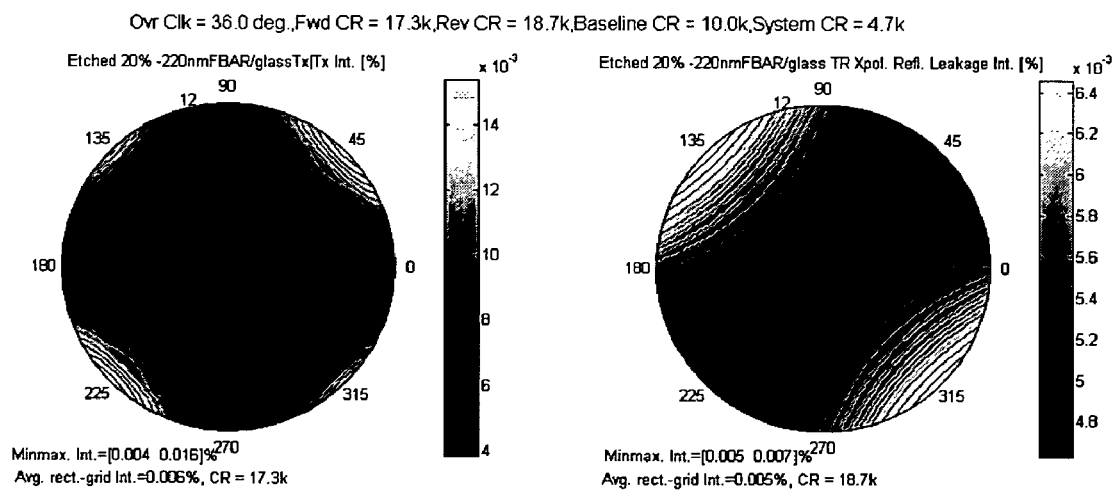
FIG. 21a shows compensation leakage intensities of a cascade of the etched FBAR trim retarder and a VAN-mode LCoS panel, and more specifically, shows the double-pass forward leakage vs. viewing angles.
FIG. 21b shows compensation leakage intensities of a cascade of the etched FBAR trim retarder and a VAN-mode LCoS panel, and more specifically, shows the back reflection leakage of the trim retarder alone vs. viewing angles.

An all-dielectric grating trim retarder, with the top-layer of the FBAR coating etched leaving a 20% $SiO_2$ to period fraction, has been modeled for cone illumination. The grating layer is represented by the zeroth order EMT indices. This allows for the numerical device to be evaluated with a 4×4-matrix calculation routine. The trim retarder has been designed with an approximately 6.5 nm/−220 nm A/−C-plate retardance. The LCoS is represented by a 2 nm/250 nm A/C-retardance, given by a 84.5° out-of-plane LC director tilt. The simulation has been conducted over a ±12° cone in air (f/2.4 system) with the cone axis aligned parallel to the device normal of both the trim retarder compensator and LCoS stages. The LCoS layer has $n_o$ and $n_e$ indices of 1.50 and 1.65 at λ=550 nm, respectively. This trim retarder compensates for both the in-plane and out-of-plane residual retardance of the VAN-LCoS. The double-pass transmitted crossed polarization leakage (through both the trim retarder and LCoS stages, termed forward leakage here) has been modeled at less than 0.006%, averaged over the cone at a single wavelength. This gives a forward contrast ratio of 17,300:1. Without regard to the light component that is transmitted through the trim retarder in the first pass, the reflection leakage (of the trim retarder stage only, termed reverse leakage here) limits the overall contrast ratio to 18,700:1. In addition, other optical elements (such as polarizers, PBS etc) in the light engine determine the best baseline contrast that is achievable. For a well designed light engine, this baseline contrast ratio might be 10,000:1. Taking an incoherent sum of the conoscopic forward, reverse and baseline leakages, the conoscopic system contrast has been estimated at 4,700:1, using an etched FBAR as the trim retarder, over-clocked by approximately 36° from the crossed axes orientation. The forward and reverse leakage cones are plotted in FIGS. 21(a) and 21(b), respectively.

The system baseline contrast is the cone-weighted photopic contrast ratio of the optical system when the trim retarder is removed from its typical location and the panel is replaced by a high quality mirror for off-state and mirror-quarterwave plate combination for the on-state. This baseline quantity measures the off-axis leakage light of the crossed polarizers and polarization beam splitters. The on-axis polarization contrast of the pre-polarizers and clean-up polarizers can be obtained from published WGP data. Assuming that the WGP is only used as a beam-splitting device and both the pre- and clean-up polarizers are made of dichroic sheets, the polarization contrast of the light that is incident on the trim retarder is approximately given by the product of WGP transmitted polarization contrast and dichroic transmitted polarization contrast: 450×1000. In the return pass, the WGP reflection is significantly poorer in polarization contrast, giving a 30×1000 on-axis polarization contrast for the crossed analyzer. These two polarization extinction ratios (inverse of polarization contrast) are utilized as Jones vectors for the input polarizer and output analyzer in the 4×4 matrix model. The off-axis effects of the crossed polarizers are taken into account by the system baseline contrast.

Figure 22:
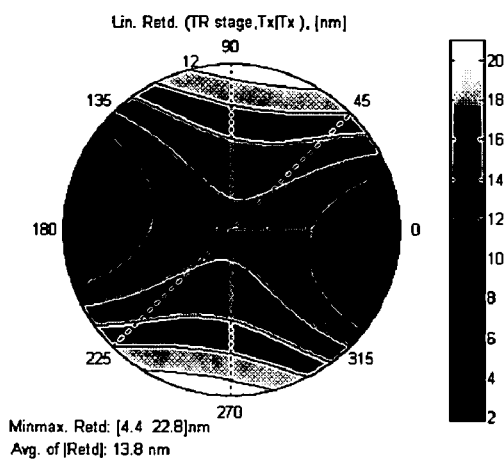
FIG. 22a is a linear retardance map showing the double-pass net retardance of the etched FBAR vs. viewing angles.
FIG. 22b is a linear retardance map showing the double-pass net retardance of the VAN-mode LCoS model having 2/250 nm A/−C-plate retardance.
Figure 22B:
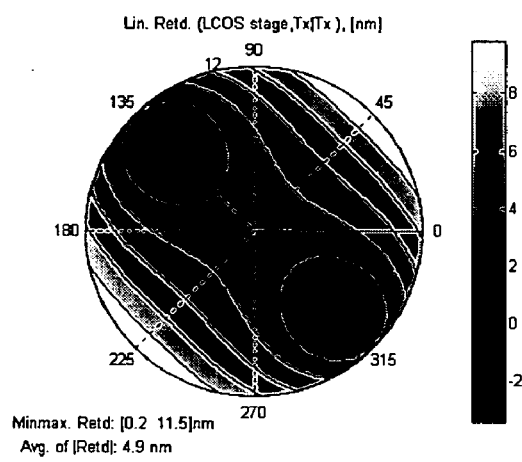
Figure 23:
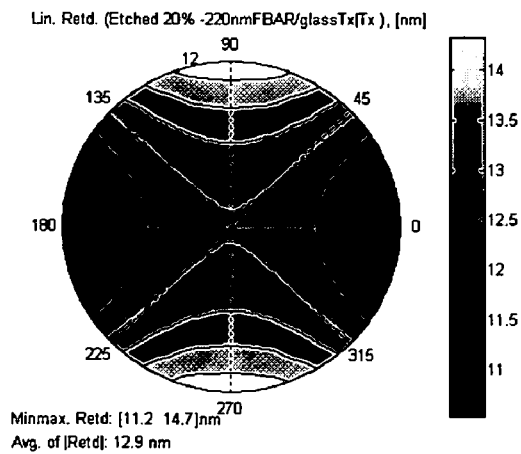
FIG. 23a is a linear retardance map showing the double-pass residual retardance components of a two-stage etched FBAR/BBAR and VAN-model LCoS panel (i.e., shows the system net retardance)
FIG. 23b shows the slow axis orientation the two-stage etched FBAR/BBAR and VAN-model LCoS panel.
Figure 23B:
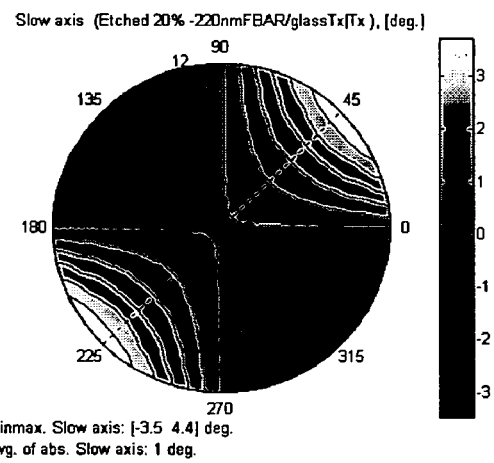

The double-pass transmitted retardance maps of the trim retarder (TR) and LCoS stages are depicted in FIGS. 22(a) and (b), respectively. The slow-axis of the LCoS device is aligned at 45°/−135° viewing plane. Along this slow-axis plane, the net retardance increases away from normal incidence due to +C-plate effects. Conversely, the net retardance of the TR slow-axis plane retardance (along −9°/171° viewing plane) decreases away from normal incidence due to −C-plate effects. The combination of these two retardance maps, along with their associated retarder axis maps, gives very low leakage cone intensity. Combining the TR and LCoS stages incoherently gives a system net retardance and axis orientation as shown in FIGS. 23(a) and (b). The projection system is left with approximately twice the TR retardance with the resultant retarder axis substantially parallel to the system principal (i.e., 'S' and 'P') planes. The system has been modeled to have an average axis deviation of approximately 1° from the principal planes.

Figure 24:
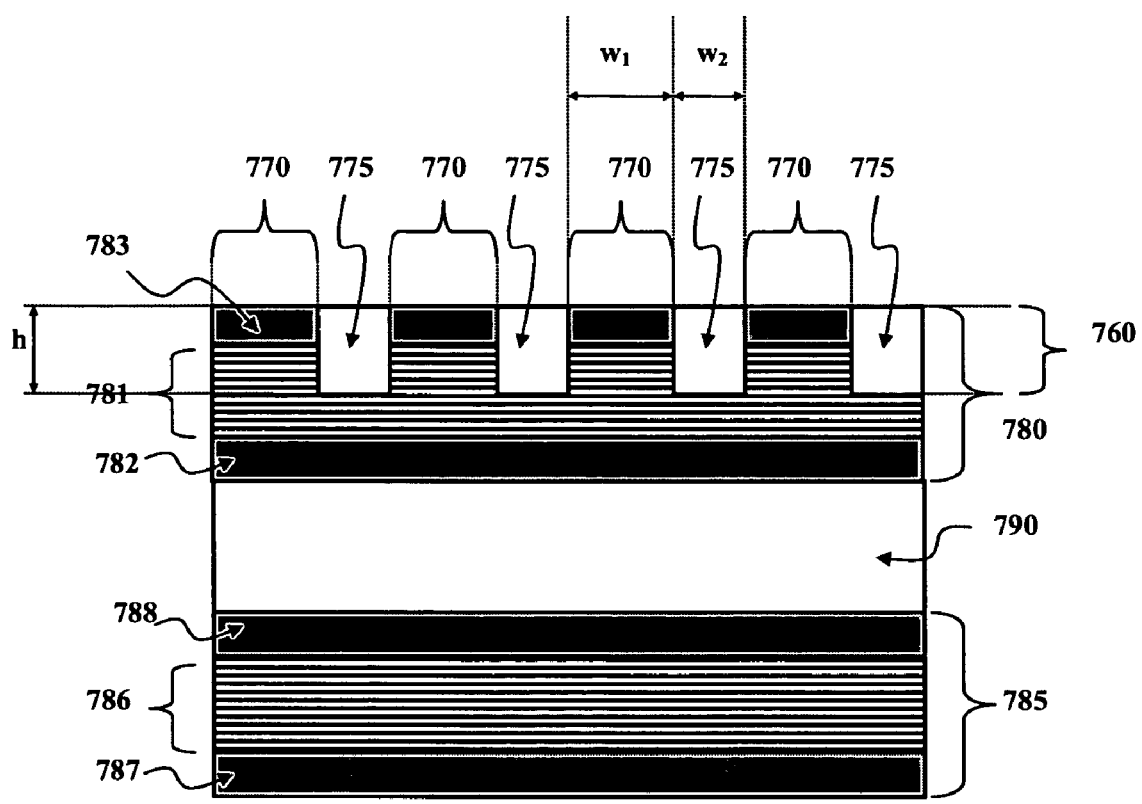
FIG. 24 is a schematic diagram of a full-function grating trim retarder in accordance with another embodiment of the instant invention, which is termed an etched BBAR when the upper alternating stack is a broad-band AR coating.

Referring to FIG. 24, there is shown a full function A/−C-plate grating trim retarder in accordance with yet another embodiment of the instant invention. The full function A/−C-plate grating trim retarder 750 includes an A-plate grating element 760, a first −C-plate grating element 780, a transparent substrate 790, and second −C-plate grating element 785. More specifically, the A-plate grating element 760 and first −C-plate grating element 780 overlap to form a homogeneous element that is disposed on a first surface of the transparent substrate 790, while the second −C-plate grating element 785 is coupled (incoherently) on the second surface of the transparent substrate 790.

The A-plate grating element 760 is a transversely-inhomogeneous, periodic index modulation element including a first plurality of regions 770, each having a first width $w_1$ and a first integral phase delay at normal incidence, interleaved with a second plurality of regions 775, each having a second width $w_2$ and a second integral phase delay at normal incidence. The widths $w_1$ and $w_2$ are selected such that the modulation element forms a zeroth order sub-wavelength grating that provides in-plane form birefringence. For example, in a wavelength range of 380 nm to 800 nm, and for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

According to a preferred embodiment, the first 770 and second 775 plurality of regions are formed by etching the −C-plate grating element 650 (after providing the outer-surface AR coating 783) to form a plurality of grooves with depth, h. Preferably, the desired effective indices of etched layers are taken into account when designing the AR-property of the FBAR stack. The grooves 775 will typically be filled with air, another gas, or are under vacuum. Alternatively, the grooves are filled with another dielectric material such that the overall in-plane birefringence is reduced. Optionally, the overall in-plane birefringence is reduced by reducing or increasing the duty cycle ratio from 50:50.

The first −C-plate grating element 780 is an FBAR element including an alternating index stack 781, and index matching stacks 782 and 783. The alternating index stack 781 is formed, for example, from a first plurality of layers, each having a first refractive index and a first thickness, alternating with a second plurality of layers, each having a second refractive index and a second layer thickness.

Similarly, the second −C-plate grating element 785 is an FBAR element including an alternating index stack 786, and index matching stacks 787 and 788. The alternating index stack 786 is formed, for example, from a first plurality of layers, each having a first refractive index and a first thickness, alternating with a second plurality of layers, each having a second refractive index and a second layer thickness.

The material and layer thicknesses in each of the first and second plurality of layers, for each of the first 780 and second 785 –C-plate grating elements, are selected such that each structure forms a zeroth order sub-wavelength grating that provides negative out-of-plane form birefringence. In general, each of the first and second plurality of layers, for each of the first 780 and second 785 –C-plate grating elements, will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. The layer thickness in each of the first and second plurality of layers, for each of the first 780 and second 785 –C-plate grating elements, is typically greater than about 1 nm and less than about 100 nm. The duty cycle is typically between 5% and 95%, and more typically between about 20% and 80%. While the alternating stack is discussed with only two different layer materials, it is also within the scope of the instant invention to use more than two different layer materials. Suitable materials for the first and/or second layers include organic and inorganic dielectrics. The first 780 and second 785 –C-plate grating elements will be fabricated from the same materials or different materials. Some common examples of materials used to form thin film layers include $SiO_2$, $Al_2O_3$, $Ta_2O_5$, $Nb_2O_5$, $HfO_2$, $TiO_2$, niobia-tantala, niobia-titania, $MgF_2$, sulphides and silicon nitride.

The AR layers 783, 782, 788, and 787 are added at the interfaces to reduce material interface reflections. These AR coating layers serve as refractive index matching layers at interfaces with an abrupt index change. The AR coatings provide an additional out-of-plane retardance component that should be factored in to the overall retardance and phase difference when the grating trim retarder is being manufactured. The glass substrate is typically a plane-parallel glass plate substrate, which for example, is about 1 mm thick. Alternatively, the substrate is fabricated from another transparent material that provides mechanical support.

The overlapping cascade of elements 760 and 780, which is coupled to one side of the transparent substrate, forms an overall AR stack that advantageously exhibits both in-plane and out-of-plane retardance. More specifically, the sub-wavelength longitudinal index profile, including the alternating layers 781 in the first plurality of regions 770, gives rise to a form birefringent –C-plate component, whereas the sub-wavelength lateral index profile, including interleaving regions 770 and 775, gives rise to a form birefringent A-plate component. The un-patterned FBAR stack in the first –C-plate grating element 780 and in the second –C-plate grating element 785 provide the remaining C-plate retardance.

Advantageously, the fabrication of this full-function, homogeneous A/–C-plate trim retarder is relatively simple and requires a minimal number of materials. Furthermore since the resulting full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance. Moreover, providing two incoherently coupled –C-plate elements 780 and 785 provides greater design flexibility and/or controls the coating stress exerted onto the transparent substrate 790.

In accordance with yet another embodiment of the instant invention, the first –C-plate grating element 780 is replaced with an ordinary broad-band AR coating (BBAR). In this case, the A-plate grating element 760 is etched into the BBAR coating and the A-plate grating element 760 and –C-plate grating element 785 are coupled incoherently. An inhomogeneous A/–C-plate retarder thus results.

Figure 25:
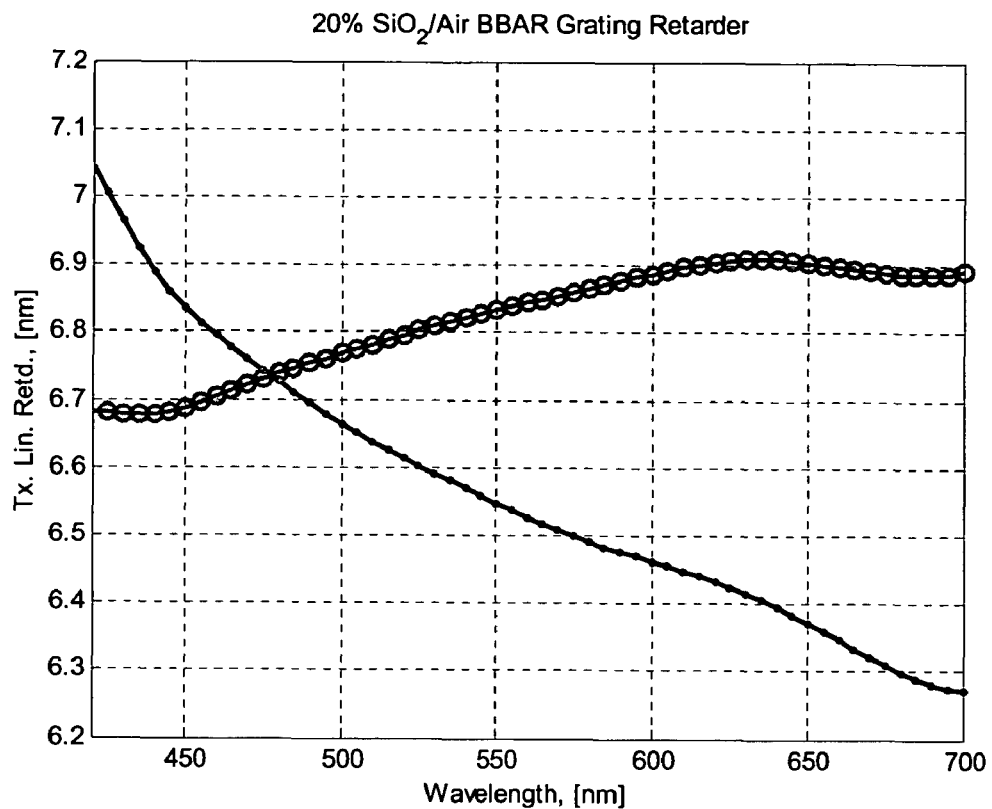
FIG. 25 shows the A-plate retardance of the etched BBAR coating calculated using GSolver (dotted line) and as an EMT retardance ('o' line), wherein the $SiO_2$/air dielectric grid has a duty cycle of 20%, a height of 130 nm, and a period of 200 nm.

The etched BBAR stack 780 has been modeled with GSolver. The in-plane retardance of the etched BBAR is plotted in FIG. 25 for the wavelength range of 420 to 700 nm. The A-plate grating has a perfect rectangular profile with a 20% $SiO_2$ duty cycle with a period width of 200 nm and a pedestal height of 130 nm. The on-axis retardance calculated using GSolver (dotted line) follows a normal dispersion trend, except at the very short wavelengths. Conversely, the interference model incorporating an EMT layer ('o' line) predicts an increasing in-plane Δnd product with increasing wavelengths. The retardance errors of the interference model compared to the GSolver model are less than 0.7 nm over the entire visible band, for a nominal 6.5 nm retarder at $\lambda=550$ nm.

Figures 26A, 26B:
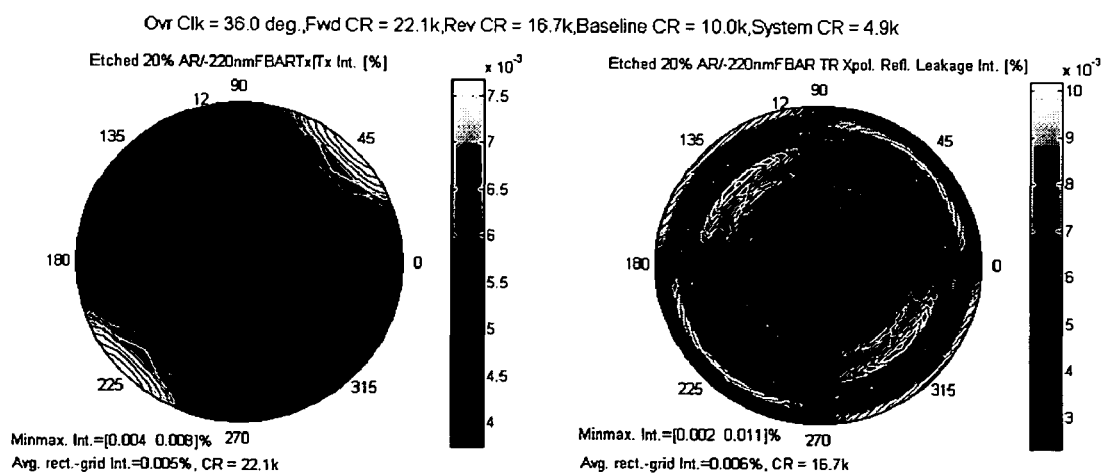
FIG. 26a shows compensation leakage intensities of a cascade of the etched BBAR/FBAR trim retarder and a VAN-mode LCoS panel, and more specifically, shows the double-pass forward leakage vs. viewing angles.
FIG. 26b shows compensation leakage intensities of a cascade of the etched BBAR/FBAR trim retarder and a VAN-mode LCoS panel, and more specifically, shows the back reflection leakage of the TR alone vs. viewing angles.

A grating retarder including an etched BBAR with a 20% $SiO_2$ duty cycle on a first glass surface and a suitable FBAR (with approx. –220 nm C-retardance) on the opposite glass surface, has been modeled for cone performance. The A-plate grating layer is represented by its EMT indices. The forward and reverse crossed polarization leakage intensities are plotted in FIGS. 26a and 26b, respectively. The forward contrast ratio comes to approx. 22,000:1 whereas the reverse contrast ratio is 16,700:1 at $\lambda=550$ nm. These results are on par with the etched FBAR grating retarder. The conoscopic reverse leakage shows some random errors, due to the use of a thick substrate (about 0.7 mm) as a coherent optical layer in the 4×4 simulation. The system contrast is estimated at 4,900:1, with a system baseline contrast ratio of 10,000:1.

Figure 27:
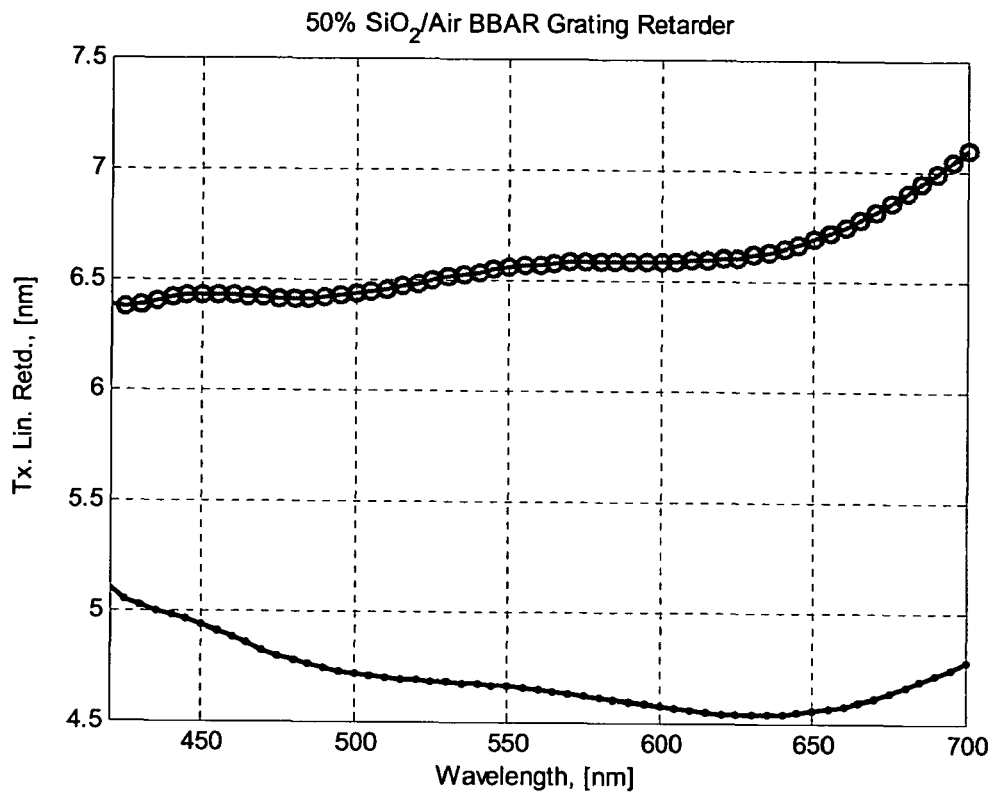
FIG. 27 shows the A-plate retardance of the etched BBAR coating calculated using GSolver (dotted line) and as an EMT retardance ('o' line), wherein the $SiO_2$/air dielectric grid has a duty cycle of 50%, a height of 65 nm, and a period of 200 nm.

Whilst both simulation examples of 20% $SiO_2$ etched dielectric grid retarders realized approximately 0.05 of in-plane birefringence (130 nm of physical grating thickness and 6.5 nm of retardance at $\lambda=550$ nm), the adverse effect of a large in-plane Δn can be modeled with a 50:50 $SiO_2$/air grid. The zeroth order EMT model predicts nearly doubled Δn for a 50% $SiO_2$/air grid compared to a 20% $SiO_2$/air grid (eq. 5). The 50% grid has been modeled with GSolver at normal incidence over the visible wavelength band. The on-axis retardance is plotted in FIG. 27 for both EMT 4×4 matrix ('o' line) and GSolver (dotted line) models. It is apparent that EMT model significantly over-estimates the realizable in-plane birefringence. The grating layer has a thickness of 65 nm. The EMT model predicts an on-axis retardance of approx. 6.5 nm, whereas the GSolver models gives only approx. 4.7 nm retardance at $\lambda=550$ nm. The effective in-plane Δn is thus –4.7/65 or –0.07.

Figures 28A, 28B:
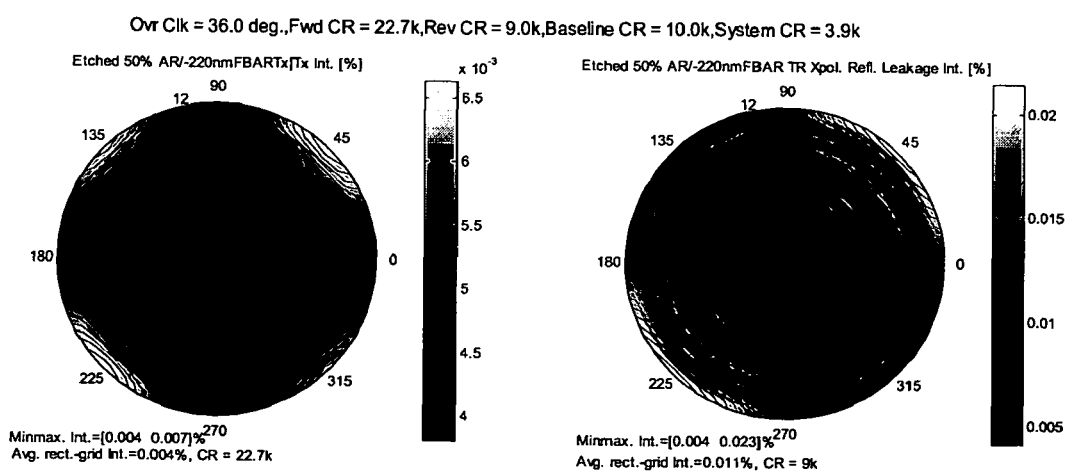
FIG. 28a shows compensation leakage intensities of a cascade of the etched BBAR/FBAR trim retarder and a VAN-mode LCoS panel, and more specifically, shows the double-pass forward leakage vs. viewing angles.
FIG. 28b shows compensation leakage intensities of a cascade of an etched BBAR/FBAR trim retarder and a VAN-mode LCoS panel, and more specifically, shows the back reflection leakage of the TR alone vs. viewing angles.

At an increase in-plane Δn, the results of conoscopic LCoS compensation are plotted in FIGS. 28(a) and 28(b), for the forward and reverse leakage, respectively. The first surface of the grating retarder has a 50% $SiO_2$/air grid on multi-layer AR stack and the second surface of the grating retarder is a regular FBAR coating, providing about –220 nm C-retardance. The forward contrast ratio is 22,700:1, rather similar to the 20% etched BBAR grating retarder. However, the reverse contrast is approximately halved to 9,000:1, when the effective in-plane Δn is increased from approx. –0.05 to approximately –0.07 with a duty cycle increase from 20% to 50%. As a result of the lower reverse contrast, the system contrast is estimated at 3,900:1, a 20% degradation over the 20% duty cycle $SiO_2$/air grid retarder.

Figure 29:
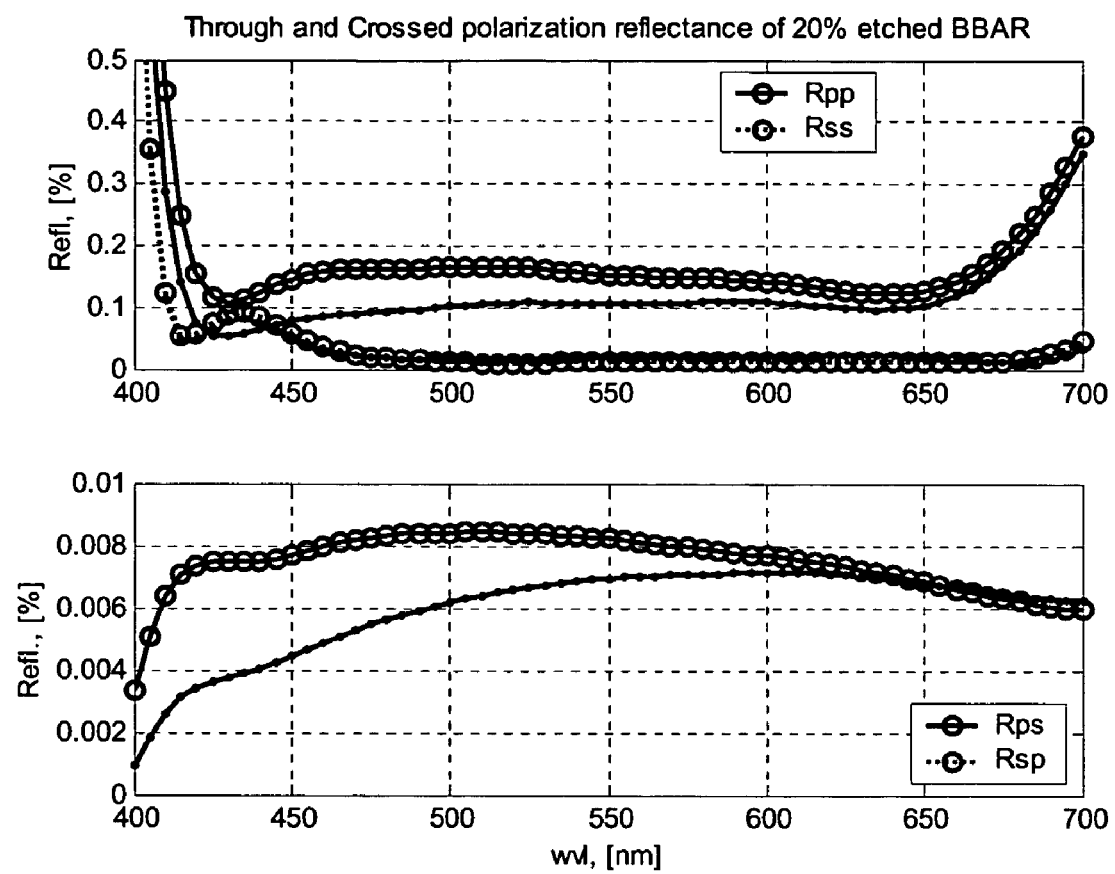
FIG. 29 illustrates normal incidence reflectance spectra of an etched BBAR having a $SiO_2$/air dielectric grid with a duty cycle of 20%, a height of 130 nm, and a period of 200 nm, the plots include through (Rpp and Rss) reflectance and crossed polarization (Rps and Rsp) reflectance spectra.
Figure 30:
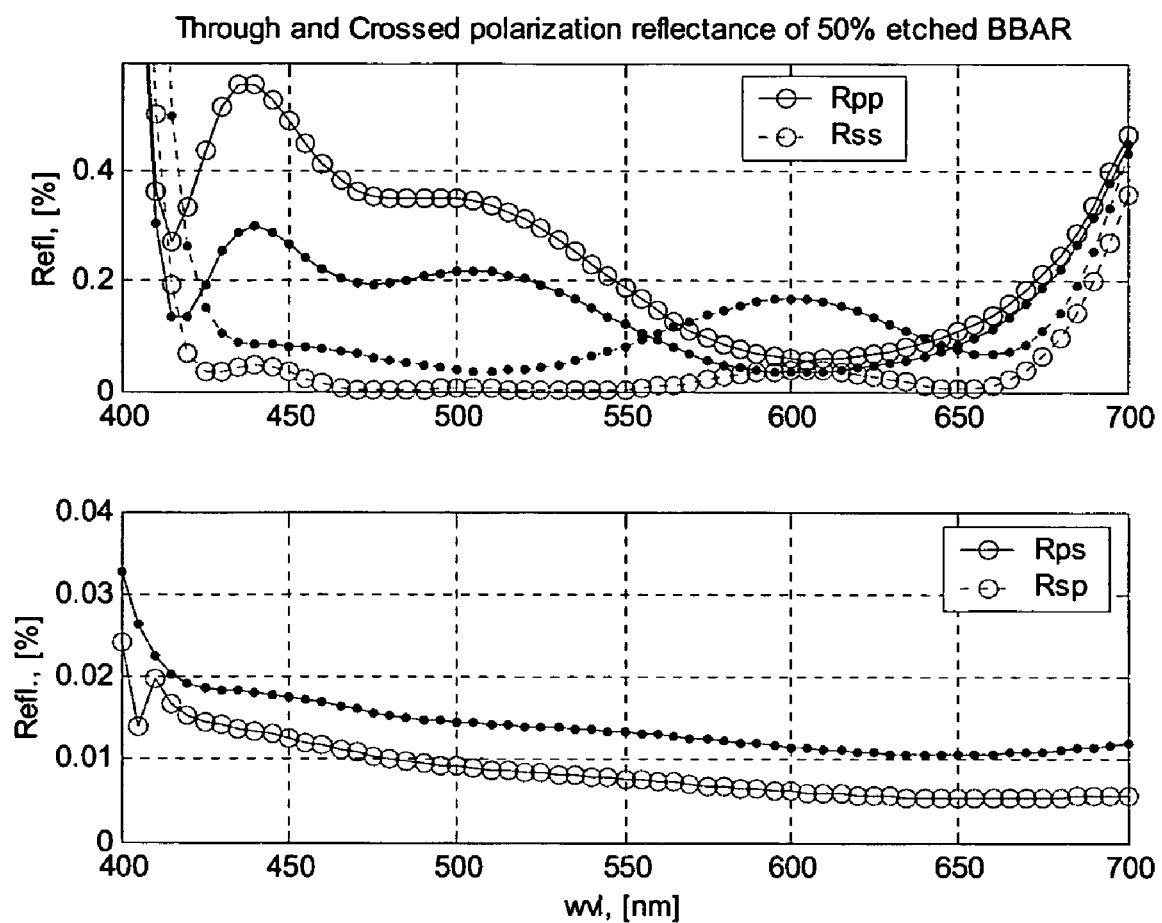
FIG. 30 illustrates normal incidence reflectance spectra of an etched BBAR having a $SiO_2$/air dielectric grid with a duty cycle of 50%, a height of 65 nm, and a period of 200 nm, the plots include through (Rpp and Rss) reflectance and crossed polarization (Rps and Rsp) reflectance spectra.

In estimating the conoscopic contrast performance of all three grating retarder examples, it has been assumed that the grating layer can be represented by an EMT model in a 4×4 matrix interference calculation. This assumption is approximately valid. The normal incidence reflectance spectra of both 20% and 50% $SiO_2$/air grid retarders are plotted in FIGS. 29 and 30, respectively. More specifically, the top part of FIG. 29 illustrates the through (Rpp and Rss) reflectance spectra, whereas the bottom part of FIG. 29 illustrates the crossed polarization (Rsp and Rps) reflectance spectra. Similarly, the top part of FIG. 30 illustrates the through (Rpp and Rss) reflectance spectra, whereas the bottom part of FIG. 30 illustrates the crossed polarization (Rsp and Rps) reflectance spectra. Notably, the crossed polarization spectra overlap exactly for both duty cycle ratios. GSolver results are plotted with 'o' markers whereas the results with an EMT interference model are plotted with '.' makers. The $SiO_2$/air dielectric grid has a duty cycle of 20%, a height of 130 nm and a period of 200 nm. It is apparent that the diffraction model (computed with GSolver) and a 4×4 matrix model (computed by representing the thin grating layer with EMT indices) produce similar reflectance trends. The crossed polarization leakage for these two grating retarders are approximately 8e-5 and 7e-4 at $\lambda$=550 nm, respectively, with ideal crossed polarizers. In practice, the presence of a cone of illumination and non-ideal crossed polarizers render the back reflection contrast of these two grating retarders at approximately 17,000:1 and 9,000:1, respectively.

Figure 31:
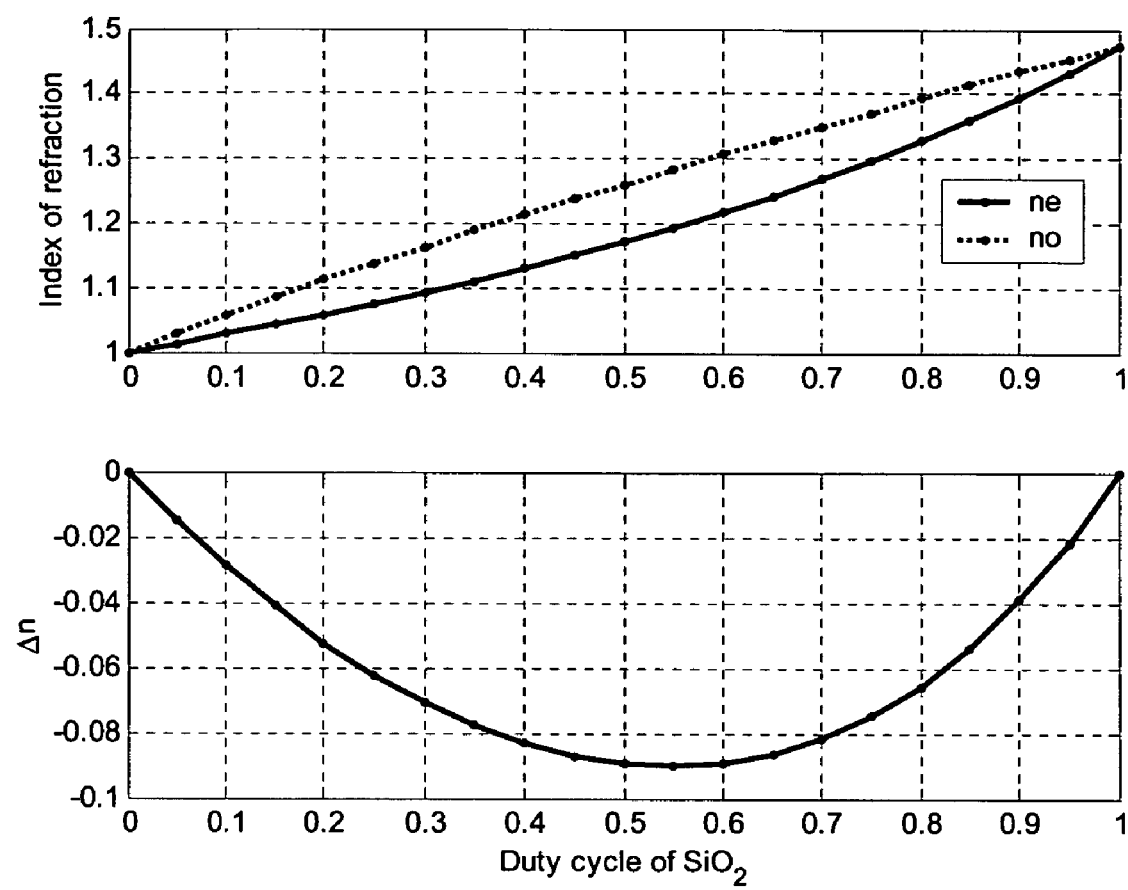
FIG. 31 shows the EMT indices (top) and birefringence (bottom) of a binary grating having $SiO_2$ and air as the constituent materials at the given duty cycle ratio.

It is expected that grating trim retarders having an effective in-plane birefringence of less than −0.02 are required to realize the highest contrast compensation. With a binary system of $SiO_2$ and air grid, the options of scaling the duty cycle ratio as a means of reducing the in-plane birefringence is limited. FIG. 31 shows an estimate of the effective in-plane birefringence according to the EMT model. The $SiO_2$ material has an index of 1.4747, at $\lambda$=550 nm. It is expected that a less than 10% dielectric duty cycle is required to obtain an effective $|\Delta n|$ of less than 0.02, for any dielectric/air grid with comparable index to $SiO_2$. This inevitably poses multiple trade-offs between the grid period, grid height and pedestal width (duty cycle ratio). In order to improve on the back reflection contrast limit (which caps the overall system contrast performance regardless of double-stage compensation efficacy), the in-plane birefringence has to be reduced further from that realized with a 20% $SiO_2$/air grid. One way of decreasing the effective EMT birefringence is to fill the grooves of etched $SiO_2$ layer with another dielectric material.

Figure 32:
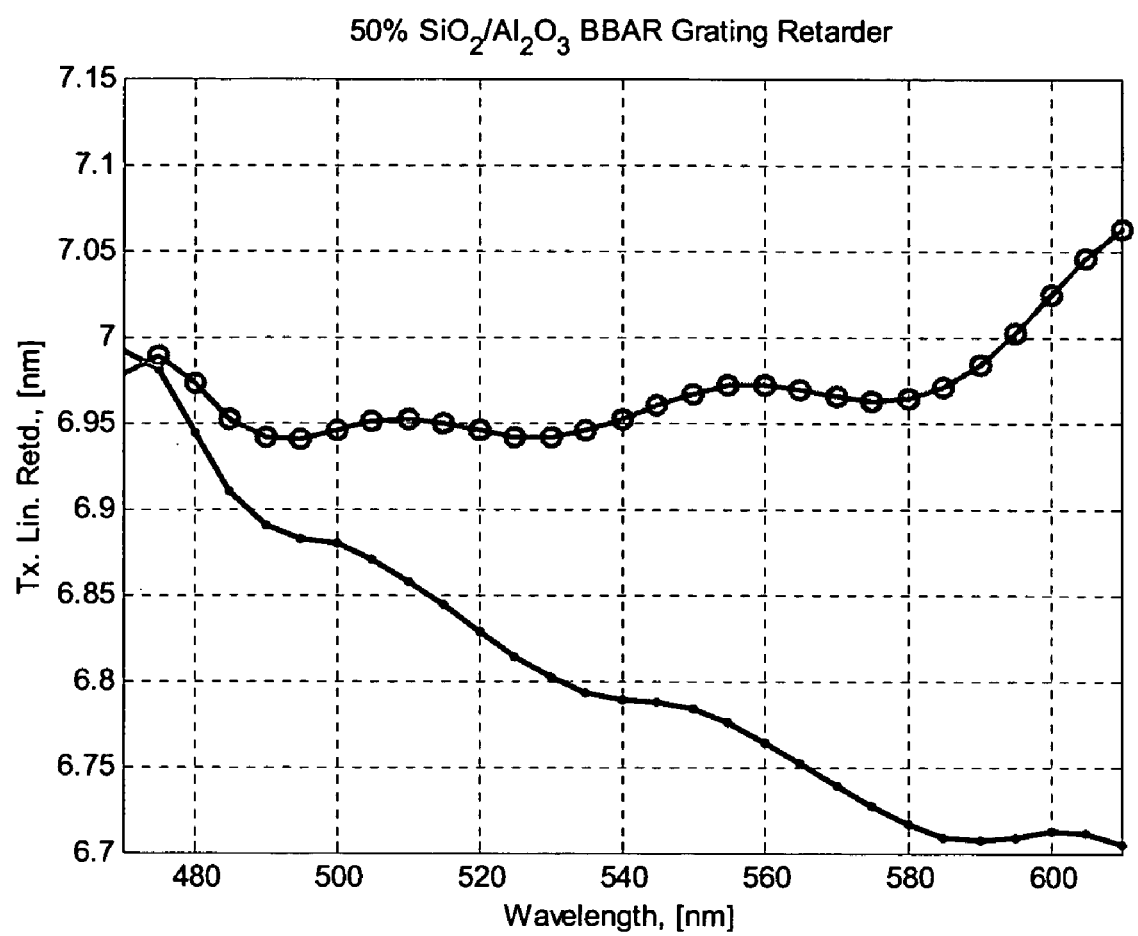
FIG. 32 shows the A-plate retardance of the etched BBAR coating calculated using GSolver (dotted line) and as an EMT retardance ('o' line), wherein the $SiO_2/Al_2O_3$ dielectric grid has a duty cycle of 50%, a height of 610 nm, and a period of 200 nm.
Figure 33:
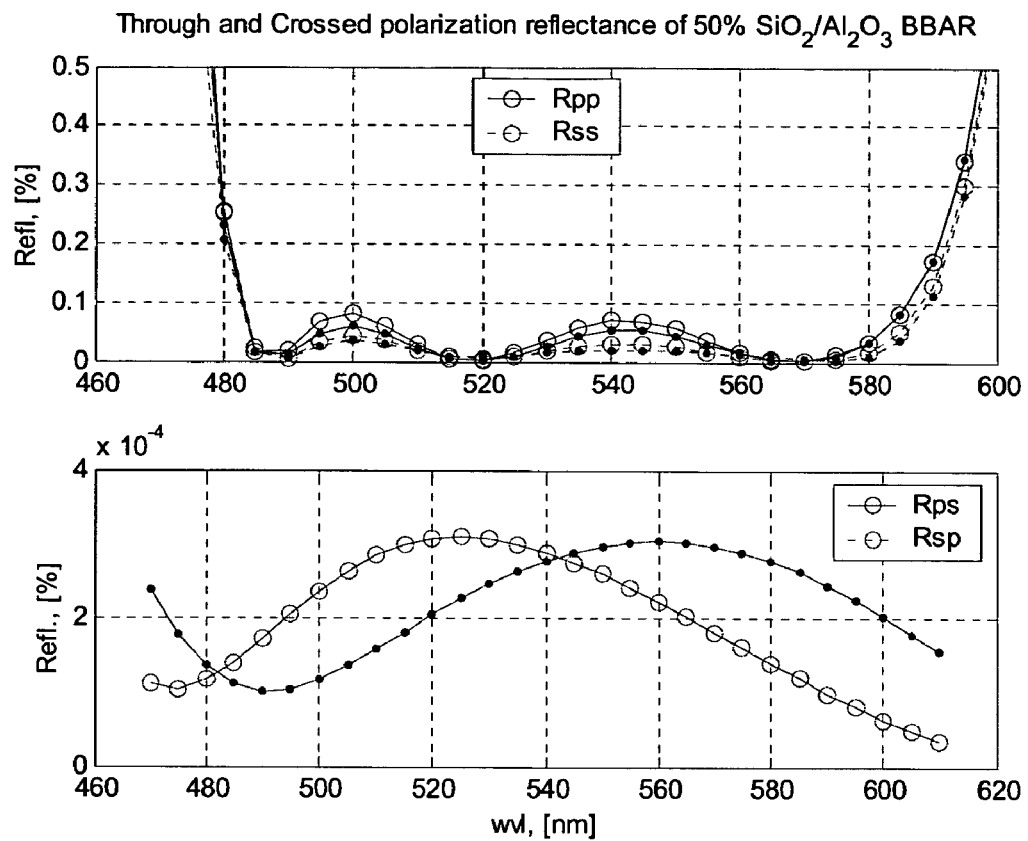
FIG. 33 illustrates normal incidence reflectance spectra of a BBAR including a buried $SiO_2/Al_2O_3$ dielectric grid having a duty cycle of 50%, a height of 610 nm, and a period of 200 nm, the plots include through (Rpp and Rss) reflectance and crossed polarization (Rps and Rsp) reflectance spectra.
Figures 34A, 34B:
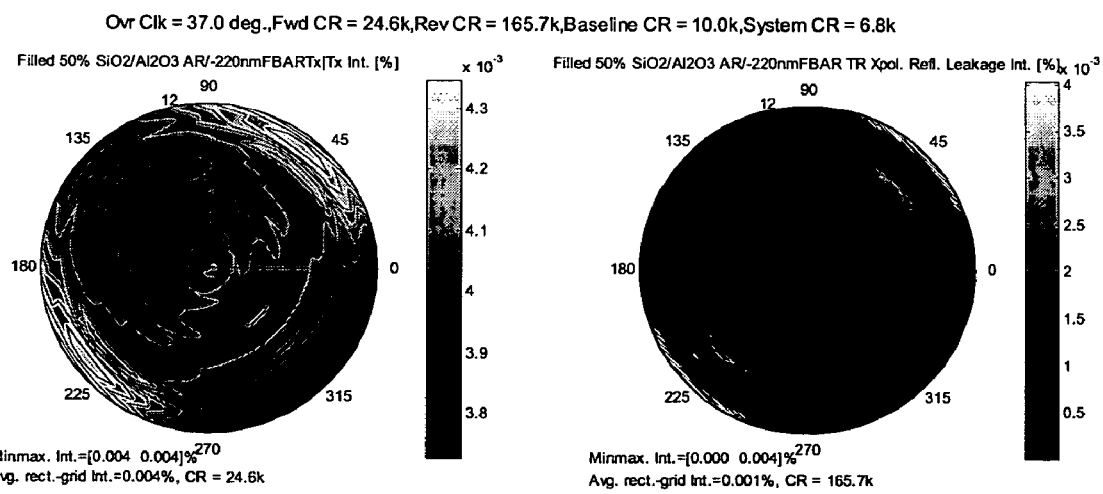
FIG. 34a shows compensation leakage intensities of a cascade of the etched $SiO_2/Al_2O_3$ BBAR/FBAR trim retarder and a VAN-mode LCoS panel, and more specifically, shows the double-pass forward leakage vs. viewing angles.
FIG. 34b shows compensation leakage intensities of a cascade of the etched $SiO_2/Al_2O_3$ BBAR/FBAR trim retarder and a VAN-mode LCoS panel, and more specifically, shows the back reflection leakage of the TR alone vs. viewing angles.

A binary material system formed with 50% of $SiO_2$ (with a nominal index of 1.4747 @$\lambda$=550 nm) and $Al_2O_3$ (with a nominal index of 1.6637 @$\lambda$=550 nm), and configured as an A-plate grating, has an effective in-plane birefringence of −0.0114. The GSolver model returned an in-plane retardance of ~6.8 nm with a 610 nm thick $SiO_2/Al_2O_3$ dielectric grid, giving an effective $\Delta n$ of −0.0111. The transmitted retardance spectrum of a BBAR with this dielectric grid is shown in FIG. 32. The on-axis crossed polarization leakage is estimated at 3e-6, more than an order of magnitude better than the unfilled 20% $SiO_2$/air grid. The normal incidence reflection leakage plot is shown in FIG. 33. More specifically, the top part of FIG. 33 illustrates the through (Rpp and Rss) reflectance spectra, whereas the bottom part of FIG. 33 illustrates the crossed polarization (Rsp and Rps) reflectance spectra. The crossed polarization spectra overlap exactly. GSolver results are plotted with 'o' markers, whereas the results with an EMT interference model are plotted with '.' makers. The $SiO_2/Al_2O_3$ dielectric grid has a duty cycle of 50%, a height of 610 nm and a period of 200 nm. The results of a two-stage TR/LCoS calculation under a cone illumination, using this filled grid retarder and the same LCoS model, are shown in FIGS. 34(a) and 34(b). Notably, this grating retarder has a $SiO_2/Al_2O_3$ dielectric grid buried in a broadband AR stack, similar to the embodiment 400 in FIG. 11. The FBAR stack, having −220 nm of C-retardance at $\lambda$=550 nm, is mounted on the second surface of the transparent substrate. The forward, reverse and overall system contrast ratios have been estimated at 24,600:1, 165,000:1 and 6,800:1, respectively. A full-color light engine having a baseline contrast of 10,000:1 will perform with approximately this green-channel contrast, 6,800:1, due to the photopic weighting.

Figure 35:
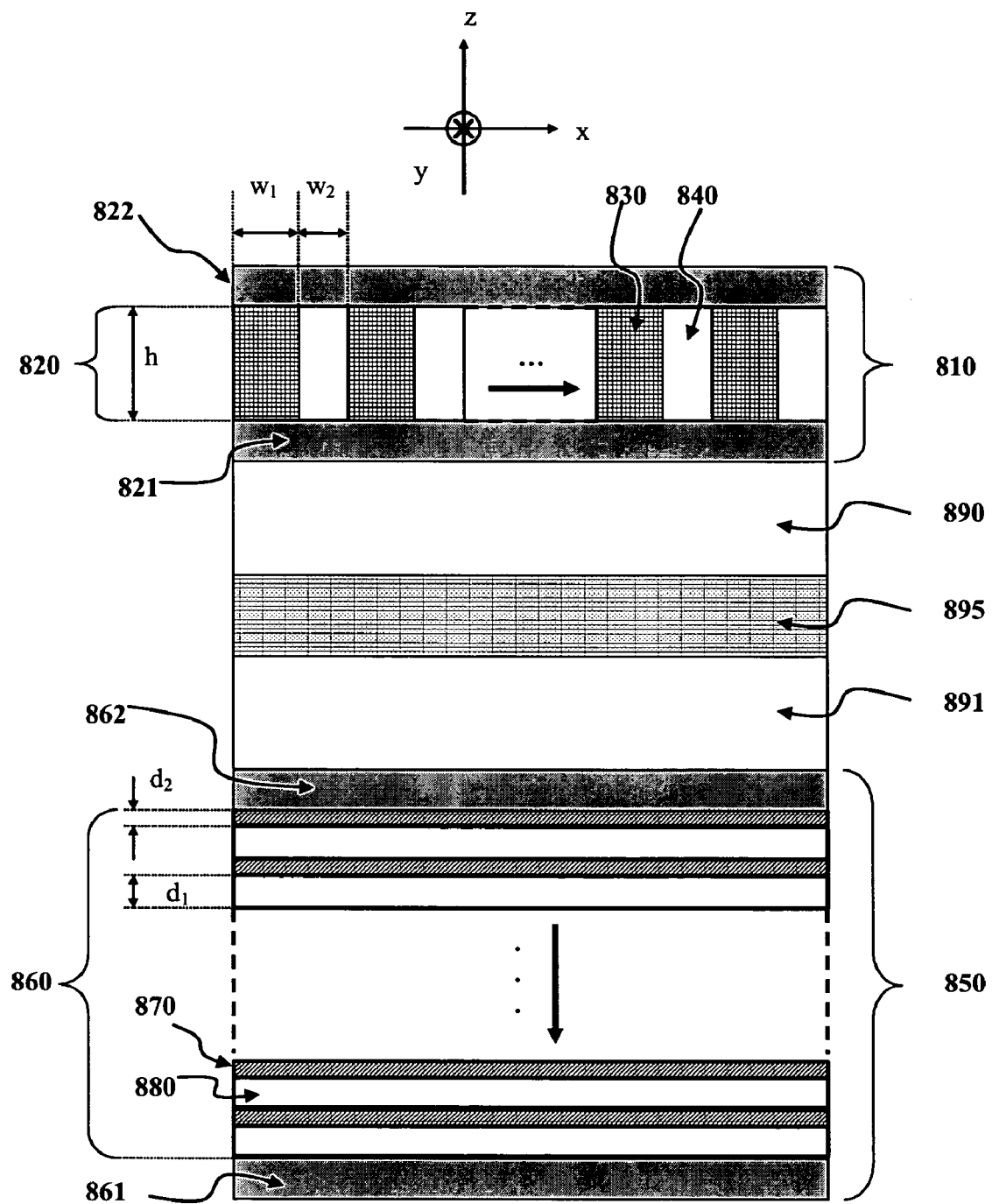
FIG. 35 is a schematic diagram of a full-function grating trim retarder in accordance with another embodiment of the instant invention, including an inhomogeneous cascade of transversely-inhomogeneous (A-plate) and axially-inhomogeneous (−C-plate) form birefringent elements in a laminated structure, each coated on a separate substrate.

Referring to FIG. 35, there is shown a full function A/−C-plate grating trim retarder in accordance with yet another embodiment of the instant invention. The full function A/−C-plate grating trim retarder 800 includes an A-plate grating element 810 disposed on a first transparent substrate 890 and a −C-plate grating element 850 disposed a second transparent substrate 891, each coupled to the other via a glue layer 895. More specifically, the A-plate grating element 810 and a −C-plate grating element 850 form a laminated structure.

The A-plate grating element 810 includes a transversely-inhomogeneous, periodic index modulation element 820, to which etch-stop stack 821 and optional outer-surface AR stack 822 are coupled. The periodic index modulation element 820 includes a first plurality of regions 830 interleaved with a second plurality of regions 840, wherein the width $w_1$ and $w_2$ and materials used for the first 830 and second 840 regions, respectively, are selected such that the structure forms a zeroth order sub-wavelength grating that provides in-plane form birefringence. For example, in a wavelength range of 380 nm to 800 nm, and for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. Some examples of materials suitable for the first and/or second materials include air, organic dielectrics, inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides (e.g., $MgF_2$), sulphides and nitrides (e.g., silicon nitrides). Optionally, the first and/or second materials include a multi-layer stack. One method of fabricating an A-plate grating including a multi-layer stack includes etching out a plurality of grooves to provide the diffractive pattern, depositing a conformal multi-layer stack over the patterned substrate, polishing down the entire stack to provide the desired structure, optionally depositing a capping layer, and depositing an outer surface AR stack. The use of multi-layer stacks advantageously allows the overall A-plate retardance dispersion profile to be tailored (e.g., to be achromatic over a broad wavelength band). While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

The −C-plate grating element 850 includes an axially-inhomogeneous, periodic index modulation element 860, to which index matching stacks 861 and 862 are coupled. The axially periodic structure 860 includes a first plurality of layers 870, each having a first refractive index and a first thickness, alternating with a second plurality of layers 880, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Suitable materials for the first and/or second layers include organic and inorganic dielectrics.

In each of the −C-plate and A-plate grating elements, the AR layers 822, 862, and 861 are added at the interfaces to reduce material interface reflections. These AR coating layers serve as refractive index matching layers at interfaces with an abrupt index change. The AR coatings also provide an additional out-of-plane retardance component that should be factored in to the overall retardance and phase difference when the grating trim retarder is being manufactured. Each glass substrate 890 and 891 is typically a plane-parallel glass plate substrate, which for example, is about 1 mm thick. Alternatively, each substrate is fabricated from another transparent material that provides mechanical support that provides mechanical support.

The incoherent cascade of elements 810 and 850, advantageously provides a compensating element that exhibits both in-plane and out-of-plane retardance, and hence is suitable for compensating for residual retardance of LCD panels, and in particular for LCD panels used in projection applications. Moreover, since the −C-plate grating does not possess an in-plane retarder axis, the resulting full-function trim retarder is not limited by lateral alignment errors.

Since the resulting full-function C/A trim retarder is readily manufactured entirely from isotropic materials (i.e., does not require molecularly birefringent materials), the range of suitable fabrication materials is relatively wide and it is possible to select the layer materials to tailor specific requirements. For example, to meet the strict requirements for the high-temperature, high-luminance environment (i.e., high flux) of polarization-based projection systems, the trim retarder is easily fabricated entirely from inorganic dielectric layers. Advantageously, the use of inorganic dielectric layers also allows the refractive indices to be selected to provide a low-reflectance trim retarder and/or to control crossed polarization reflectance.

Figure 1:
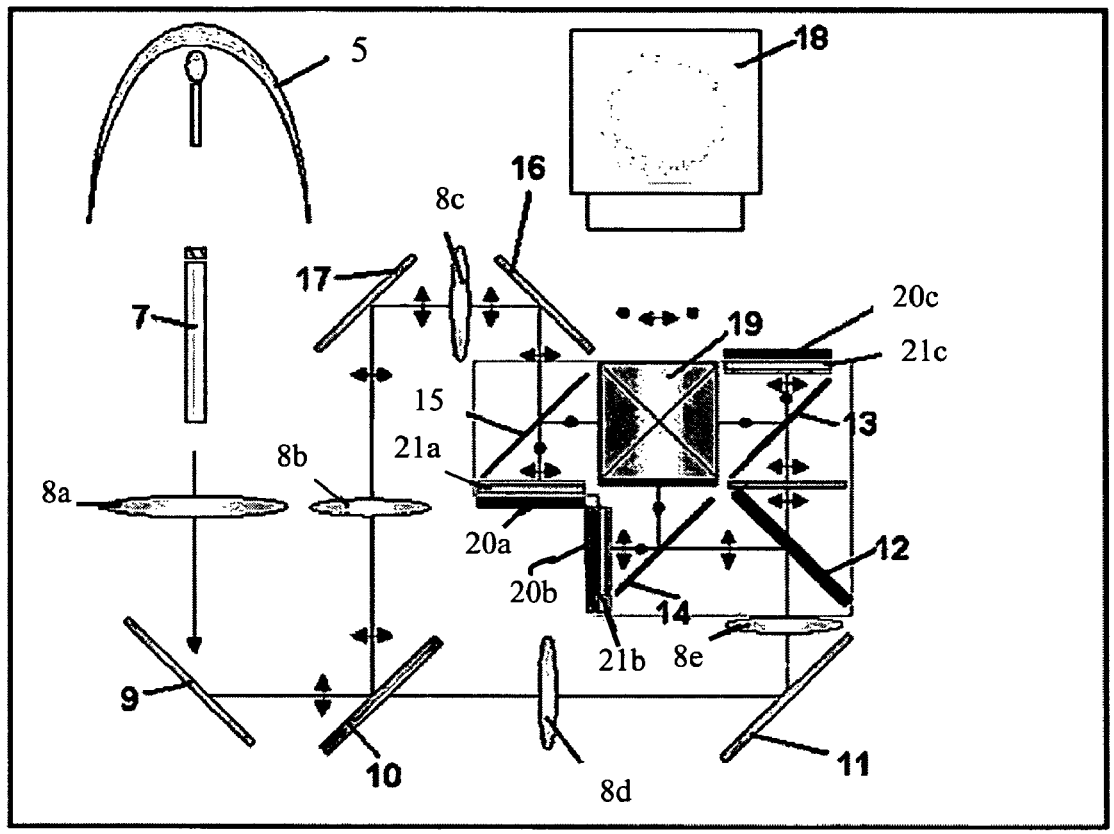
FIG. 1 is a schematic diagram of a prior art 3-panel wire-grid polarizer (WGP) based liquid crystal on silicon (LCoS) projection light engine.
Figure 2:
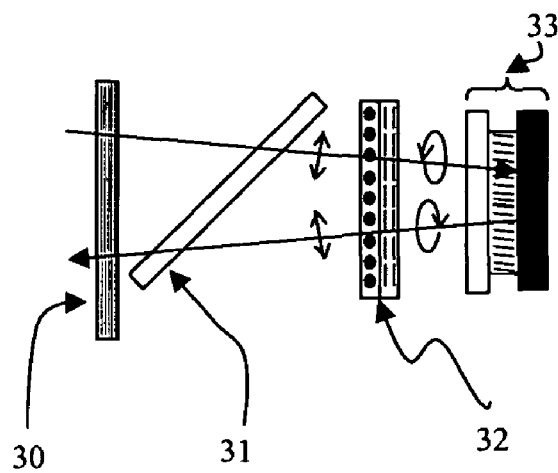
FIG. 2 illustrates the preservation of linear polarization on double passing through a LCoS panel and a trim retarder.

In a microdisplay projection system compensated with a discrete trim retarder element, as shown in FIG. 2, there are at least two redundant AR-coated surfaces. The need for these AR coatings (i.e., one on the trim retarder and one on the display panel, each facing the other) is obviated by making the trim retarder assembly part of the LCoS or xLCD cover substrate.

Figure 36:
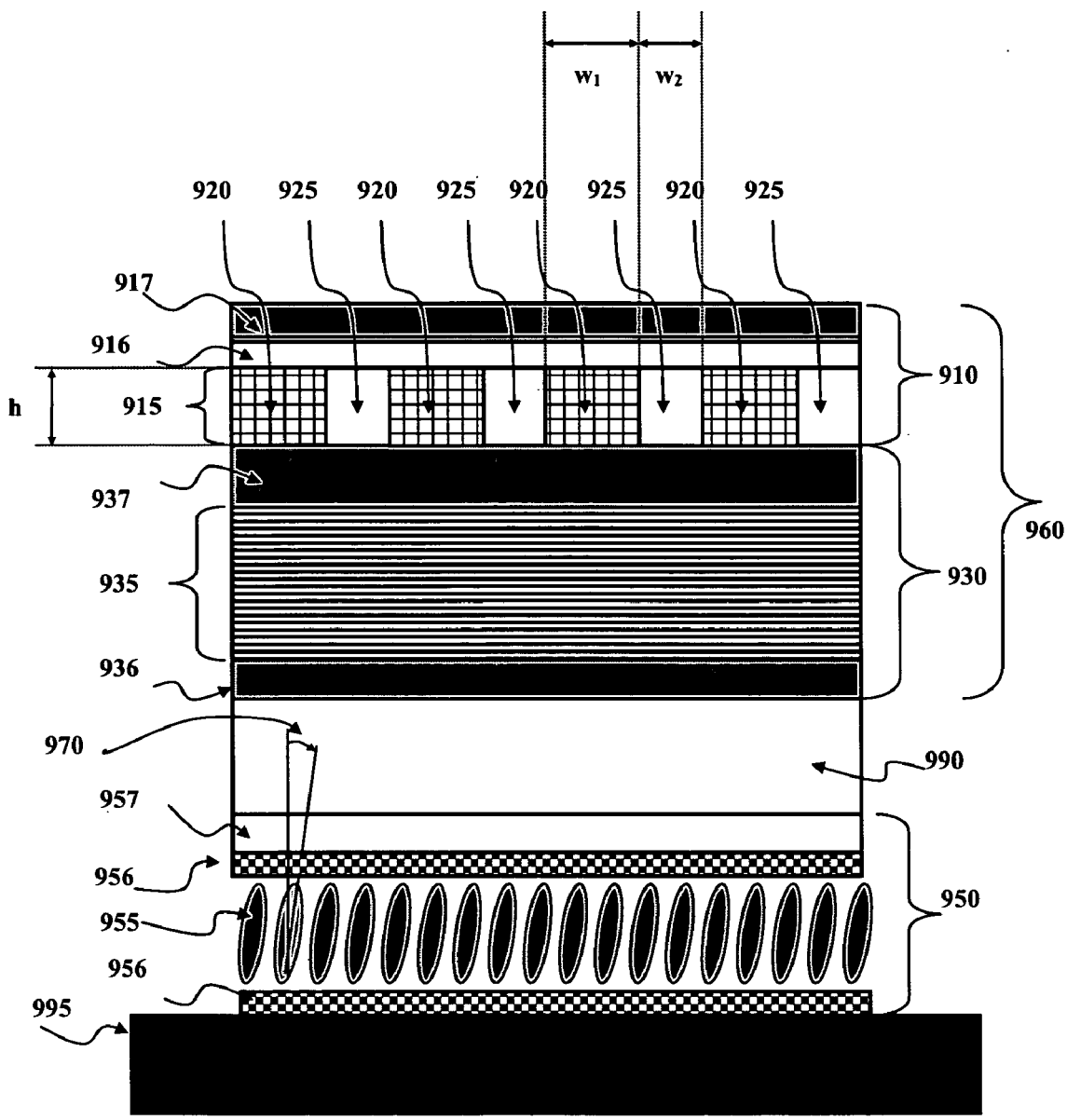
FIG. 36 is a schematic diagram of a full-function grating trim retarder in accordance with another embodiment of the instant invention, wherein the grating retarder is integrated into the cover glass of an LCoS panel, and wherein the grating retarder has an inhomogeneous (but coherent) cascade of transversely-(A-plate) and axially-(−C-plate) form birefringence elements.

Referring to FIG. 36, an LCoS device 900 including an integrated trim retarder and display panel cover substrate is shown. The A-plate grating/−C-plate grating trim retarder sub-assembly 960 includes an A-plate grating element 910 coupled coherently to a −C-plate grating element 930, both of which are mounted on a first surface of a transparent cover substrate 990. The second surface of the transparent cover substrate 990 forms a liquid crystal cell sub-assembly 950 with a second substrate 995 of the display. This trim retarder sub-assembly 960 forms an LC cell gap, in which LC molecules 955 are disposed, with the top-level metal reflectors disposed on the silicon backplane (substrate), 995.

The A-plate grating element 910 includes a transversely-inhomogeneous, periodic index modulation element 915, on which cap-stack 916 and an outer-surface AR stack 917 are disposed. The transverse grating element 915 includes a first plurality of regions 920 interleaved with a second plurality of regions 925, wherein the width $w_1$ and $w_2$ and materials used for the first 920 and second 925 regions, respectively, are selected such that the structure forms a zeroth order sub-wavelength grating that provides in-plane form birefringence. For example, in the wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. Some examples of materials suitable for the first and/or second materials include air, organic dielectrics, inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides (e.g., $MgF_2$), sulphides and nitrides (e.g., silicon nitrides). Optionally, the first and/or second materials include a multi-layer stack. The use of multi-layer stacks advantageously allows the overall A-plate retardance dispersion profile to be tailored (e.g., to be achromatic over a broad wavelength band). While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

The −C-plate grating element 930 includes an axially-inhomogeneous, periodic index modulation element 935, to which index matching stacks 936 and 937 are coupled. The axially periodic structure 935 includes a first plurality of layers, each having a first refractive index and a first thickness, alternating with a second plurality of layers, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ration between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Suitable materials for the first and/or second layers include organic and inorganic dielectrics.

In each of the −C-plate and A-plate grating elements, the AR layers 917, 937, and 936 are added at the interfaces to reduce material interface reflections. These AR coating layers serve as refractive index matching layers at interfaces with an abrupt index change. The AR coatings also provide an additional out-of-plane retardance component that should be factored in to the overall retardance and phase difference when the grating trim retarder is being manufactured.

Figure 3:
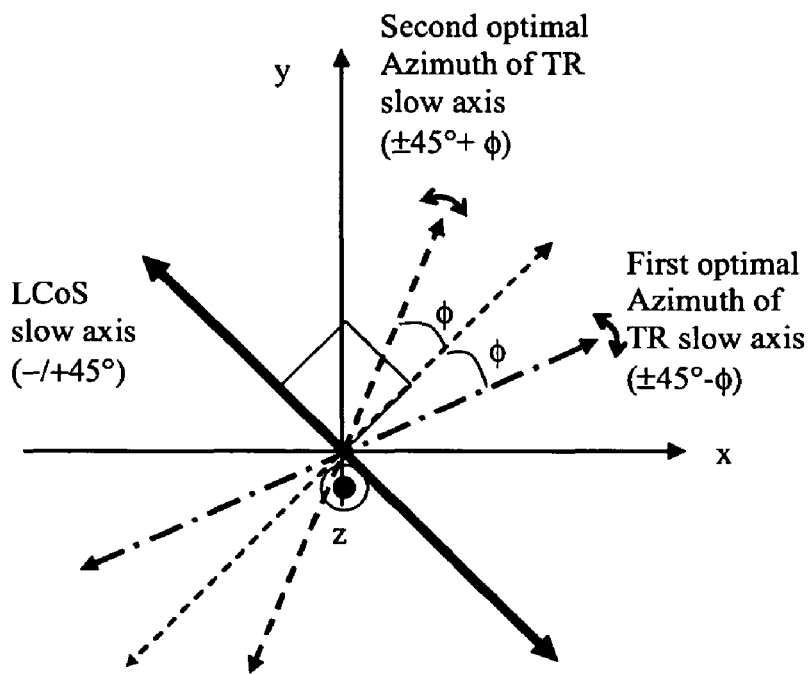
FIG. 3 is a schematic diagram showing the relative azimuthal orientations of the LCoS panel and the trim retarder slow axes.
Figure 4:
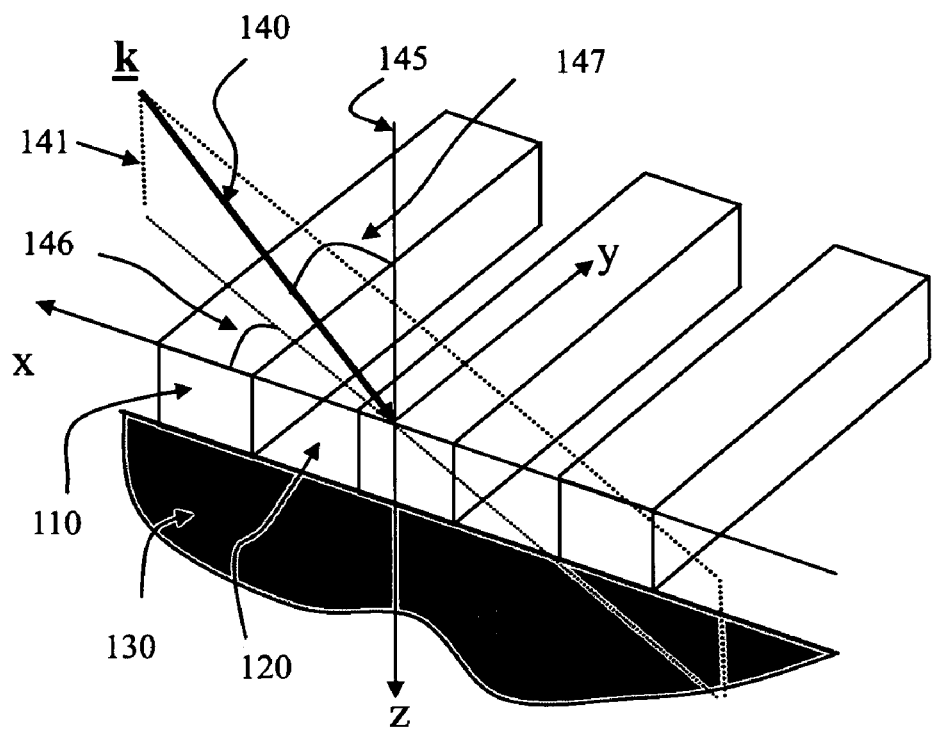
FIG. 4 illustrates a one-dimensional grating structure in a conical mount.

Conventionally, the liquid crystal cell sub-assembly 950 also includes an alignment layers 956, which for example are polymeric or obliquely evaporated inorganic layers, and a front transparent conductive electrode 957, which for example is formed from indium tin oxide (ITO). This LCoS display is shown with VAN-model LC alignment at a pre-tilt angle 970. The associated LC tilt plane is typically not aligned parallel nor perpendicular to the grating vector (though shown parallel in FIG. 36), according to the overclocking compensation scheme in FIG. 3. Due to the pre-tilt and the use of positive uniaxial LC material in the display, the residual A/−C-plate retardance of the display in the light-off-state is compensated by the integrated trim retarder compensator 960.

In order to provide for a high yield integrated compensator/display, the coarse azimuthal angle offset between the trim retarder element 960 and the display element 950 may be imposed by mechanically rotating the cover substrate in the plane of the device, having considered the nominal in-plane retardance magnitudes of the two retarder elements. Individual fine-tuning of each integrated compensator/display may involve other non-mechanical means, such as voltage-switching the LC tilt angles in the off-stage to further reduce the overall leakage intensity. More details on non-mechanical fine-tuning is provided in U.S. provisional patent application No. 60/727,969 filed Oct. 18, 2005, the entire contents of which are hereby incorporated by reference. It is noted that the A-plate grating 910 and −C-plate grating 930 elements are optionally distributed to both surfaces of the cover substrate 990, provided that the ITO layer allows a substantial fraction of the applied voltage to be available across the LC layer (i.e., the ITO layer is not substantially insulated from the LC layer).

Figure 37:
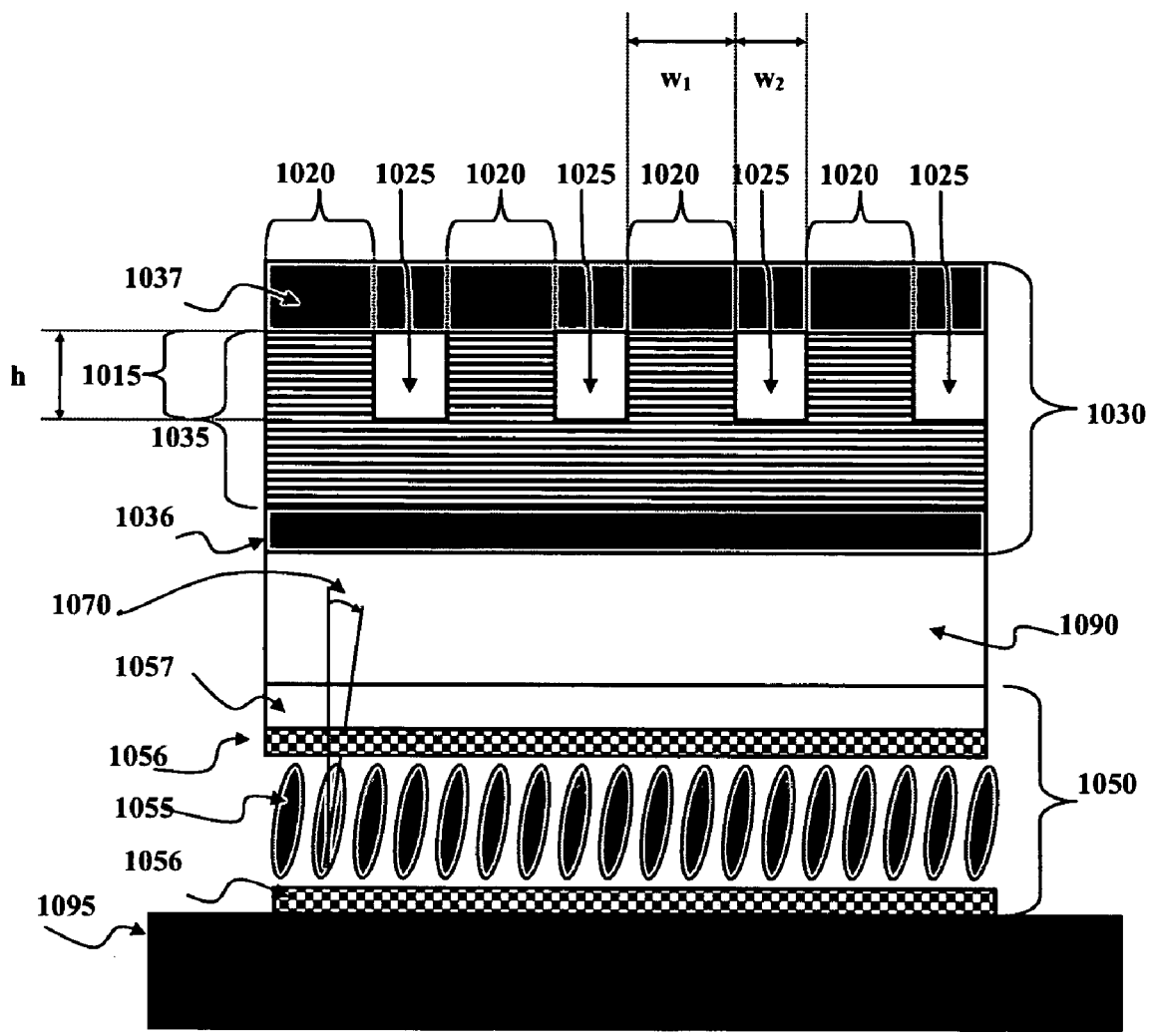
FIG. 37 is a schematic diagram of a full-function grating trim retarder in accordance with another embodiment of the instant invention, wherein the grating retarder is integrated into the cover glass of an LCoS panel, and wherein the grating retarder has an inhomogeneous cascade of a transversely-inhomogeneous (A-plate) form birefringent element co-located with an axially-inhomogeneous (−C-plate) form birefringent element.

Referring to FIG. 37, an LCOS device 1000 including an integrated grating trim retarder and display panel cover substrate is shown. The grating trim retarder sub-assembly includes an FBAR coating 1030, which acts as a −C-plate grating before any etching of parallel grooves on the coated film, and an A-plate grating 1015 that is created by etching into the outer surface of the FBAR stack 1030. The overlapped A-plate grating and −C-plate grating regions (i.e., regions 1020 and 1025 with depth h) provide a homogeneous A/−C-plate retarder element. The etched FBAR 1030 is disposed on the first surface of a first transparent substrate 1090, along with index matching stacks 1036 and 1037. The second surface of the transparent cover substrate 1090 forms a liquid crystal cell sub-assembly 1050 with a second substrate 1095 of the display. The etched FBAR forms an LC cell gap, in which LC molecules 1055 are disposed, with the top-level metal reflectors disposed on the silicon backplane (substrate), 1095.

The A-plate grating 1015 is a transversely-inhomogeneous, periodic index modulation element including a first plurality of regions 1020, each having a first width $w_1$ and a first integral phase delay at normal incidence, interleaved with a second plurality of regions 1025, each having a second width $w_2$ and a second integral phase delay at normal incidence. The widths $w_1$ and $w_2$ are selected such that the modulation element forms a zeroth order sub-wavelength grating that provides in-plane form birefringence. For example, in the wavelength range of 380 nm to 800 nm, for a duty cycle ratio between 20% and 80% and a pitch between 100 nm and 250 nm, the first $w_1$ and second $w_2$ widths will typically be between 20 nm and 200 nm, and the modulation height, h, will typically be between 10 nm and 3 μm. While the cross-sectional view of the periodic structure is shown to have a binary (rectangular) pattern, other diffractive profiles are also within the scope of the instant invention. For example, other possible diffractive profiles include saw-tooth-like (triangular), blazed, sinusoidal, or trapezoidal grating patterns. Optionally, two or more profiles are used in the same A-plate grating.

According to a preferred embodiment, the first 1020 and second 1025 plurality of regions are formed by etching the −C-plate grating element 1030 (before providing the outer-surface AR coating 1037) to form a plurality of grooves with depth, h. The grooves 1025 are typically filled with air/atmosphere. Alternatively the grooves are filled (e.g., with another dielectric material), to reduce the index contrast of grating ridge 1020 and grating groove 1025, and thus reduce back reflections of the integrated A/−C-plate trim retarder.

The −C-plate grating element 1030 includes an alternating index stack, and index matching stacks 1037 and 1036. The alternating index stack includes a first plurality of layers, each having a first refractive index and a first thickness, alternating with a second plurality of layers, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ratio between 20% and 80%, the layer thickness in each of the first and second plurality of layers is typically greater than about 1 nm and less than about 100 nm. While the alternating stack is illustrated with only two different layer materials, it is also within the scope of the instant invention to use more than two different layer materials. Suitable materials for the first and/or second layers include organic and inorganic dielectrics. Some common examples of materials used to form thin film layers include $SiO_2$, $Al_2O_3$, $Ta_2O_5$, $Nb_2O_5$, $HfO_2$, $TiO_2$, niobia-tantala, niobia-titania, $MgF_2$, sulphides and silicon nitride.

The AR layers 1037 and 1036 are added at the interfaces to reduce material interface reflections. These AR coating layers serve as refractive index matching layers at interfaces with an abrupt index change. The cap layer 1037 optionally also serves as a protective layer. The AR coatings provide an additional out-of-plane retardance component that should be factored in to the overall retardance and phase difference when the grating trim retarder is being manufactured.

Conventionally, the liquid crystal cell sub-assembly 1050 also includes alignment layers 1056, which for example are polymeric or obliquely evaporated inorganic layers, and a front transparent conductive electrode 1057, which for example is formed from indium tin oxide (ITO). This LCoS display is shown with VAN-model LC alignment at a pre-tilt angle 1070. The associated LC tilt plane is typically not aligned parallel nor perpendicular to the grating vector (though shown parallel in FIG. 37), according to the overclocking compensation scheme in FIG. 3. Due to the pre-tilt and the use of positive uniaxial LC material in the display, the residual A/–C-plate retardance of the display in the light-off-state is compensated by the integrated trim retarder compensator 1030.

The overlapping cascade of elements 1015 and 1030, which is coupled to one side of the transparent substrate 1090, forms an overall AR stack that advantageously exhibits both in-plane and out-of-plane retardance. More specifically, the sub-wavelength longitudinal index profile, including the alternating layers 1035 in the first plurality of regions 1020, gives rise to a form birefringent –C-plate component, whereas the sub-wavelength lateral index profile, including interleaving regions 1020 and 1025, gives rise to a form birefringent A-plate component. The un-patterned FBAR stack provides the remaining –C-plate retardance.

In the above embodiments described with reference to FIGS. 17, 18, 24, 37, the full function A/–C-plate grating-based trim retarder included a transversely-inhomogeneous A-plate grating and an axially-inhomogeneous –C-plate grating, wherein the gratings are fabricated such that they, at least in part, coincide (i.e., take up the same place in space). Although the thin film layers of the A-plate and –C-plate gratings may be considered as coherently coupled in terms of optical interference, the retardance property of each A-plate grating and –C-plate grating segment is still distinct and is described by its own index indicatrix model. While this presents various options of configuring the two segments on one or both surfaces of transparent substrates, and simplifies the manufacturing process, the resultant effective in-plane birefringence of the A-plate grating is not always optimal for high performance trim retarder applications. For example, see K. Tan et al., "Design and characterization of a compensator for high contrast LCoS projection systems," SID 2005, p. 1810, 2005, hereby incorporated by reference. In addition, a conventional thin film sputter process may create voids underneath the deposited coating, if the coating process is incapable of true conformal deposition. Shadowing and the lack of certain angle range of coating material flux are the main reasons for the formation of roof-structure voids.

To obviate these concerns, the textured surface grating is alternatively designed such that the coating process fills the grating grooves adequately to ensure environmental and light flux exposure reliability and such that the resultant A-plate retardance is distributed over a thicker birefringent stack, thus yielding a low birefringence retarder that also incorporates an appropriate amount of negative C-plate retardance. More specifically, it is proposed that the A-plate grating be fabricated using a coating process that fills the grooves more efficiently and, at the same time, substantially repeats the initial grating structure such that the A-plate grating structure extends into the C-plate grating structure.

Grating replication has been previously proposed, wherein RF bias sputtering is used to 'auto-clone' a seed grating through the thickness of a deposited film. In particular, it has been proposed that by selecting the appropriate balance between RF sputter deposition and RF sputter etching, a stable transverse grating pattern is replicated by each successive pair of materials coated. For example, see S. Kawakami et al., "Mechanism of shape formation of three-dimensional periodic nanostructures by bias sputtering," *Appl. Phys. Lett.*, 74(3), pp. 463-465, 1999 and/or and T. Sato et al., "Photonic crystals for the visible range fabricated by autocloning technique and their applications," *Opt. Quant. Elect.*, 34 pp. 63-70, 2002, wherein it has been demonstrated that optical retarders can be prepared by autocloning a periodically patterned surface having a lateral pitch (also period) as small as 180 nm. The deposited layers are configured as a high reflector with the first order reflection centered at a wavelength longer than the intended application wavelength window. With regard to the latter reference, one autocloned retarder had a 167 nm thickness for one pair of silica/tantala layers. This period was repeated ten times to obtain approximately $0.87\pi$ of A-plate retardance at $\lambda$=400 nm (or 174 nm of retardance). The stop band was centered at approx. $\lambda$=600 nm and the retarder was intended for use at $\lambda$=400 nm.

There are several problems with these grating retarder structures for LCoS compensator applications. By utilizing the wavelength region between the first order reflection and the next higher order reflection, the out-of-plane retardation component is positive. Moreover, the effective in-plane birefringence of such a design is too large for low reflectance compensator applications. At ~174 nm of retardance, realized with about 10 periods of 167 nm each, the effective $\Delta n$ is approximately 0.1. Notably, these references do not disclose whether the autocloning method is able to provide both a zeroth order grating along the transverse plane and along the device normal, for applications in UV/Visible wavelength bands.

Figure 38:
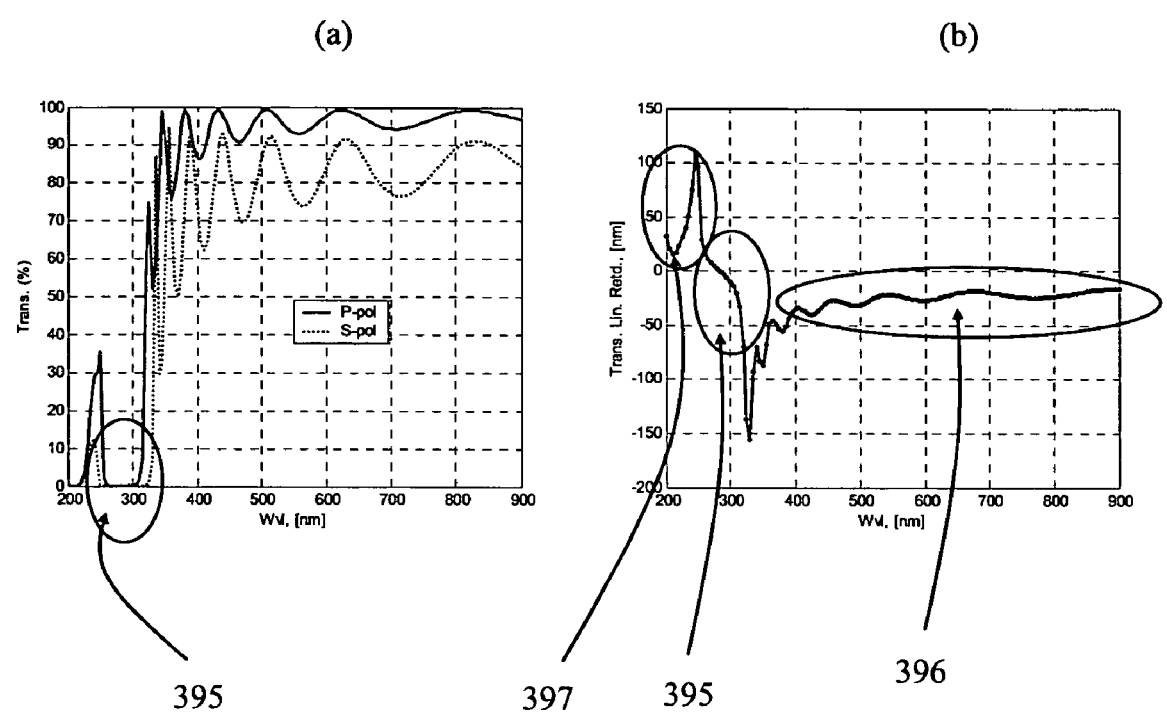
FIG. 38 shows the calculated transmittance and transmitted retardance of a coating stack made from 10 repeat units of a 30 nm thick high index material and a 50 nm thick low index material, at a 45° angle of incidence.

As an example of the retardance realizable by a dielectric thin-film coated plate, a high reflector design of substrate/ $(LH)^{10}$/ambident where L is a low index material, such as silica, and H is a high index material, such as tantala, both of which are sufficiently transparent over the visible wavelength window. These layers are sized to produce quarterwave optical thickness at the center wavelength (i.e., are quarterwave at $\lambda_0$=300 nm). The resultant L and H thicknesses are approximately 50 nm and 30 nm, respectively. The calculated transmittance and transmitted retardance of 10 repeats of a 50 nm silica and 30 nm tantala pair at a 45° angle of incidence are shown in FIG. 38. The first order reflection is labelled as 395. At wavelengths longer than the first order reflection band, 396, a high transmitted throughput and negative transmitted retardance is obtained. The sign of retardation is positive if P-polarized light experiences a larger delay than S-polarized light at non-normal incidence, whereas the sign of retardation is negative if P-polarized light experiences a shorter delay than S-polarized light at non-normal incidence. For wavelengths shorter than the first order reflection, but longer than the next higher order reflection, 397, the retardation is positive. Note that this dielectric coated plate only produces +C/–C-plate retardance. The net retardance is zero for normal incidence light. More details on the C-plate retardance of coated thin films are found in U.S. provisional patent application 60/803,735 filed Jun. 2, 2006, the entire contents of which are hereby incorporated by reference.

In order to reduce the interference effects, the axial grating should be configured as a zeroth order grating, and the paired high/low index layers should be much thinner than the intended wavelength of operation. In this case, a negative out-of-plane retardance is provided. By applying such a thin film coating on a 'seed' grating (i.e., an initial surface relief structure), a low in-plane birefringence is also obtained. More specifically, the in-plane retardance is provided by a series of undulating coated dielectric layers distributed throughout the coating stack.

Figure 39:
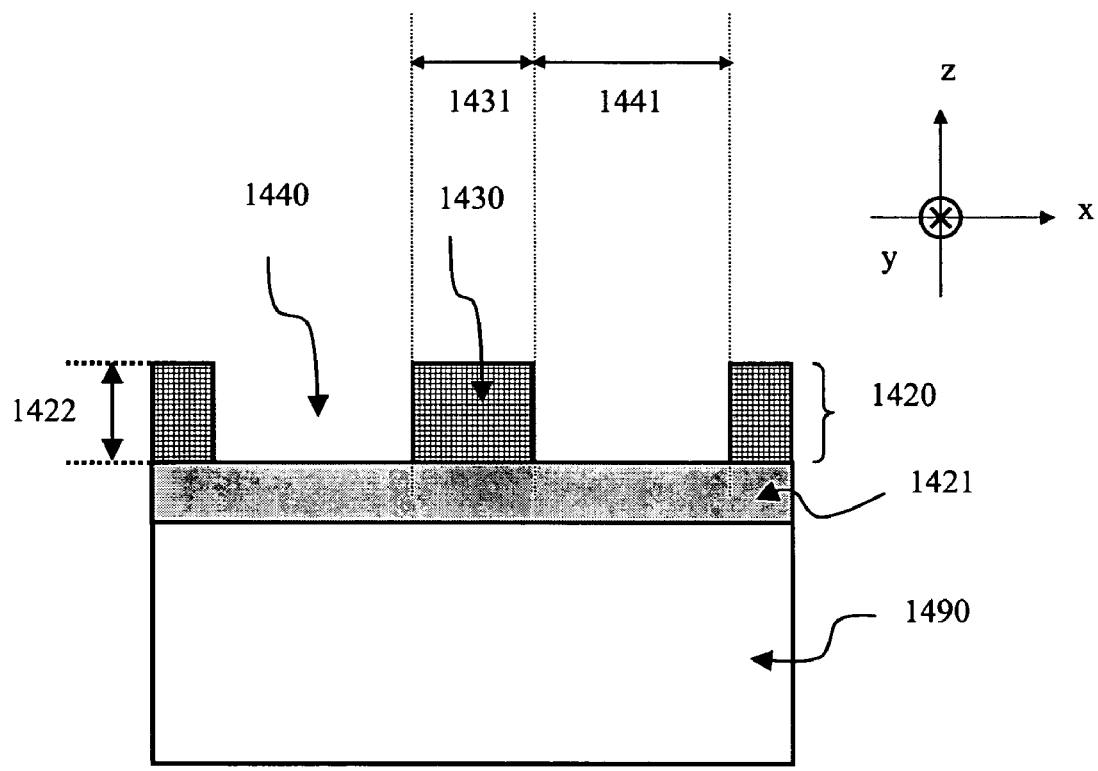
FIG. 39 is a schematic diagram of an etched thin binary grating on an etch stop.
Figure 40:
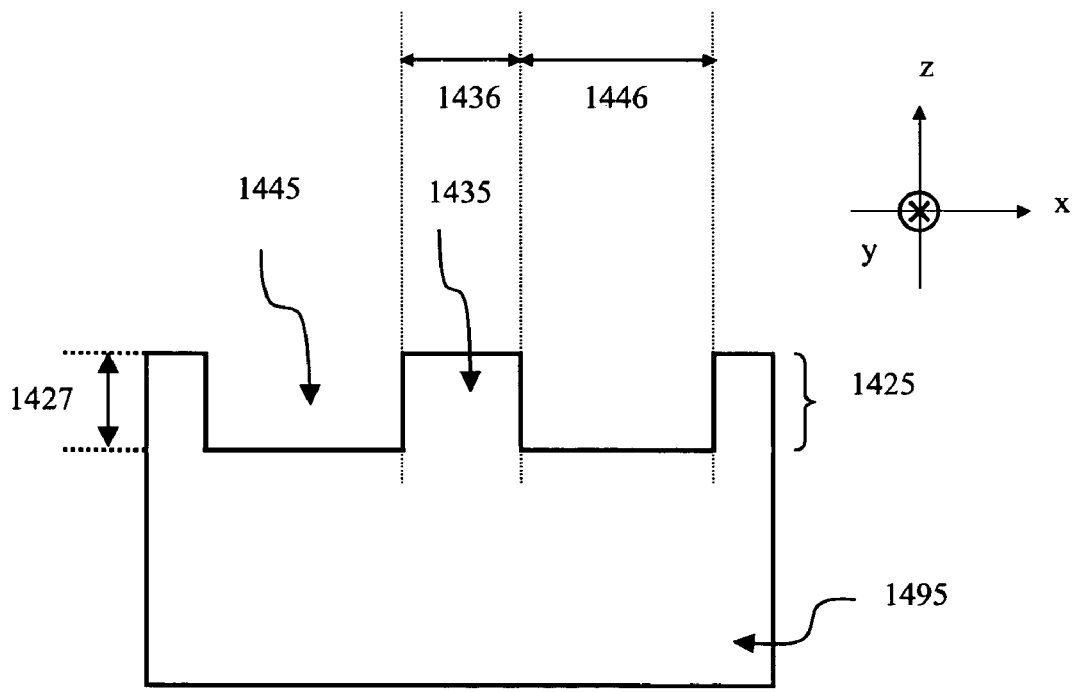
FIG. 40 is a schematic diagram of an etched substrate.

Some examples of the initial etched, pre-coated "seed" grating are illustrated in FIGS. 39 and 40. Referring to FIG. 39, the seed grating 1400 includes a non-textured substrate 1490, an etch-stop layer 1421 deposited on the non-textured substrate 1490, and a dielectric disposed on the etch-stop layer 1421. The dielectric is patterned to form a binary grating 1420, for example using lithography and etch or lift-off processing, which includes a plurality of a first grating pedestal 1430 having a first width 1431 interleaved with a second grating groove 1440 having a second width 1441. Preferably, the first and second widths are sub-wavelength dimensions. This A-plate grating 1420 has a height 1427 suitable for a subsequent dielectric coating deposition. The dielectric material making up the grating pedestals 1430 is different from the grating substrate 1490.

Referring to FIG. 40, another approach to realizing the seed grating 1405 is shown. The seed grating 1405 is etched directly into the substrate 1495, with or without a lift-off patterned photoresist. The seed grating includes a binary grating element 1425, which includes a plurality of grating pedestals 1435 having a first width 1436 interleaved with a plurality of grating grooves 1445 having a second width 1446, wherein the first and second widths are sub-wavelength dimensions. This A-plate grating 1425 has a height 1427 suitable for the subsequent dielectric coating deposition. The dielectric material making up the grating pedestals 1435 is the same as the grating substrate 1495.

According to the zeroth order EMT eq. (1), a form birefringent A-plate is obtained by the periodic sub-wavelength binary modulation on the seed grating. The duty cycle ratio of the grating is given by eq. (3). As an example, a grating with pedestals having an index of refraction of 1.46 and air grooves at 50:50 mark-space ratio gives an effective in-plane birefringence of −0.0846:

$$n_o^0 = 1.2513 \text{ and } n_e^0 = 1.1680, \Delta n^0 = n_e^0 - n_o^0 = -0.0846. \quad (5)$$

Figure 5:
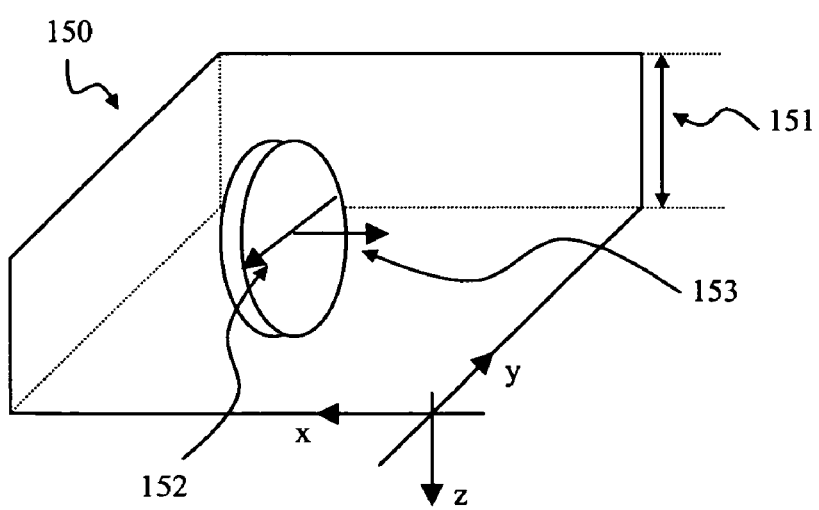
FIG. 5 illustrates an effective A-plate retarder with negative form birefringence.
Figure 6:
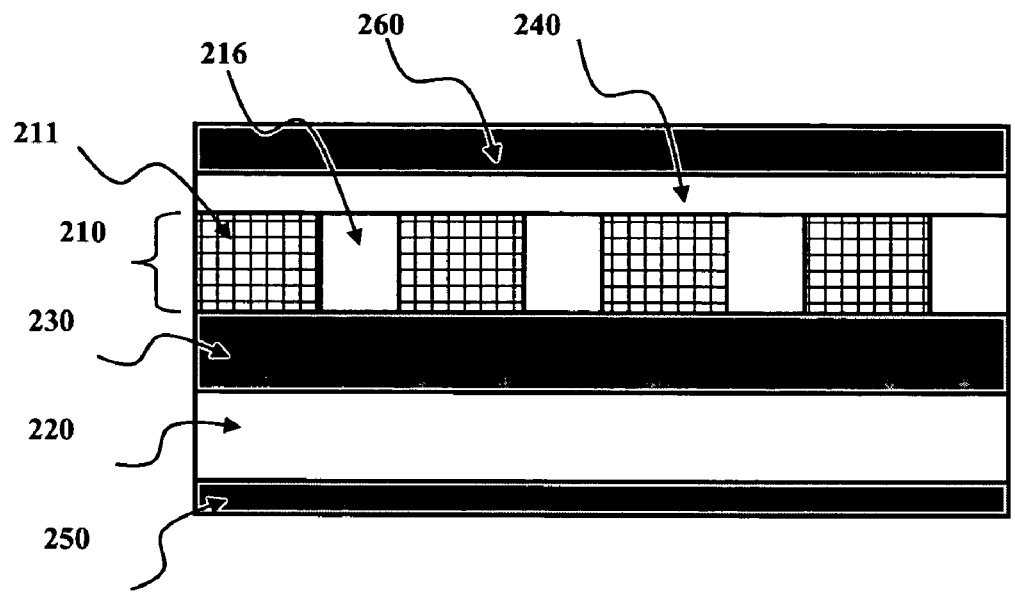
FIG. 6 is a schematic diagram of an optical retarder having a transversely-inhomogeneous form-birefringent grating.
Figure 7:
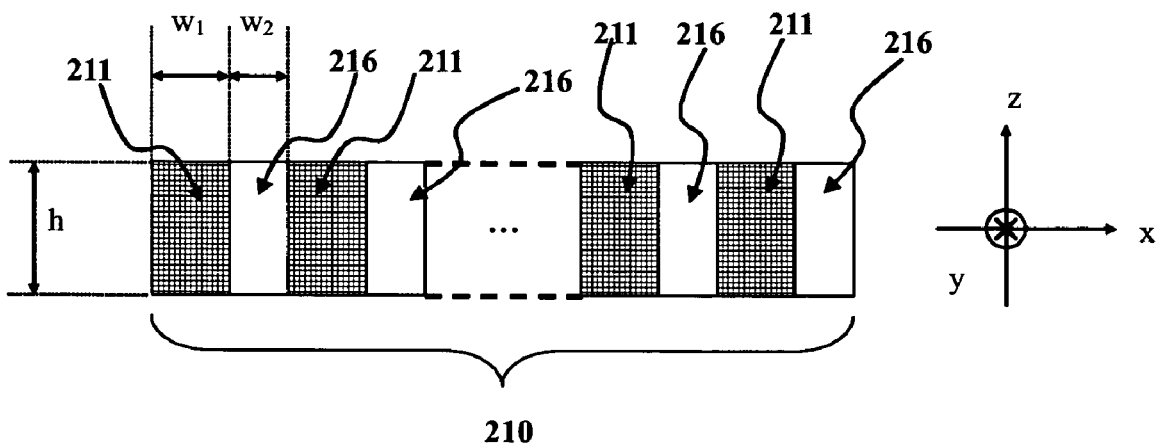
FIG. 7 is an expanded view of the transversely-inhomogeneous form birefringent grating.
Figure 8:
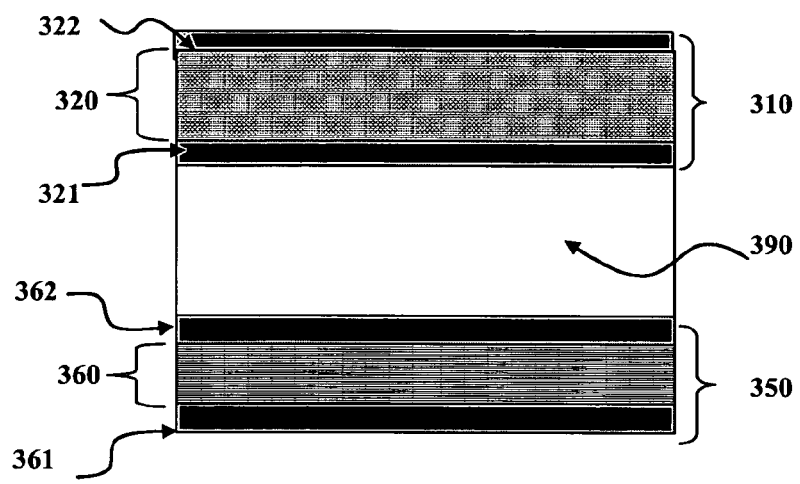
FIG. 8 is a schematic diagram of a full-function optical retarder including an axially-inhomogeneous form-birefringent grating.
Figure 9:
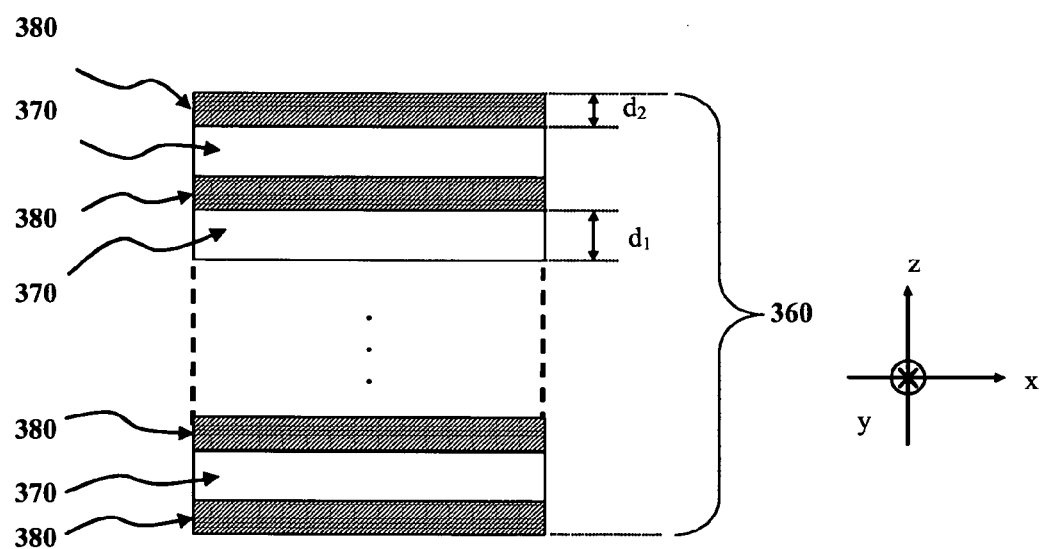
FIG. 9 is an expanded view of the axially-inhomogeneous form-birefringent grating.
Figure 10:
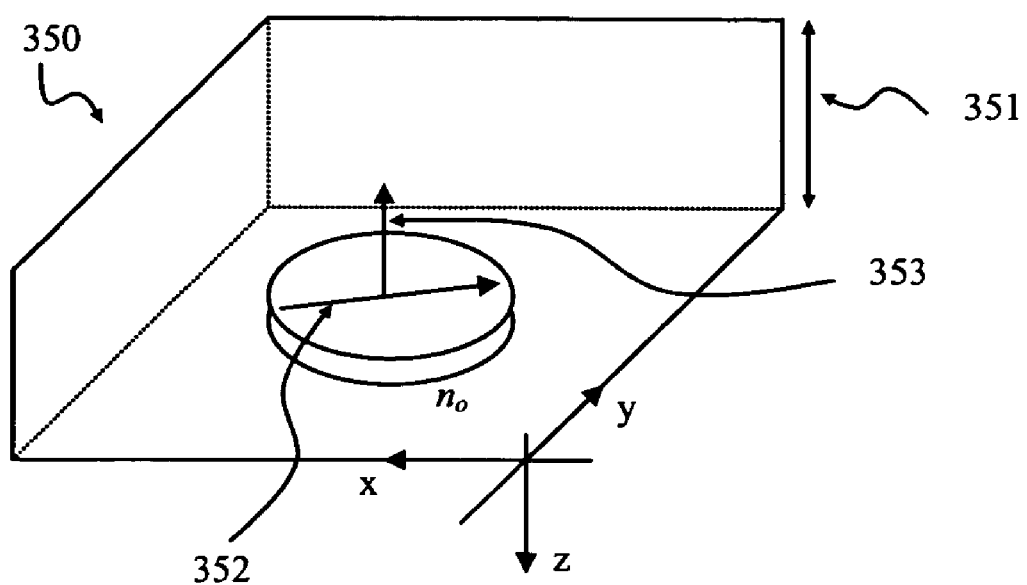
FIG. 10 illustrates an effective negative C-plate retarder with negative form birefringence.
Figure 41:
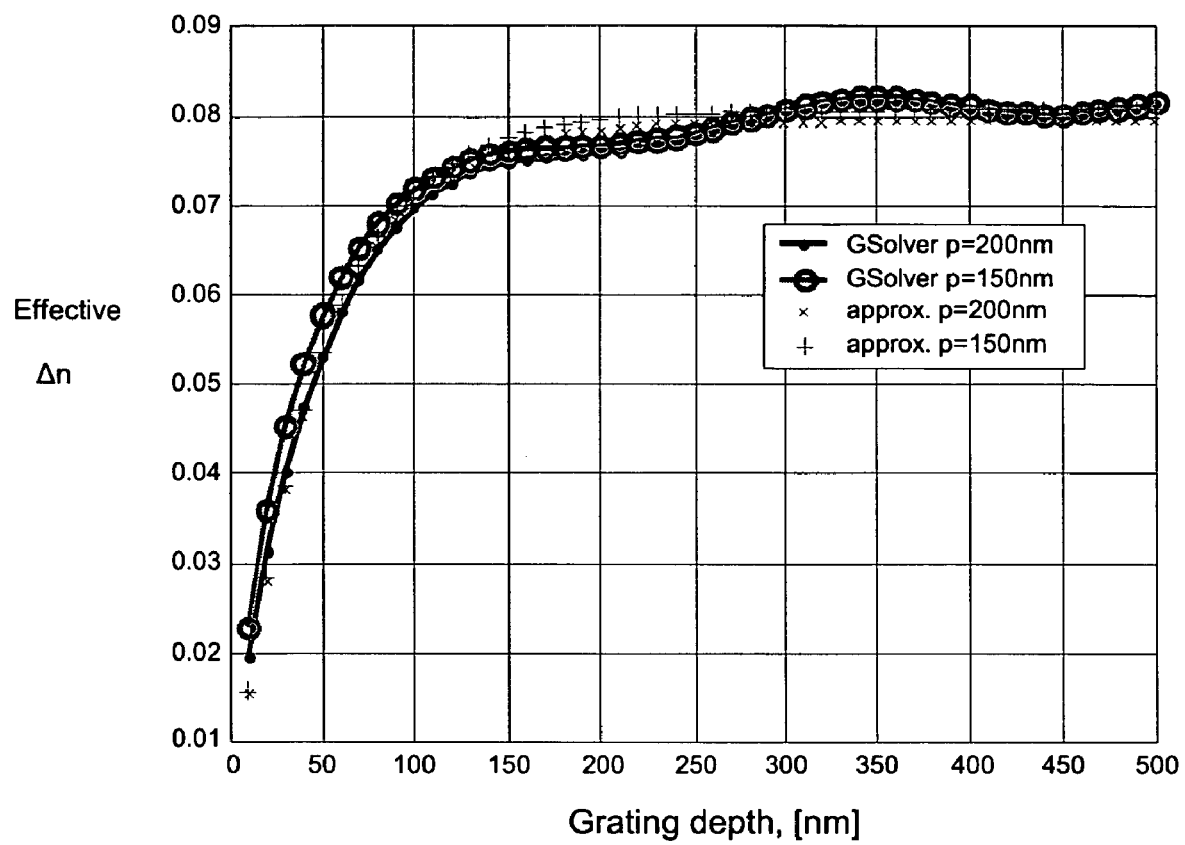
FIG. 41 shows the simulated effective in-plane birefringence of a thin binary grating formed from 50% Borofloat glass and 50% of air, mounted on a Borofloat substrate.

The effective uniaxial indicatrix is disc-like, having negative birefringence, as shown in FIG. 5. For a very thin grating layer with a height h, h<<λ, where λ is the operating wavelength, the zeroth order EMT in eq. (1) and the second order EMT in eq. (2), which includes additional parameters such as the grating pitch, p, and the operating wavelength, λ, do not predict the effective indices and the effective birefringence accurately. It is anticipated that other second order EMT formulae (for example, see C. W. Haggans et al., "Effective-medium theory of zeroth order lamellar gratings in conical mountings," J. Opt. Soc. Am. A, 10, pp. 2217-2225, 1993) would also be inaccurate for very thin gratings. In order to assess the effective indices and birefringence of a regular one-dimensional binary grating, RCWA modeling (Grating Solver Development Company, Allen, Tex., version 4.20b) was used. The binary grating was configured as an etched glass grating (similar to device 1405). The substrate material chosen was Schott Borofloat. The effective in-plane birefringence (the ratio of the transmitted in-plane retardance at normal incidence in nanometers and the physical height of the single layer grating in nanometers) of the etched Borofloat glass at 150 nm and 200 nm grating periods, having a 50% duty cycle ratio, was significantly lower than that predicted using the zeroth and second order EMT expressions. These GSolver simulation results are shown in FIG. 41 for λ=550 nm. The grating height was swept from 10 nm to 500 nm, in 10 nm steps. The modeled effective in-plane birefringence shows a damped step function increase with oscillations at large heights due to interference effects. At a grating height selected such that the optical thickness of the ordinary wave is less than a quarterwave (i.e., h<λ/4/$n_o^0$, which corresponds to a 110 nm physical height in this simulation example), the full in-plane birefringence realizable according to the EMT expressions are reduced. In fact, for the EMT expressions to be applicable in transverse binary gratings, the grating lines must be rather thick. This is analogous to stacking a series of parallel sheets in the vertical plane, with its width and height dimensions much larger than the wavelength of operation.

Figure 42:
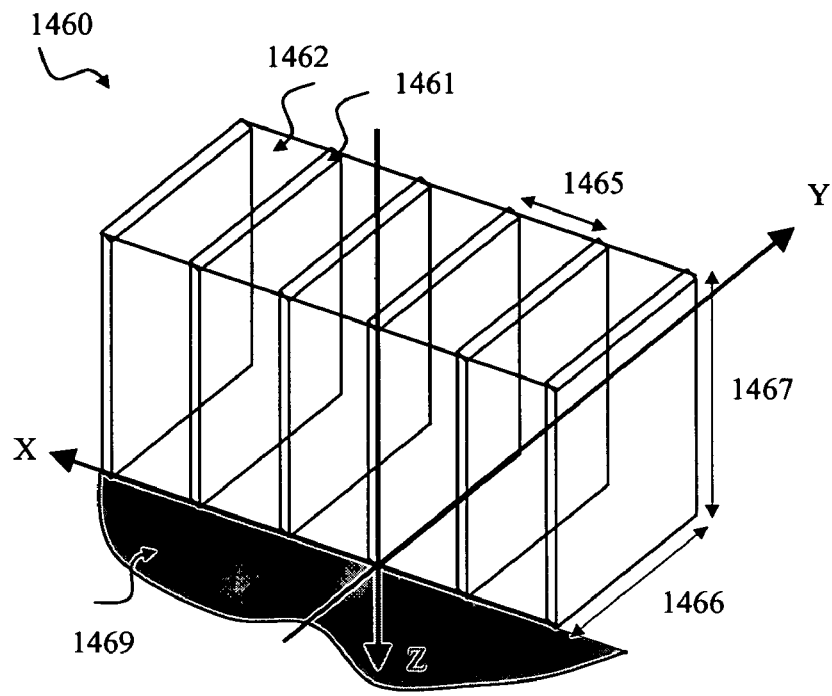
FIG. 42 is a schematic diagram of a book-stack model of an effective form birefringent layer.

This "book-stack" model is illustrated in FIG. 42. Optical device 1460 has a periodic first medium of "thin sheets" 1461 stacked in a second medium 1462 on substrate 1469. Without loss of generality, the stacking can be considered along the X-axis at a fixed pitch 1465. Each "thin sheet" has a width 1466 and height 1467 which are much greater than the wavelength in use. Nonetheless, the grating pitch 1465 is much smaller than the wavelength in order to realize form birefringence even for the normal incidence light (i.e., yielding in-plane or A-plate retardance).

Figure 43:
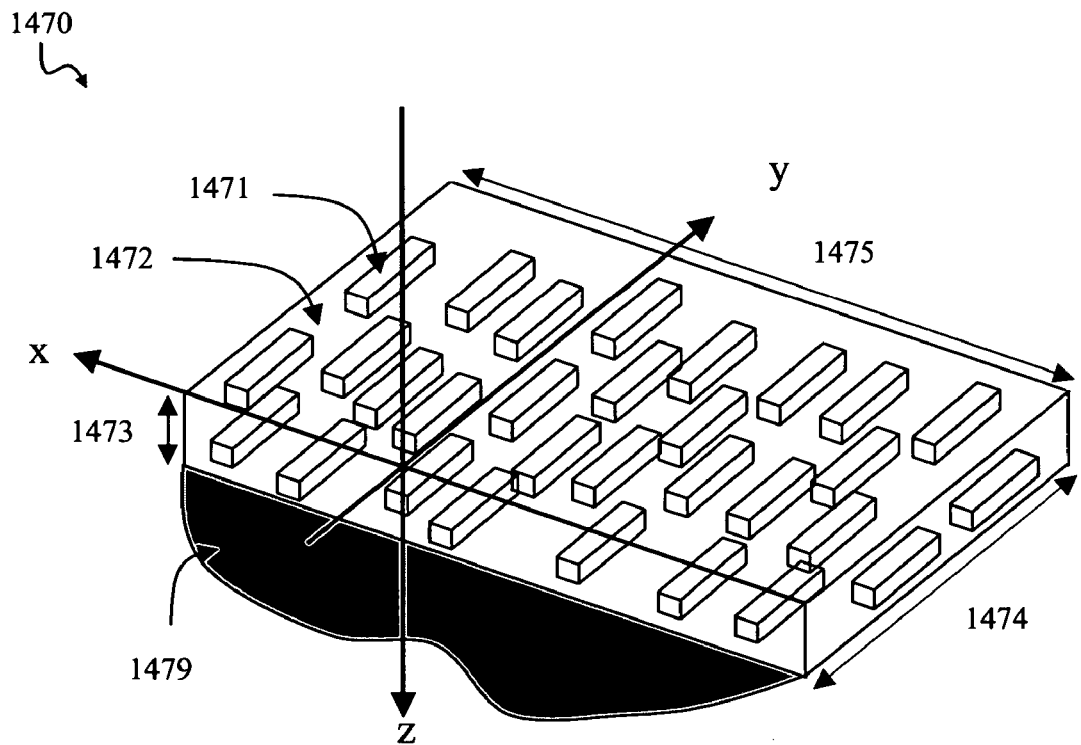
FIG. 43 is a schematic diagram of a 3D form-birefringent model of an A-plate grating.

In practice, the book-stack model is inappropriate. The lateral extent of an optical element is typically much larger than the wavelength of illumination. With the use of form-birefringent zero order gratings, the grating lines are much narrower than the wavelength of light. The height dimension of the grating lines is a parameter for optical interference design. This parameter is typically smaller than or comparable to the wavelength of illumination. In the scenario that grating height meets this height condition, the realizable effective in-plane birefringence is clamped down. The grating can be considered as many tiny pieces of a first material immersed in second material medium. This is illustrated in FIG. 43. For a given volume, device 1470 includes many pieces of a first material block 1471, aligned with their long axes parallel to the Y-axis over the long range. The rest of the volume is filled by a second material 1472. The order of the first and second materials, which are mounted on a substrate 1479, does not necessarily result in regular grating pedestal/groove structure along any XZ cross-sectional view. This volume of material has a height 1473, which is shorter or comparable to the wavelength of light. Conversely, the lateral extent of this volume 1474, along Y-axis and 1475 along X-axis, is infinite relative to the wavelength of light. The first and second materials are dielectrics and do not possess polarizability. The distribution of first and second materials are analogous to the birefringent liquid crystal molecules (that of elongated shape, positive uniaxial LC) in a host mixture. By the law of averages, the volume fraction of the first dielectric is $f_1$; the volume fraction of the second dielectric is $f_2$; and the volume fraction of the third dielectric $f_3$, etc. With these volume fractions defined, a three-dimensional (3D) index mixing model (IMM) for a single grating layer is formulated. For a two or more material mixing, the zeroth order EMT formulae are applied to yield the first estimate of the effective indices and birefringence, $$n_o^0 = \sqrt{f_1(n_1)^2 + f_2(n_2)^2 + \ldots f_i(n_i)^2 + \ldots f_N(n_N)^2}, \quad (6)$$

$$n_e^0 = 1/\sqrt{f_1/(n_1)^2 + f_2/(n_2)^2 + \ldots f_i/(n_i)^2 + \ldots f_N/(n_N)^2}, \quad (7)$$

$$\Delta n^0 = n_e^0 - n_o^0, \quad (8)$$

where N materials are mixed in a unit grating volume and the constituent material indices, $n_1$ to $n_N$ are wavelength dependent and $\Delta n^0$ is the zeroth order EMT birefringence (ZOB), which is typically negative.

In order to incorporate the effects of reduced birefringence when the single layer grating is much thinner than the wavelength of light, a push-pull model is proposed. The "push" function comes from an exponential growth of the full zeroth order birefringence when the grating height approaches the wavelength of light or thicker; the "pull" function comes from an exponential decay term, which eliminates the ZOB altogether when the grating pitch is infinite in the given direction. These effective indices, (nx, ny, nz), along (X,Y, Z) directions of the unit volume grating are expressed as below:

$$n_x = n_o^0 + \exp(-\alpha p_x/\lambda) \times [1 - \exp(-\delta h/\lambda)] \times (n_e^0 - n_o^0), \quad (9)$$

$$n_y = n_o^0 + \exp(-\beta p_y/\lambda) \times [1-\exp(-\delta h/\lambda)] \times (n_e^0 - n_o^0), \quad (10)$$

$$n_z = n_o^0 + \exp(-\gamma p_z/\lambda) \times [1-\exp(-\delta h/\lambda)] \times (n_e^0 - n_o^0), \quad (11)$$

where $(\alpha, \beta, \gamma)$ are the coefficients of ZOB decay along (X, Y, Z) directions, respectively, which are determined by data fitting; $(p_x, p_y, p_z)$ are pitch lengths in (X, Y, Z) directions of the unit volume grating; h is the grating height and $\delta$ is the coefficient of ZOB growth; and $\lambda$ is the wavelength of light. The fitted in-plane birefringence, $n_y - n_x$, at $\lambda = 550$ nm is shown in the same plot in FIG. 41 as are the raw GSolver data. The fitted coefficients, $(\alpha, \beta, \gamma, \delta)$, are [0.17, 0.1, 0.1, 12.0] for both 150 nm and 200 nm Borofloat/air grid.

Figure 44:
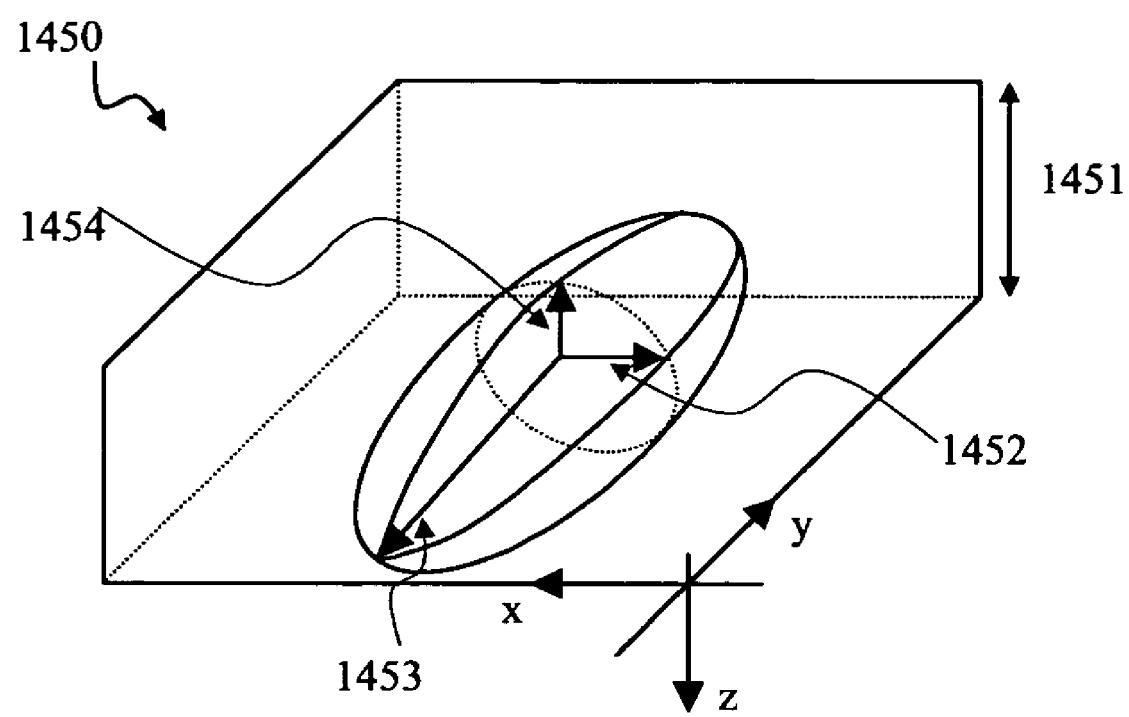
FIG. 44 is a schematic diagram of an effective biaxial A-plate of a thin grating.

A second aspect of the prevailing error in using the EMT formulae to describe an A-plate grating lies in the out-of-plane retardance. It is often assumed that the grating normal directions take on the ordinary index of refraction. Hence, the equivalent model for the binary grating is one of a negative uniaxial indicatrix with its e-wave axis pointing along the grating vector (e.g., X-axis). This is approximately true for a thick grating. For a thin grating, the equivalent single layer birefringent model is closer to the index indicatrix diagram shown in FIG. 44. Birefringent layer 1450 represents the effective biaxial indicatrix of a thin binary grating. The grating height and the equivalent model thickness h are represented by 1451. The three principal indices ($n_x$, $n_y$, $n_z$) are given by 1452, 1453 and 1454, respectively. Instead of $n_y = n_z = n_o$ and $n_x = n_e$ as in a thick binary grating, the more accurate IMM model gives $n_y > n_x$ and $n_z \approx n_x$. This weakly positive biaxial indicatrix is determined by curve fitting the transmitted and reflected intensity and retardance profiles vs. angle of incidence. The equivalent birefringent layer is categorized as a weakly biaxial medium by arranging for $n_a < n_b < n_c$, where ($n_a$, $n_b$, $n_c$) are principal refractive indices in the material coordinates (as opposed to ($n_x$, $n_y$, $n_z$) when expressed in laboratory coordinates).

Examples of data fitting are shown in FIGS. 45(a) to (d). A Borofloat glass/air grid of 40 nm height was modeled in GSolver. Its complex electric field output for a range of polar angles and viewing azimuthal angles were exported to a data fitting routine. An IMM was set up such that the equivalent single layer birefringent medium best produced the same intensity and retardance angular spectra in both transmission and reflection. At the data fitting wavelength of 550 nm, the IMM gave:

$$[n_x, n_y, n_z] = [1.1803, 1.2338, 1.1960] \quad (12)$$

Figure 45A:
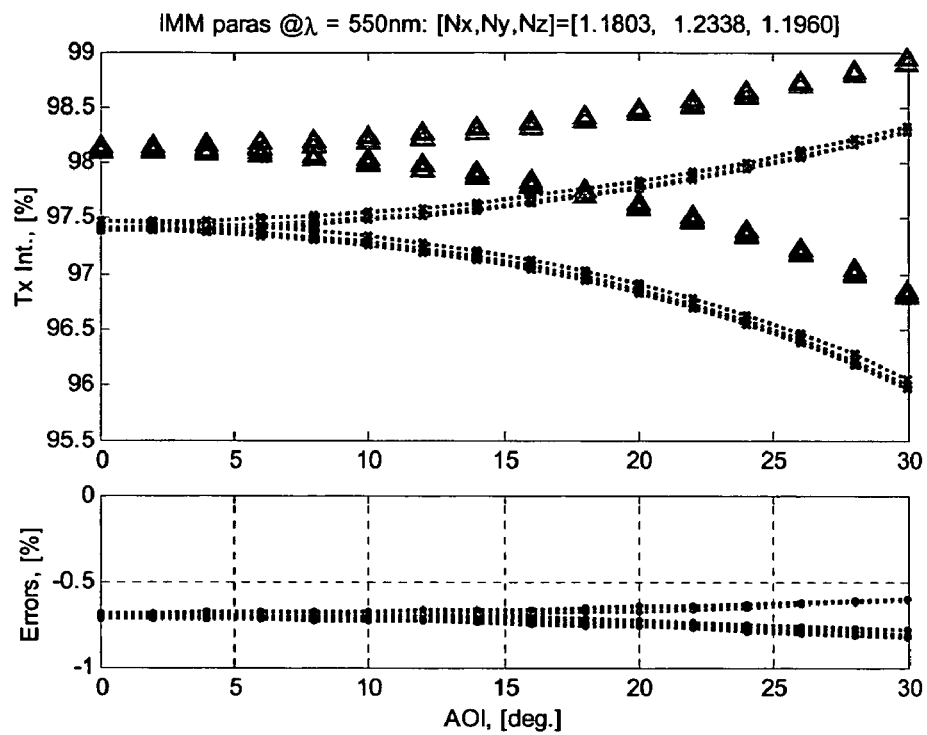
FIG. 45a shows transmittance spectra of fitted 40 nm Borofloat/air thin grating on Borofloat substrate.
Figure 45B:
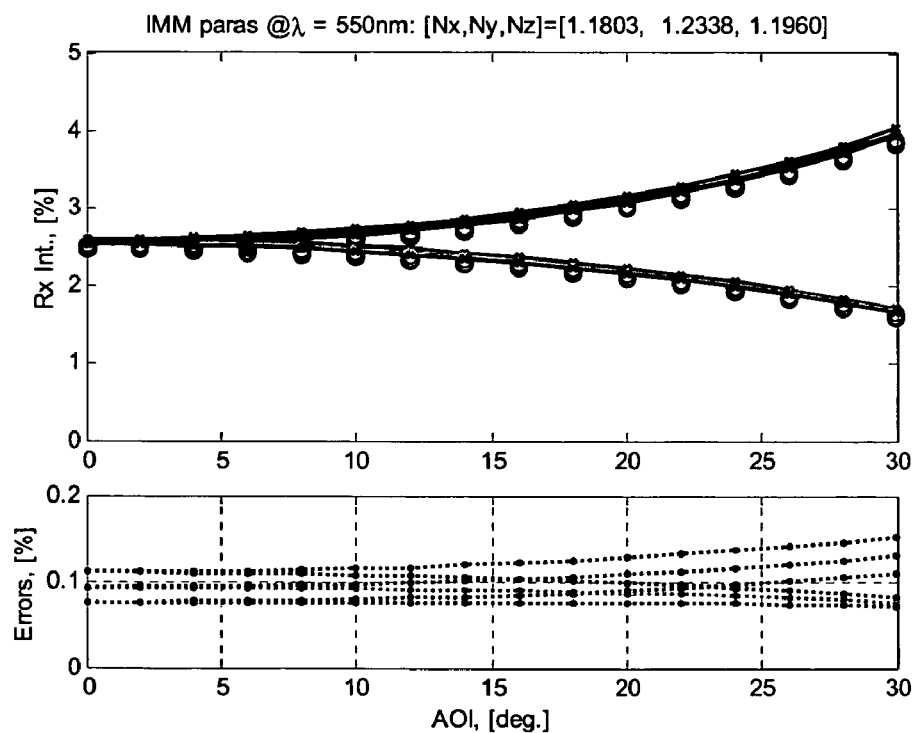
FIG. 45b shows reflectance of fitted 40 nm Borofloat/air thin grating on Borofloat substrate.
Figure 45C:
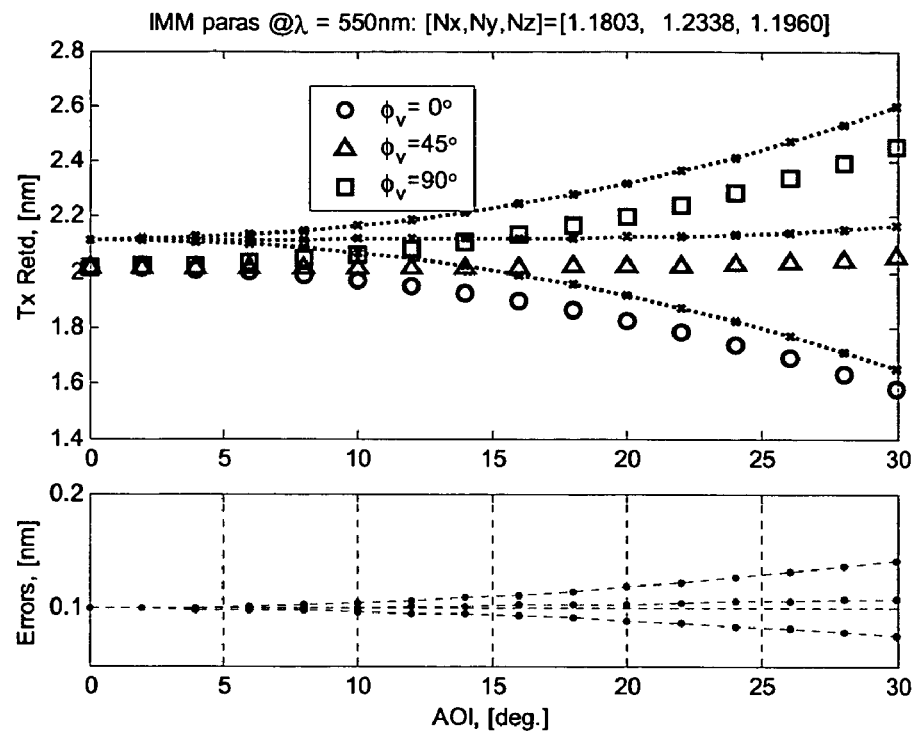
FIG. 45c shows the transmitted linear retardance of fitted 40 nm Borofloat/air thin grating on Borofloat substrate.
Figure 45D:
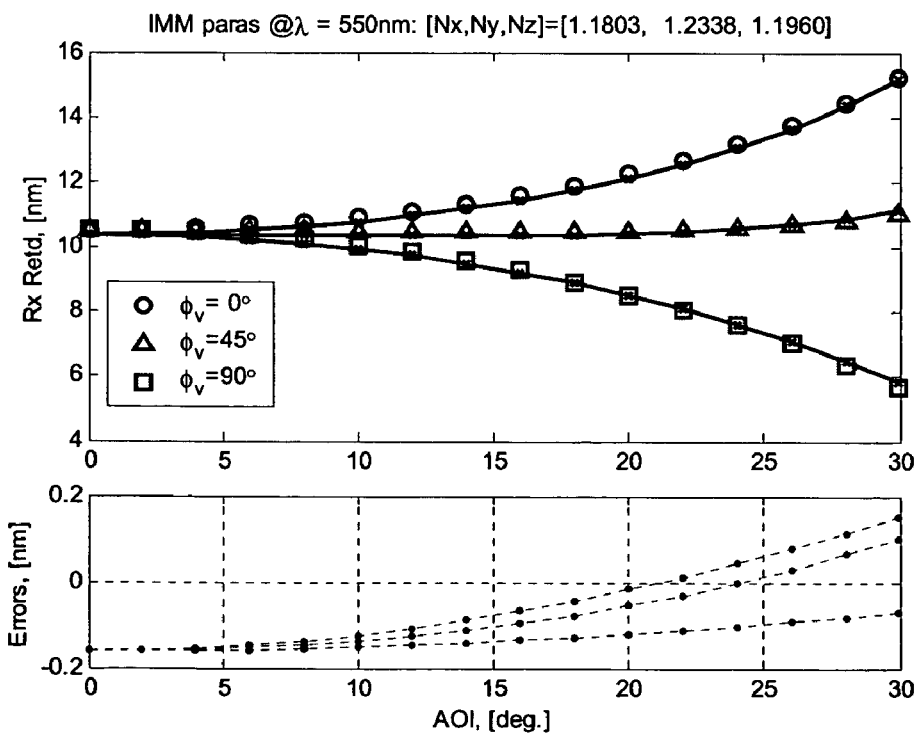
FIG. 45d shows the reflected linear retardance of fitted 40 nm Borofloat/air thin grating on Borofloat substrate.

Referring to FIG. 45(a) there are shown transmittance spectra of a fitted 40 nm Borofloat/air thin grating on a Borofloat substrate. Triangle makers correspond to fit data and dashed lines correspond to GSolver complex electric-field output. Three azimuthal planes, $\phi_v = 0, 45$ and $90°$, were fitted. The Tpp (p-polarization in, p-polarization out) transmittance trends up as AOI is made larger for all azimuthal plane of incidence, whereas the Tss (s-polarization in, s-polarization out) transmittance trends down as AOI is made larger for all azimuthal plane of incidence. Referring to FIG. 45(b) the reflectance spectra of a fitted 40 nm Borofloat/air thin grating on a Borofloat substrate are shown. Round makers correspond to fit data and dashed lines correspond to GSolver complex electric-field output. Three azimuthal planes, $\phi_v = 0$, 45 and $90°$, were fitted. The Rpp (p-polarization in, p-polarization out) reflectance trends down as AOI is made larger for all azimuthal plane of incidence, whereas the Rss (s-polarization in, s-polarization out) reflectance trends up as AOI is made larger for all azimuthal plane of incidence. Referring to FIG. 45(c) the transmitted linear retardance of fitted 40 nm Borofloat/air thin grating on Borofloat substrate is shown, whereas in FIG. 45(d) the reflected linear retardance of fitted 40 nm Borofloat/air thin grating on Borofloat substrate is shown. Notably, the retardance profiles in both the transmitted and reflected directions were at most 0.2 nm deviated from GSolver results. The intensity errors were smaller for reflection than it was for transmission (up to 1% error in this grating example).

These simulations show that fitted principal index results in (12) are more accurate than the EMT predictions in (5), for both the intensity and phase difference (i.e., retardance) quantities. In order words, the principal indices fitted are closer to the interference behavior of the thin grating. The angular retardance profiles of the EMT and IMM models for the example grating are contrasted in FIG. 46. More specifically, the transmitted linear retardance profiles vs. angles of incidence for the 40 nm Borofloat:Air grating calculated using the EMT results and new IMM equivalent layer are compared to the target data produced by GSolver. Not only does EMT predict an erroneous in-plane birefringence, $\Delta n_a$, but the out-of-plane birefringence, $\Delta n_c$, is also significantly in error. These orthogonal birefringence components are defined as, $$\Delta n_a = n_y - n_x \text{ and } \Delta n_c = n_z - (n_y + n_x)/2 \quad (13)$$

Figure 46:
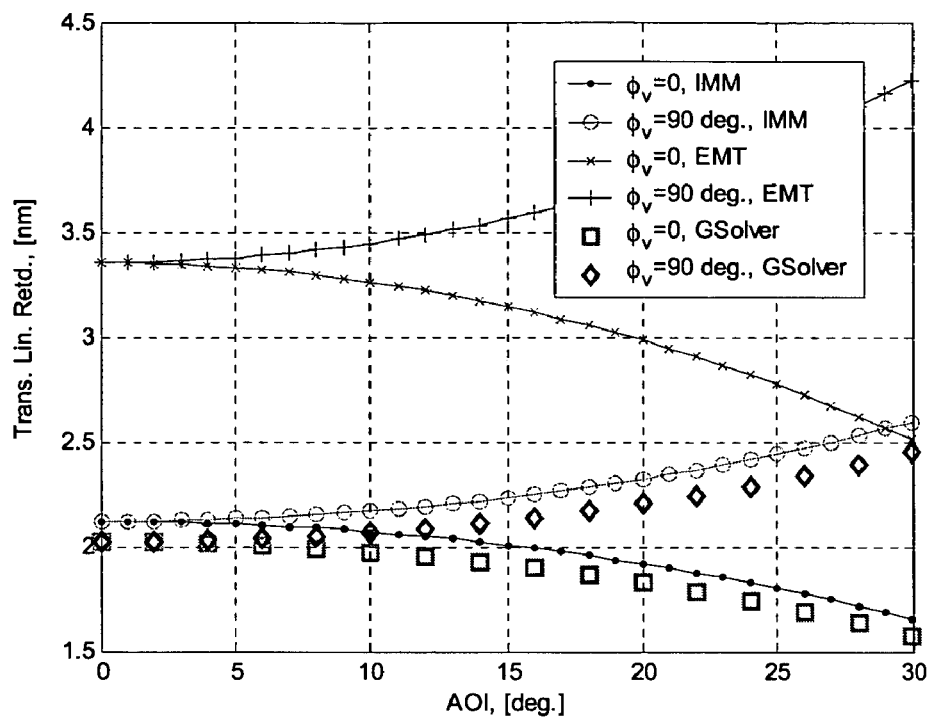
FIG. 46 shows transmitted linear retardance profiles vs. angles of incidence for a 40 nm Borofloat/air grating utilizing the EMT results and new IMM equivalent layer.
Figure 47:
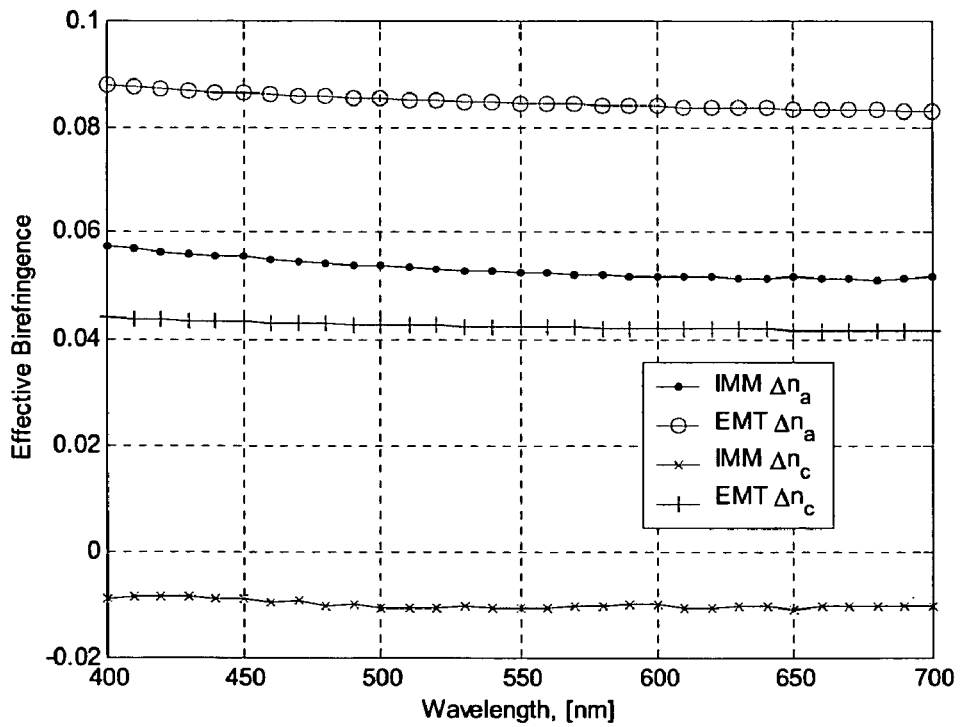
FIG. 47 illustrates the in-plane and out-of-plane birefringence of a binary grating, according to EMT and IMM models.

Clearly, the EMT model gives $\Delta n_c$ as half of ZOB ($\Delta n_c = \Delta n^0$). However, the IMM model predicts almost no out-of-plane birefringence. The spectra of these birefringence components (both EMT and IMM models) are shown in FIG. 47 for wavelength range 400 nm to 700 nm. The thin grating is better modeled as a weakly biaxial layer (in IMM) rather than as a negative uniaxial layer (in EMT). The EMT model gives a larger variation of the net retardance as a function of the incidence angles, as shown in FIG. 46.

In the X-grating example given (i.e., grating vector pointing along X-axis), the on-axis birefringence grows as the grating height increases whereby $n_x$ decreases, and $n_y$ and $n_z$ increase. The indicatrix description of the single layer grating changes from a positive biaxial to a negative biaxial medium and eventually it is adequately represented by a negative uniaxial medium using the EMT models at large grating heights (greater than quarterwave optical thickness using the zeroth order EMT ordinary index of refraction). In the case of large grating heights, a book-stack model is adequate and $n_z = n_y$, rather than a 3D random-rod model having with a long range direction and $n_z \approx n_x$ for small grating heights. With a more accurate birefringent IMM model to represent a thin grating, alternate embodiments of the present invention are described and simulated (i.e., as a thin film stack).

Figure 48:
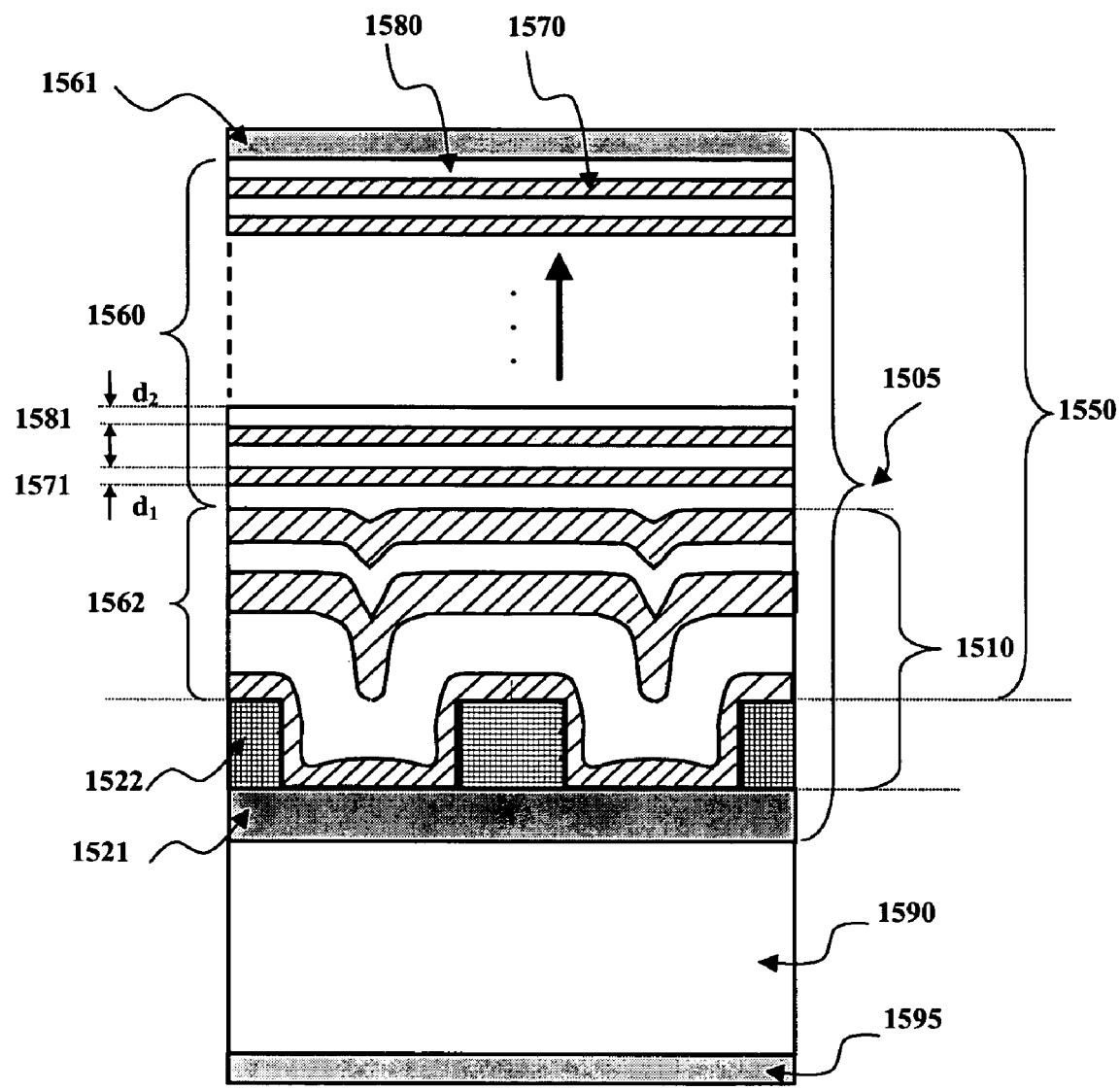
FIG. 48 is a schematic diagram of a full-function grating trim retarder in accordance with one embodiment of the instant invention, including stack of form-birefringent film coated on a textured surface and a second AR applied on a second surface.

Referring to FIG. 48, there is shown a full function A/−C-plate grating trim retarder in accordance with another embodiment of the instant invention. The full function A/−C-plate grating trim retarder 1500 includes a first thin film stack 1505 disposed on the first surface of a transparent substrate 1590 and a second thin film stack 1595 disposed on the second surface of the transparent substrate 1590. The first thin film stack 1505 includes a first segment having an axially-inhomogeneous, periodic index modulation element 1560, a second segment including a transversely-inhomogeneous, periodic index modulation element 1522, and a third intermediate segment 1562 that provides both axially-inhomogeneous, and transversely-inhomogeneous, periodic index modulation sections. In general, the first segment 1560 exhibits out-of-plane retardance, the second segment 1522 exhibits in-plane retardance, and the intermediate segment 1562 exhibits both in-plane and out-of-plane retardance simultaneously. The first film stack 1505 also includes an optional etch-stop stack 1521 and an outer-surface AR layer 1561.

Both the outer-surface AR layer 1561 and the second thin film stack 1595, which are typically dielectric thin layers, provide anti-reflection functionality.

The first thin film stack 1505 is formed typically by depositing a form-birefringent anti-reflection (FBAR) stack on a seed grating. The seed grating 1522, which is a transversely, inhomogeneous, periodic index modulation element, includes a plurality of pedestals interleaved with a plurality of grooves (shown to be filled with part of the FBAR stack). Preferably, the width of the pedestals and grooves are selected such that the seed grating, and/or the undulating segment of the FBAR, forms a transverse zeroth order sub-wavelength grating that provides in-plane form birefringence. The seed grating 1522, which is essentially a textured surface, is typically prepared by etching or lifting-off a top dielectric layer from the etch-stop layer 1521 disposed on the transparent substrate 1590. Alternatively, the spatially patterned surface is prepared using another technique. For example, the seed grating is alternatively prepared as an etched substrate (e.g., as shown in FIG. 40), a patterned photo-resist layer on a transparent substrate, a dielectric1/dielectric2 pattern including a physical step, etc. For applications in the wavelength range between 380 nm to 800 nm, the seed grating 1522 will typically have a grating pitch less than about 250 nm, a duty cycle ratio that varies from 5% to 95% (more typically between 20% and 80%), and a modulation height between 5 nm and 200 nm. Some examples of materials suitable for the seed grating include organic dielectrics and inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides such as $MgF_2$, sulphides, silicon nitride, etc. In addition to the binary (rectangular) seed grating pattern shown, other possible diffractive profiles include saw-tooth-like (triangular), blazed, sinusoidal, and/or trapezoidal grating patterns. In fact, any patterned layer that serves to perturb the deposited layers of the subsequent coating is usable as seed grating.

The FBAR stack 1550, which includes the first segment 1560 and the intermediate segment 1562, is shown being formed from two different materials. As illustrated in FIG. 48, the first segment 1560, which is an axially-inhomogeneous, periodic index modulation element, includes a first plurality of layers 1570, each having a first refractive index and a first thickness 1571 $d_1$, alternating with a second plurality of layers 1580, each having a second refractive index and a second layer thickness 1581 $d_2$. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the out-of-plane form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also possible to use more than two different layer materials. Suitable materials for the first and/or second plurality of layers include organic and inorganic dielectrics.

The intermediate segment 1562, which includes both axially-inhomogeneous and transversely-inhomogeneous periodic index modulation sections, is conveniently formed from the same materials used in the first segment 1560. In this instance, the first 1560 and intermediate segments 1562 are typically deposited during the same procedure, which for example, is performed using a conventional vacuum deposition process. In general, the intermediate segment 1562 is deposited such that the first couple of thin film layers at least partially conform to the shape of the seed grating and provide a periodic undulation along the plane of the substrate 1590. These undulations 1510 give rise to alternating index profiles across the device X-Y plane at numerous longitudinal locations (i.e., provide periodic index modulation in both the traverse plane and the longitudinal directions). Accordingly, A-plate grating elements (gratlets) are created where there are X-Y cross-sections with the transversely inhomogeneous, periodic index modulation. Each gratlet includes a first plurality of regions, each having a first width and a first index of refraction, interleaved with a second plurality of regions, each having a second width and a second index of refraction. The thickness and duty cycle of each gratlet varies continuously (e.g., varies from less than 1% to over 99%). The undulation results in an induced in-plane retardance in the coated layers. In practice, the in-plane retardance of the overall thin film stack 1505 has contributions from both the initial textured surface 1522 and the undulated coated layers 1510. Notably, the in-plane retardance introduced by the coating design and/or coating process, is typically larger than the in-plane retardance of the initial seed grating. Conveniently, the materials and layer thicknesses in the thin film stack 1505 typically allow the intermediate segment 1562 to also function as an inner index matching block.

While the undulating layers have been only described with reference to the intermediate segment 1562, in practice, the boundary between the undulated and non-undulated layers is not always clear. In fact, in many instances the entire thin film stack 1550 will be undulated, with the outer-most layer having the most minute undulation magnitude (<<1 nm peak to valley height difference along the coated layer surface). In any case, the in-plane retardance is given by a distributed effect. More specifically, the in-plane retardance contribution is largest close to the seed layer and reduces progressively towards the outer-most coated layer. The contribution is also non-continuous, since there are fractions of coated layer thickness where a change of material index in the transverse plane does not occur.

Notably, the this full-function A/−C-plate trim retarder is essentially a three dimensional volume holographic element, with the transverse period of modulation unchanged vs. the thickness of the film, and with the magnitude of undulation chirped along the film thickness direction.

Advantageously, this full-function A/−C-plate trim retarder, which provides both in-plane retardance with a defined axis of retardation and a negative out-of-plane retardance, is easily fabricated as an all-dielectric trim retarder. Moreover, the magnitudes of the in-plane and out-of-plane retardance are readily tailored according the requirements of the application (for example, a specific LCoS family of devices). Additionally, the AR property is also optimized such that the compensated panel contrast is not limited by undesirable cross-polarization reflectance of the trim retarder. The distributed effect of the A-plate retardance elements amongst the coated layers ensures a low birefringence (which helps to produce low cross-polarization reflectance) and increases the A-plate retardance of the coated grating vs. uncoated grating. The partial conformal coating, which for example is provided in a conventional vacuum deposition chamber, ensures the absence of roof-structure voids. As a result, this full-function A/−C-plate trim retarder is ideal for use in polarization-based projection systems.

Figure 49:
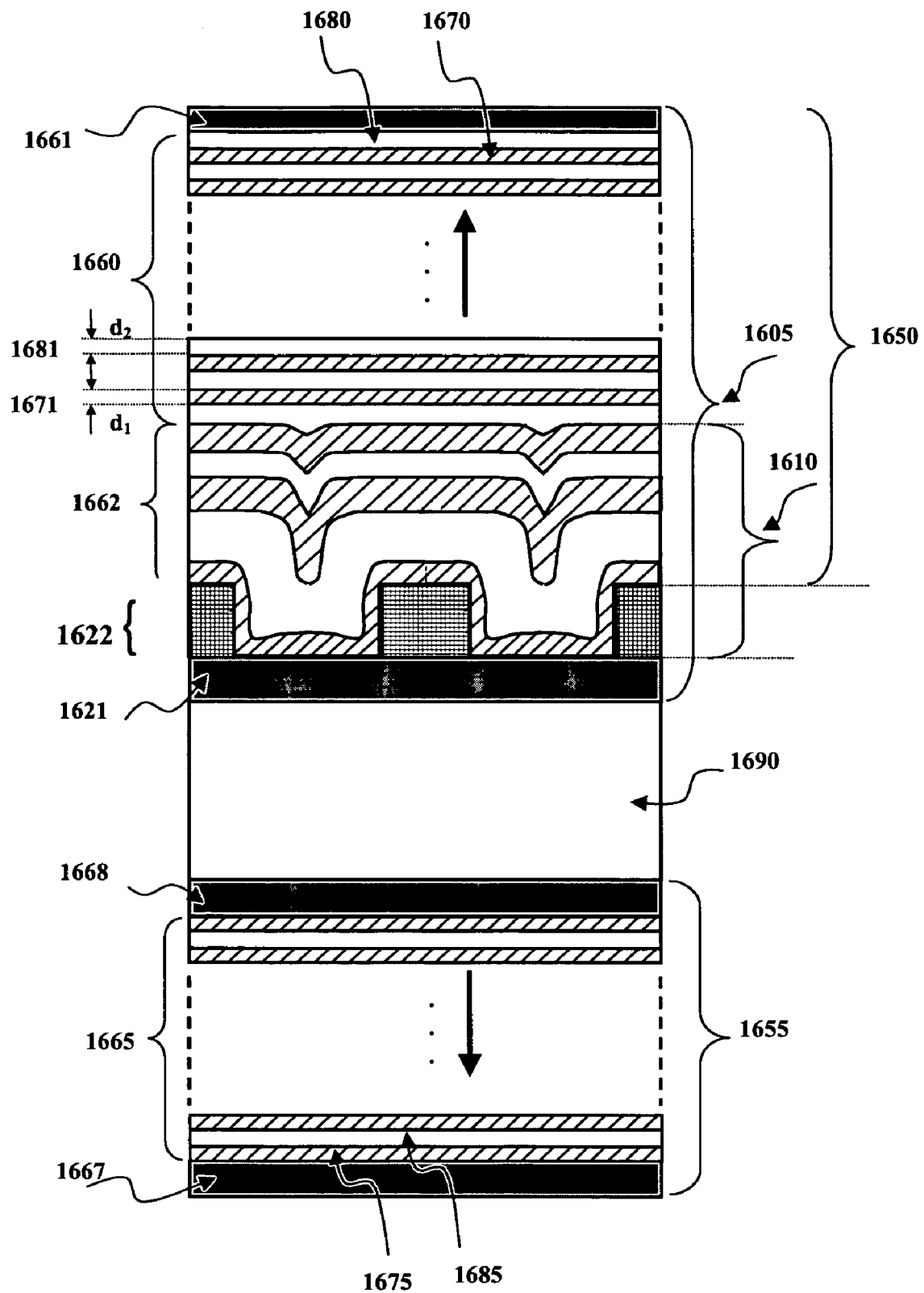
FIG. 49 is a schematic diagram of a full-function grating trim retarder in accordance with another embodiment of the instant invention, including a stack of form-birefringent film coated on a first textured surface and a second stack of form-birefringent film applied on a second surface.

Referring to FIG. 49, there is shown a full function A/−C-plate grating trim retarder in accordance with yet another embodiment of the instant invention. The full function A/−C-plate grating trim retarder 1600 includes a first thin film stack 1605 disposed on the first surface of a transparent substrate 1690 and a second thin film stack 1655 disposed on the second surface of the transparent substrate 1690.

The first thin film stack 1605 includes a first segment having an axially-inhomogeneous, periodic index modulation element 1660, a second segment including a transversely-inhomogeneous, periodic index modulation element 1622, and a third intermediate segment 1662 that provides both axially-inhomogeneous, and transversely-inhomogeneous, periodic index modulation sections. In general, the first segment 1660 exhibits out-of-plane retardance, the second segment 1622 exhibits in-plane retardance, and the intermediate segment 1662 exhibits both in-plane and out-of-plane retardance simultaneously. The first film stack 1605 also includes an optional etch-stop stack 1621 and an outer-surface AR layer 1661.

The first film stack 1605 is formed by depositing a first form-birefringent anti-reflection (FBAR) stack on a seed grating. The seed grating 1622, which is a transversely, inhomogeneous, periodic index modulation element, is shown to include a plurality of pedestals interleaved with a plurality of grooves (shown to be filled with part of the FBAR stack). Preferably, the width of the pedestals and grooves are selected such that the seed grating, and/or the undulating segment of the FBAR, forms a transverse zeroth order sub-wavelength grating that provides in-plane form birefringence. The seed grating 1622, which is essentially a textured surface, is typically prepared by etching or lifting-off a top dielectric layer from the etch-stop layer 1621 disposed on the transparent substrate 1690. Alternatively, the spatially patterned surface is prepared using another technique. For example, the seed grating is alternatively prepared as an etched substrate (e.g., as shown in FIG. 40), a patterned photo-resist layer on a transparent substrate, a dielectric1/dielectric2 pattern including a physical step, etc. For applications in the wavelength range between 380 nm to 800 nm, the seed grating 1622 will typically have a grating pitch less than about 250 nm, a duty cycle ratio that varies from 5% to 95% (more typically between 20% and 80%), and a modulation height between 5 nm and 200 nm. Some examples of materials suitable for the seed grating include organic dielectrics and inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides such as $MgF_2$, sulphides, silicon nitride, etc. In addition to the binary (rectangular) seed grating pattern shown, other possible diffractive profiles include saw-tooth-like (triangular), blazed, sinusoidal, and/or trapezoidal grating patterns. In fact, any patterned layer that serves to perturb the deposited layers of the subsequent coating is usable as seed grating.

The FBAR stack 1650, which includes the first segment 1660 and the intermediate segment 1662, is shown being formed from two different materials. As illustrated in FIG. 49, the first segment 1660, which is an axially-inhomogeneous, periodic index modulation element, includes a first plurality of layers 1670, each having a first refractive index and a first thickness 1671 $d_1$, alternating with a second plurality of layers 1680, each having a second refractive index and a second layer thickness 1681 $d_2$. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the out-of-plane form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle between 20% and 80%, the layer thickness in each of the first and second plurality of layers is typically greater than about 1 nm and less than about 100 nm. While the alternating stack is illustrated with only two different layer materials, it is also possible to use more than two different layer materials. Suitable materials for the first and/or second plurality of layers include organic and inorganic dielectrics.

The intermediate segment 1662, which includes both axially-inhomogeneous and transversely-inhomogeneous periodic index modulation sections, is conveniently formed from the same materials used in the first segment 1660. In this instance, the first 1660 and intermediate segments 1662 are typically deposited during the same procedure, which for example, is performed using a conventional vacuum deposition process. In general, the intermediate segment 1662 is deposited such that the first couple of thin film layers at least partially conform to the shape of the seed grating and provide a periodic undulation along the plane of the substrate 1690. These undulations 1610 give rise to alternating index profiles across the device X-Y plane at numerous longitudinal locations (i.e., provide periodic index modulation in both the traverse plane and the longitudinal directions). Accordingly, A-plate gratlets are created where there are X-Y cross-sections with the transversely inhomogeneous, periodic index modulation. Each gratlet includes a first plurality of regions, each having a first width and a first index of refraction, interleaved with a second plurality of regions, each having a second width and a second index of refraction. The thickness and duty cycle of each gratlet varies continuously (e.g., varies from less than 1% to over 99%). The undulation results in an induced in-plane retardance in the coated layers. In practice, the in-plane retardance of the overall thin film stack 1605 has contributions from both the initial textured surface 1622 and the undulated coated layers 1610. Notably, the in-plane retardance introduced by the coating design and/or coating process, is typically larger than the in-plane retardance of the initial seed grating. Conveniently, the materials and layer thicknesses in the thin film stack 1605 typically allows the intermediate segment 1662 to also function as an inner index matching block.

While the undulating layers have been only described with reference to the intermediate segment 1662, in practice, the boundary between the undulated and non-undulated layers is not always clear. In fact, in many instances the entire thin film stack 1650 will be undulated, with the outer-most layer having the most minute undulation magnitude (<<1 nm peak to valley height difference along the coated layer surface). In any case, the in-plane retardance is given by a distributed effect. More specifically, the in-plane retardance contribution is largest close to the seed layer and reduces progressively towards the outer-most coated layer. The contribution is also non-continuous, since there are fractions of coated layer thickness where a change of material index in the transverse plane does not occur.

The second thin film stack 1655 is formed by depositing a second form-birefringent AR stack 1655 on a non-textured surface of the transparent substrate 1690. The second FBAR includes an alternating-index stack 1665, which typically includes two or more materials, an outer index matching block 1667, and an inner index matching block 1668. The axially periodic structure 1665 includes a first plurality of layers 1675, each having a first refractive index and a first thickness, alternating with a second plurality of layers 1685, each having a second refractive index and a second layer thickness. This FBAR element 1655 exhibits no in-plane retardance at normal incidence. At off-axis incidence, the e-wave index of refraction is smaller than the o-wave index of refraction. This FBAR element 1655 exhibits negative out-of-plane retardance. Both the outer index matching block 1667 and an inner index matching block 1668, which are typically dielectric thin layers, provide anti-reflection functionality.

Notably, the this full-function A/–C-plate trim retarder is essentially a three dimensional volume holographic element, with the transverse period of modulation unchanged vs. the thickness of the film, and with the magnitude of undulation chirped along the film thickness direction.

Advantageously, this full-function A/–C-plate trim retarder, which provides both in-plane retardance with a defined axis of retardation and a negative out-of-plane retardance, is easily fabricated as an all-dielectric trim retarder. Moreover, the magnitudes of the in-plane and out-of-plane retardance are readily tailored according the requirements of the application (for example, a specific LCoS family of devices). Additionally, the AR property is also optimized such that the compensated panel contrast is not limited by undesirable cross-polarization reflectance of the trim retarder. The distributed effect of the A-plate retardance elements amongst the coated layers ensures a low birefringence (which helps to produce low cross-polarization reflectance) and increases the A-plate retardance of the coated grating vs. uncoated grating. The partial conformal coating, which for example is provided in a conventional vacuum deposition chamber, ensures the absence of roof-structure voids. As a result, this full-function A/–C-plate trim retarder is ideal for use polarization-based projection systems.

Figure 50:
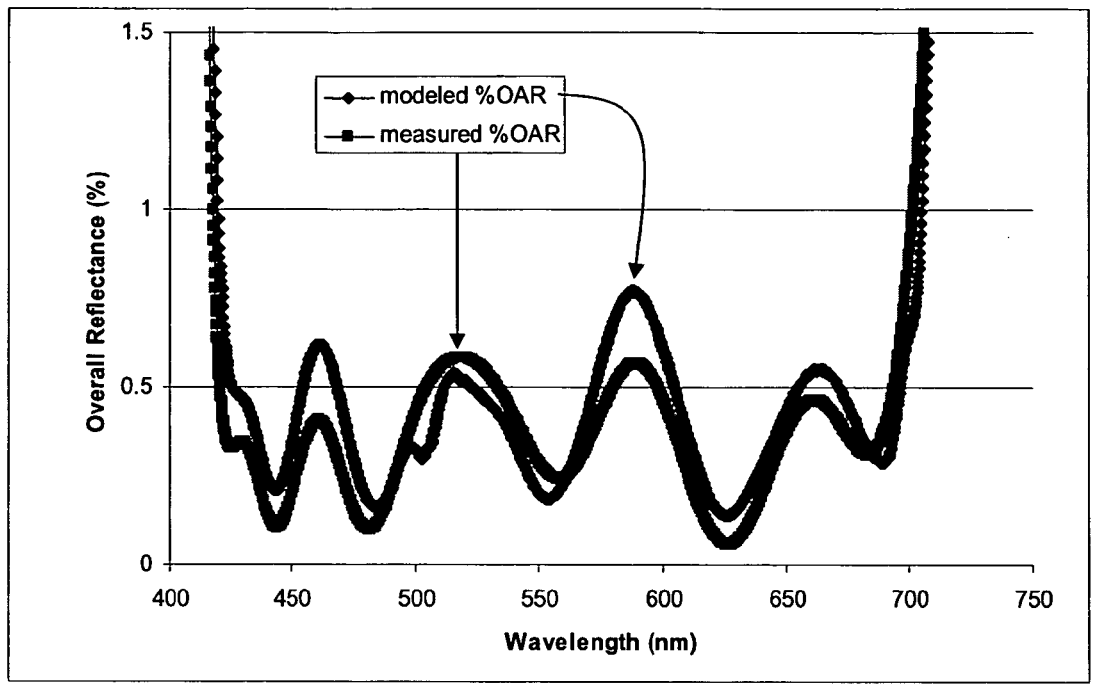
FIG. 50 shows modeled and measured overall reflectance with an unpolarized incident at 12° along a plane parallel to the grating vector.
Figure 51:
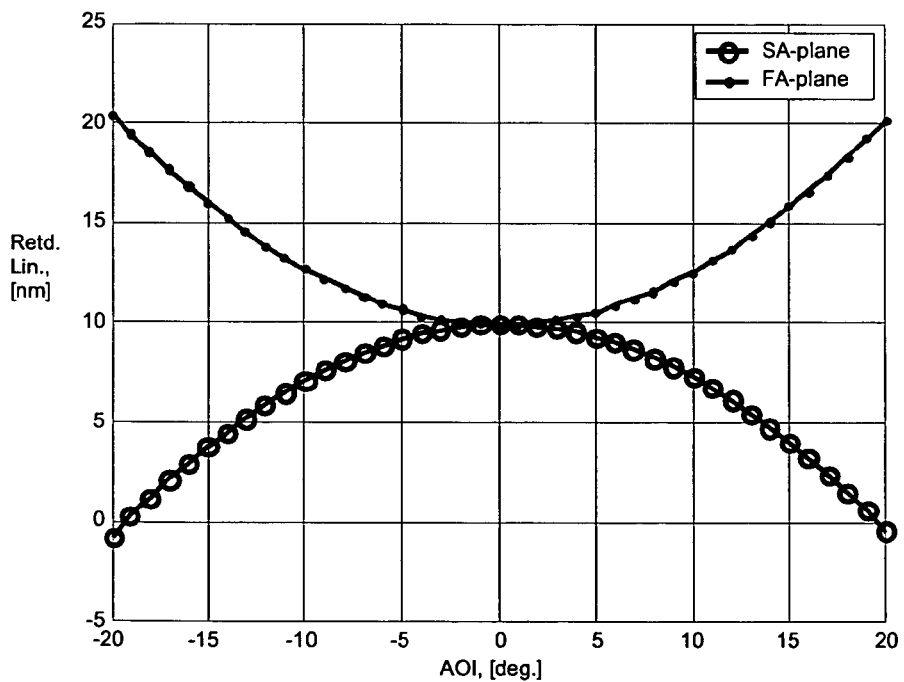
FIG. 51 shows measured transmitted retardance profiles of a coated grating, along the slow-axis and fast-axis plane (also the along and orthogonal to the grating lines)
Figure 52A:
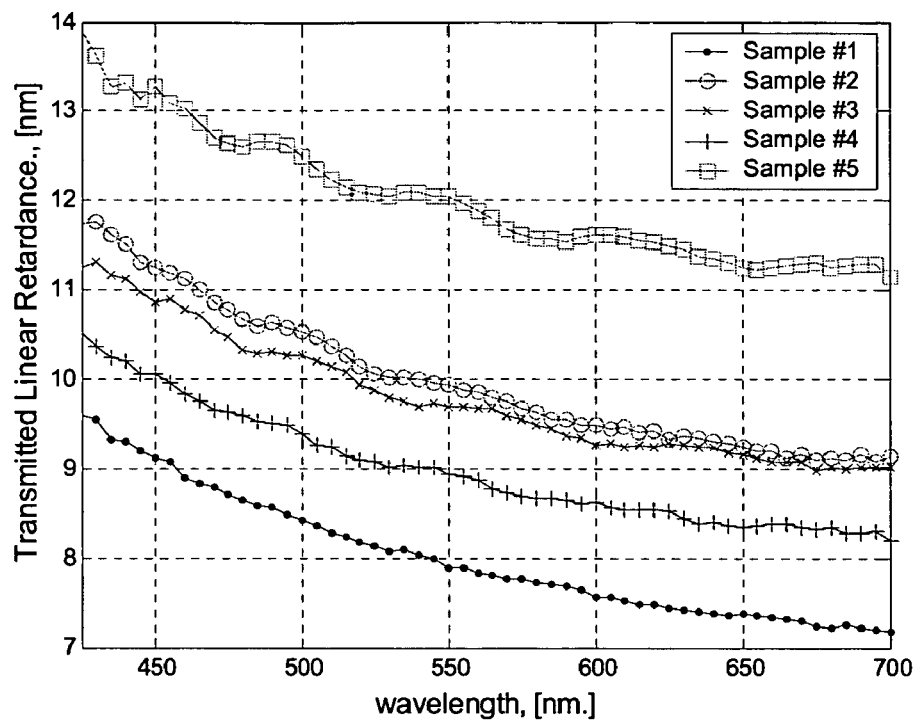
FIG. 52a shows measured spectra of transmitted retardance for several coated gratings having initial seed grating heights between 25 nm and 50 nm and utilizing different FBAR designs.
Figure 52B:
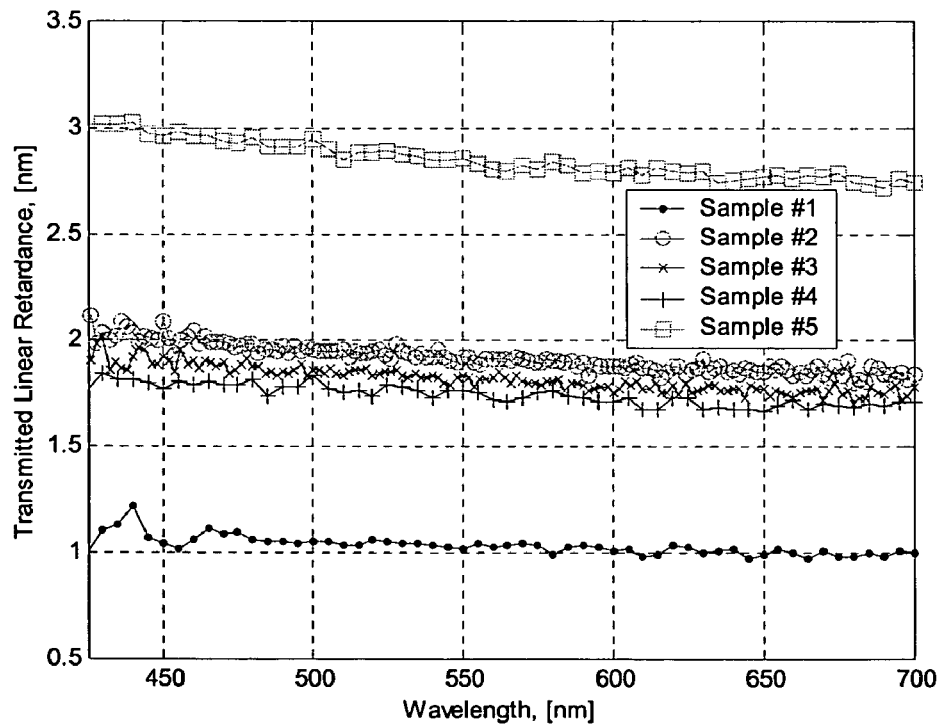
FIG. 52b shows measured spectra of transmitted retardance for several uncoated gratings having grating heights between 25 nm and 50 nm, corresponding to the measured retardance results shown in FIG. 52(a)
Figure 53:
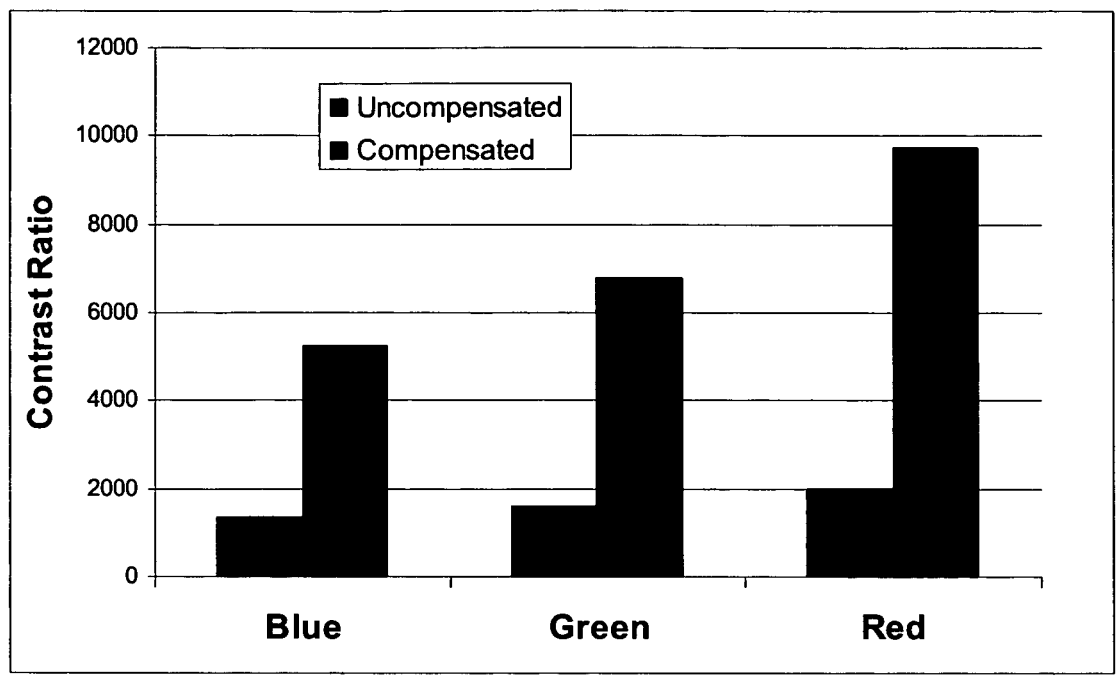
FIG. 53 shows measured red, green and blue band VAN-mode LCoS light engine contrast ratios.

The thin film design incorporates equivalent birefringence model to represent each thin grating layer of alternating materials in the transverse plane. An example of the modeled and measured overall-reflectance of the coated grating is given in FIG. 50. The seed grating used for the results shown in FIG. 50 had a grating depth of approximately 40 nm. A second coated grating had retardance profiles vs. angles of incidence along the slow- and fast-axes planes as shown in FIG. 51. In this case, the C-plate retardance was fitted to be approx. −200 nm, referencing a standard negative uniaxial material indices of $\{n_e=1.50$ and $n_o=1.65\}$ at $\lambda=550$ nm. The measured transmitted retardance spectra of several coated gratings with initial seed grating heights of between 25 and 50 nm and having a variety of FBAR repeated pair thickness are shown in FIG. 52(*a*). The nominal transmitted linear retardance at $\lambda=550$ nm ranges from 8 nm to 12 nm, depending on the seed grating and coating designs. For comparison, the uncoated gratings measured between 1 and 3 nm of transmitted linear retardance at $\lambda=550$ nm, as illustrated in FIG. 52(*b*). The additional retardance induced was a result of the distributed undulation in the coated layers. It is anticipated that a small magnitude retarder, with up to tens of nanometer of in-plane retardance within the visible band and a few tens to hundreds of negative C-plate retardance can be designed. Such a coated optical retarder, utilizing a distributed grating, improves the sequential image contrast of an LCoS light engine significantly. As an example, the on-state vs. off-state contrast of a VAN-model LCoS, having a nominal 2 nm in-plane retarder, are given in FIG. 53. The cone illumination was set at f/2.5. Under this cone, all the rays were sufficiently compensated after traversing both the all-dielectric grating-based trim retarder and the reflective panel. The uncompensated panel contrast was about 2,000:1 whereas the grating-based retarder compensated panel gave nearly 7,000:1 sequential contrast. These contrast ratios were photopically weighted over the visible band. The band-by-band contrast ratios are as illustrated in FIG. 53.

Figure 54:
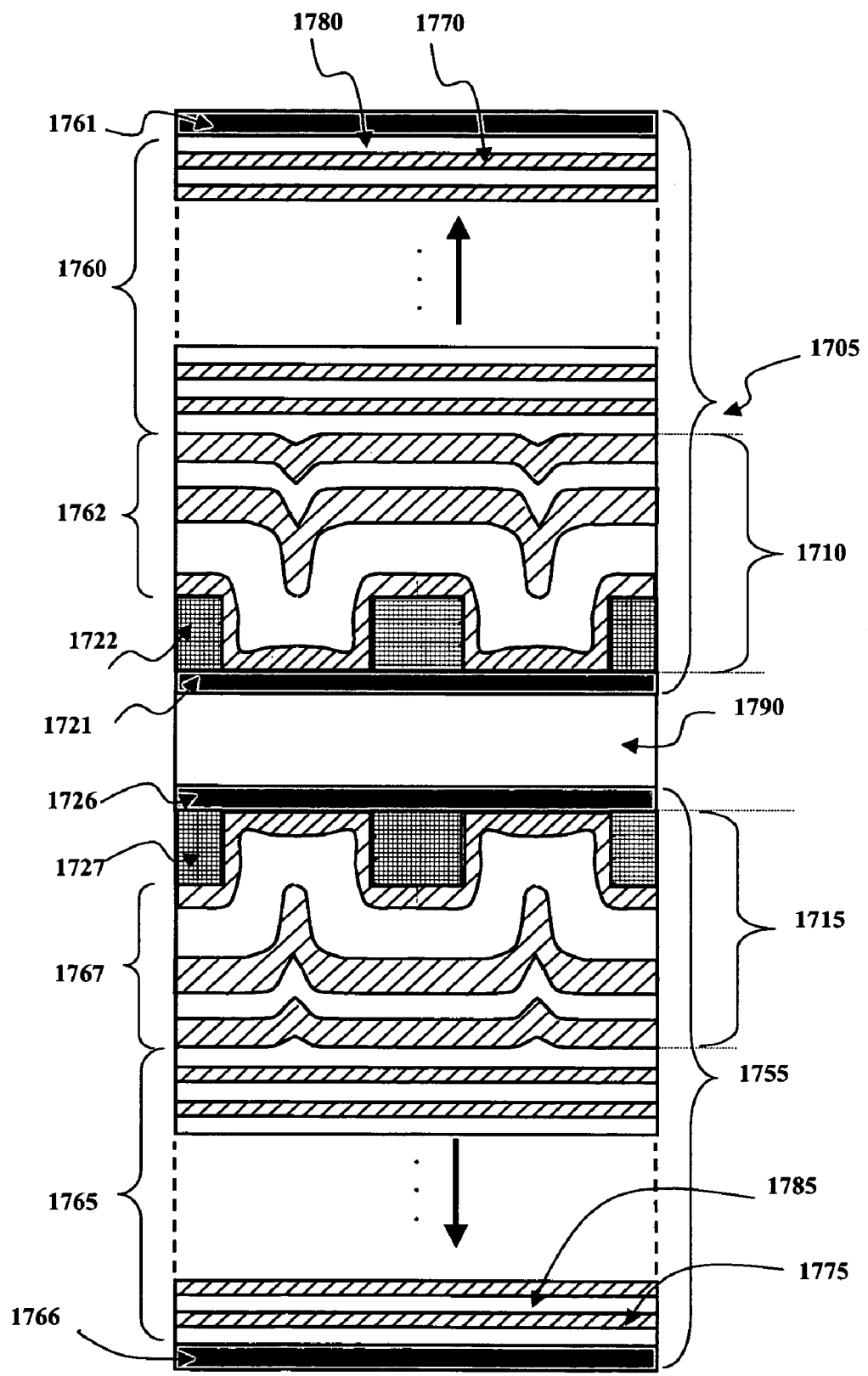
FIG. 54 is a schematic diagram of a full-function grating trim retarder in accordance with another embodiment of the instant invention, including a stack of form-birefringent film coated on a first textured surface and a second AR applied on a second textured surface.

Referring to FIG. 54, there is shown a full function A/–C-plate grating trim retarder in accordance with yet another embodiment of the instant invention. The full function A/–C-plate grating trim retarder 1700 includes a first thin film stack 1705 disposed on the first surface of a transparent substrate 1790 and a second thin film stack 1755 disposed on the second surface of the transparent substrate 1790.

The first thin film stack 1705 includes a first segment having an axially-inhomogeneous, periodic index modulation element 1760, a second segment including a transversely-inhomogeneous, periodic index modulation element 1722, and a third intermediate segment 1762 that provides both axially-inhomogeneous, and transversely-inhomogeneous, periodic index modulation sections. In general, the first segment 1760 exhibits out-of-plane retardance, the second segment 1722 exhibits in-plane retardance, and the intermediate segment 1762 exhibits both in-plane and out-of-plane retardance simultaneously. The first film stack 1705 also includes an optional etch-stop stack 1721 and an outer-surface AR layer 1761.

The first thin film stack 1705 is formed by depositing a first form-birefringent anti-reflection (FBAR) stack on a seed grating. The seed grating 1722, which is a transversely, inhomogeneous, periodic index modulation element, includes a plurality of pedestals interleaved with a plurality of grooves (shown to be filled with part of the FBAR stack). Preferably, the width of the pedestals and grooves are selected such that the seed grating, and/or the undulating segment of the FBAR, forms a transverse zeroth order sub-wavelength grating that provides in-plane form birefringence. The seed grating 1722, which is essentially a textured surface, is typically prepared by etching or lifting-off a top dielectric layer from the etch-stop layer 1721 disposed on the transparent substrate 1790. Alternatively, the spatially patterned surface is prepared using another technique. For example, the seed grating is alternatively prepared as an etched substrate (e.g., as shown in FIG. 40), a patterned photo-resist layer on a transparent substrate, a dielectric1/dielectric2 pattern including a physical step, etc. For applications in the wavelength range between 380 nm to 800 nm, the seed grating 1722 will typically have a grating pitch less than about 250 nm, a duty cycle ratio that varies from 5% to 95% (more typically between 20% and 80%), and a modulation height between 5 nm and 200 nm. Some examples of materials suitable for the seed grating include organic dielectrics and inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides such as $MgF_2$, sulphides, silicon nitride, etc. In addition to the binary (rectangular) seed grating pattern shown, other possible diffractive profiles include saw-tooth-like (triangular), blazed, sinusoidal, and/or trapezoidal grating patterns. In fact, any patterned layer that serves to perturb the deposited layers of the subsequent coating is usable as seed grating.

The FBAR stack, which includes the first segment 1760 and the intermediate segment 1762, is shown being formed from two different materials. As illustrated in FIG. 54, the first segment 1760, which is an axially-inhomogeneous, periodic index modulation element, includes a first plurality of layers

1770, each having a first refractive index and a first thickness, alternating with a second plurality of layers 1780, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the out-of-plane form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ration between 20% and 80%, the layer thickness in each of the first and second plurality of layers is typically greater than about 1 nm and less than about 100 nm. While the alternating stack is illustrated with only two different layer materials, it is also possible to use more than two different layer materials. Suitable materials for the first and/or second plurality of layers include organic and inorganic dielectrics.

The intermediate segment 1762, which includes both axially-inhomogeneous and transversely-inhomogeneous periodic index modulation sections, is conveniently formed from the same materials used in the first segment 1760. In this instance, the first 1760 and intermediate segments 1762 are typically deposited during the same procedure, which for example, is performed using a conventional vacuum deposition process. In general, the intermediate segment 1762 is deposited such that the first couple of thin film layers at least partially conform to the shape of the seed grating and provide a periodic undulation along the plane of the substrate 1790. These undulations 1710 give rise to alternating index profiles across the device X-Y plane at numerous longitudinal locations (i.e., provide periodic index modulation in both the traverse plane and the longitudinal directions). Accordingly, A-plate gratlets are created where there are X-Y cross-sections with the transversely inhomogeneous, periodic index modulation. Each gratlet includes a first plurality of regions, each having a first width and a first index of refraction, interleaved with a second plurality of regions, each having a second width and a second index of refraction. The thickness and duty cycle of each gratlet varies continuously (e.g., varies from less than 1% to over 99%). The undulation results in an induced in-plane retardance in the coated layers. In practice, the in-plane retardance of the overall thin film stack 1705 has contributions from both the initial textured surface 1722 and the undulated coated layers 1710. Notably, the in-plane retardance introduced by the coating design and/or coating process, is typically larger than the in-plane retardance of the initial seed grating. Conveniently, the materials and layer thicknesses in the thin film stack 1705 typically allows the intermediate segment 1762 to also function as an inner index matching block.

The second thin film stack 1755 includes a first segment having an axially-inhomogeneous, periodic index modulation element 1765, a second segment including a transversely-inhomogeneous, periodic index modulation element 1727, and a third intermediate segment 1767 that provides both axially-inhomogeneous, and transversely-inhomogeneous, periodic index modulation sections. In general, the first segment 1765 exhibits out-of-plane retardance, the second segment 1727 exhibits in-plane retardance, and the intermediate segment 1767 exhibits both in-plane and out-of-plane retardance simultaneously. The second film stack 1755 also includes an optional etch-stop stack 1726 and an outer-surface AR layer 1766.

The second thin film stack 1755 is formed by depositing a second form-birefringent anti-reflection (FBAR) stack on a second seed grating. The second seed grating 1727, which is a transversely, inhomogeneous, periodic index modulation element, includes a plurality of pedestals interleaved with a plurality of grooves (shown to be filled with part of the FBAR stack). Preferably, the width of the pedestals and grooves are selected such that the seed grating, and/or the undulating segment of the FBAR, forms a transverse zeroth order sub-wavelength grating that provides in-plane form birefringence. The seed grating 1727, which is essentially a textured surface, is typically prepared by etching or lifting-off a top dielectric layer from the etch-stop layer 1726 disposed on the transparent substrate 1790. Alternatively, the spatially patterned surface is prepared using another technique. For example, the seed grating is alternatively prepared as an etched substrate (e.g., as shown in FIG. 40), a patterned photo-resist layer on a transparent substrate, a dielectric1/dielectric2 pattern including a physical step, etc. For applications in the wavelength range between 380 nm to 800 nm, the seed grating 1727 will typically have a grating pitch less than about 250 nm, a duty cycle ratio that varies from 5% to 95% (more typically between 20% and 80%), and a modulation height between 5 nm and 200 nm. Some examples of materials suitable for the seed grating include organic dielectrics and inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides such as $MgF_2$, sulphides, silicon nitride, etc. In addition to the binary (rectangular) seed grating pattern shown, other possible diffractive profiles include saw-tooth-like (triangular), blazed, sinusoidal, and/or trapezoidal grating patterns. In fact, any patterned layer that serves to perturb the deposited layers of the subsequent coating is usable as seed grating.

The FBAR stack, which includes the first segment 1765 and the intermediate segment 1767, is shown being formed from two different materials. As illustrated in FIG. 54, the first segment 1765, which is an axially-inhomogeneous, periodic index modulation element, includes a first plurality of layers 1775, each having a first refractive index and a first thickness, alternating with a second plurality of layers 1785, each having a second refractive index and a second layer thickness. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the out-of-plane form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ration between 20% and 80%, the layer thickness in each of the first and second plurality of layers is typically greater than about 1 nm and less than about 100 nm. While the alternating stack is illustrated with only two different layer materials, it is also possible to use more than two different layer materials. Suitable materials for the first and/or second plurality of layers include organic and inorganic dielectrics.

The intermediate segment 1767, which includes both axially-inhomogeneous and transversely-inhomogeneous periodic index modulation sections, is conveniently formed from the same materials used in the first segment 1765. In this instance, the first 1765 and intermediate segments 1767 are typically deposited during the same procedure, which for example, is performed using a conventional vacuum deposition process. In general, the intermediate segment 1767 is deposited such that the first couple of thin film layers at least partially conform to the shape of the seed grating and provide a periodic undulation along the plane of the substrate 1790. These undulations 1715 give rise to alternating index profiles across the device X-Y plane at numerous longitudinal locations (i.e., provide periodic index modulation in both the traverse plane and the longitudinal directions). Accordingly, A-plate gratlets are created where there are X-Y cross-sections with the transversely inhomogeneous, periodic index modulation. Each gratlet includes a first plurality of regions, each having a first width and a first index of refraction, interleaved with a second plurality of regions, each having a second width and a second index of refraction. The thickness and duty cycle of each gratlet varies continuously (e.g., varies from less than 1% to over 99%). The undulation results in an induced in-plane retardance in the coated layers. In practice, the in-plane retardance of the overall thin film stack 1755 has contributions from both the initial textured surface 1727 and the undulated coated layers 1715. Notably, the in-plane retardance introduced by the coating design and/or coating process, is typically larger than the in-plane retardance of the initial seed grating. Conveniently, the materials and layer thicknesses in the thin film stack 1755 typically allows the intermediate segment 1767 to also function as an inner index matching block.

While the undulating layers in the first 1705 and second 1755 thin stacks have been only described with reference to the intermediate segments 1762 and 1767, in practice, the boundary between the undulated and non-undulated layers is not always clear. In fact, in many instances the entire thin film stack 1705 and/or 1755 will be undulated, with the outer-most layer having the most minute undulation magnitude (<<1 nm peak to valley height difference along the coated layer surface). In any case, the in-plane retardance is given by a distributed effect. More specifically, the in-plane retardance contribution is largest close to the seed layer and reduces progressively towards the outer-most coated layer. The contribution is also non-continuous, since there are fractions of coated layer thickness where a change of material index in the transverse plane does not occur.

Including two coated gratings, cascaded inhomogeneously on a single substrate, provides a boost in the achievable retardance. In general, there is a requirement to align the rotational angles of grating lines 722 and 727, but not the lateral translation of the two sets of grating lines. Any misalignment in the rotational angle will manifest as a drop in the linear retardance and an increase in the circular retardance of the trim retarder. Including two coated gratings, cascaded inhomogeneously on a single substrate, also provides an achromatic retarder, wherein the two coated gratings are aligned non-parallel and non-orthogonal with respect to their grating lines.

Notably, the this full-function A/–C-plate trim retarder is essentially a three dimensional volume holographic element, with the transverse period of modulation unchanged vs. the thickness of the film, and with the magnitude of undulation chirped along the film thickness direction.

Advantageously, this full-function A/–C-plate trim retarder, which provides both in-plane retardance with a defined axis of retardation and a negative out-of-plane retardance, is easily fabricated as an all-dielectric trim retarder. Moreover, the magnitudes of the in-plane and out-of-plane retardance are readily tailored according the requirements of the application (for example, a specific LCoS family of devices). Additionally, the AR property is also optimized such that the compensated panel contrast is not limited by undesirable cross-polarization reflectance of the trim retarder. The distributed effect of the A-plate retardance elements amongst the coated layers ensures a low birefringence (which helps to produce low cross-polarization reflectance) and increases the A-plate retardance of the coated grating vs. uncoated grating. The partial conformal coating, which for example is provided in a conventional vacuum deposition chamber, ensures the absence of roof-structure voids. As a result, this full-function A/–C-plate trim retarder is ideal for use polarization-based projection systems.

Figure 55:
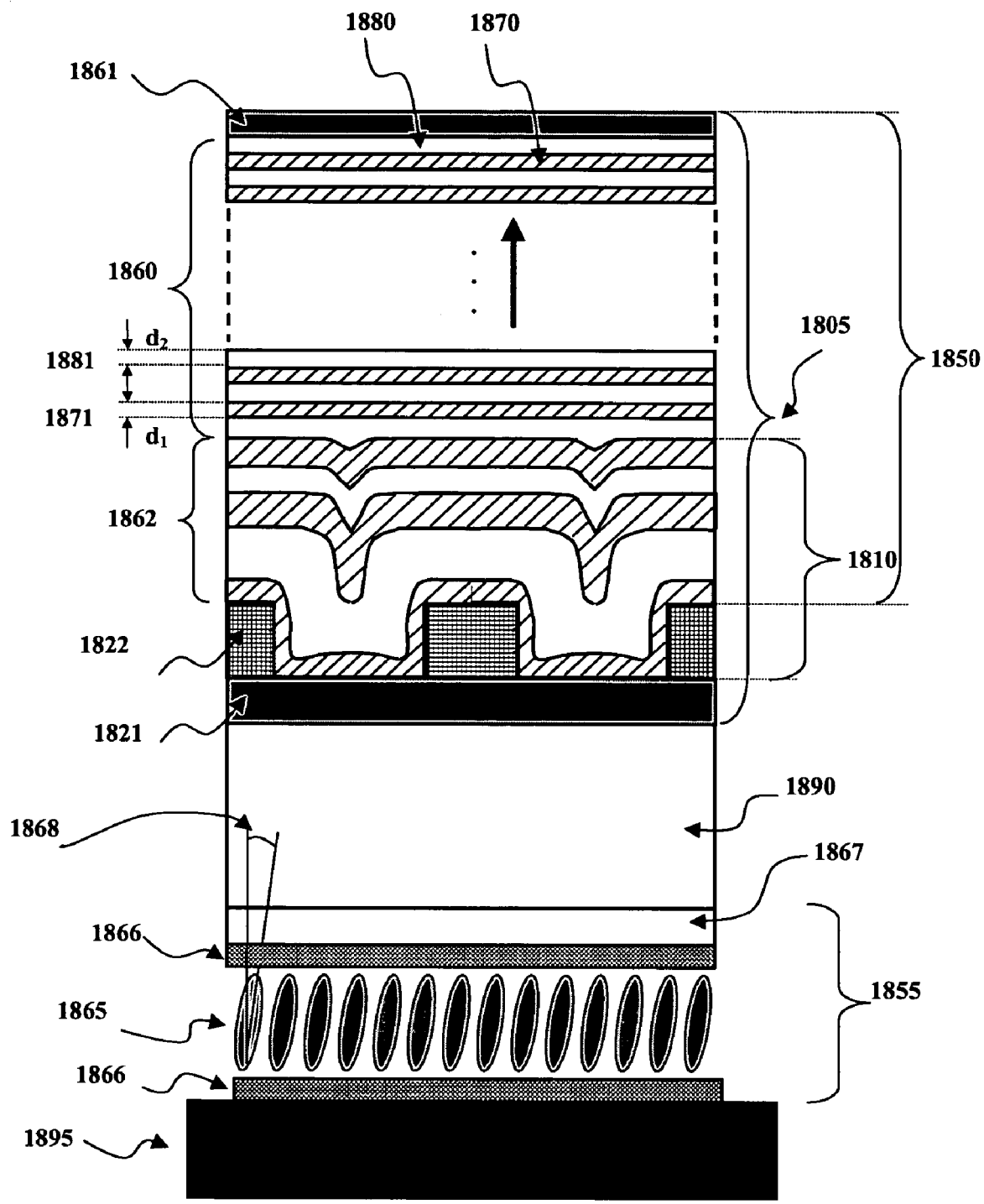
FIG. 55 is a schematic diagram of a full-function grating trim retarder in accordance with another embodiment of the instant invention, including a stack of form-birefringent film coated on a first textured surface which forms part of the cover glass of a display panel.

Referring to FIG. 55, an LCOS device 1800 including an integrated grating trim retarder and display panel cover substrate is shown. The grating trim retarder sub-assembly includes a thin film stack 1805 including an axial grating 1860 that exhibits out-of-plane retardance, a transverse grating 1822 that exhibits in-plane retardance, and subsection 1810 that exhibits both in-plane and out-of-plane retardance simultaneously. The thin film stack 1805, which also includes index matching stack 1861 and optional etch-stop stack 1821, is disposed on the first surface of a first transparent cover substrate 1890. The second surface of the transparent cover substrate 1890 forms a liquid crystal cell sub-assembly 1855 with a second substrate 1895 of the display. This trim retarder sub-assembly 1805 forms an LC cell gap, in which LC molecules 1865 are disposed, with the top-level metal reflectors disposed on the silicon backplane (substrate) 1895.

The thin film stack 1805 is formed by depositing a form-birefringent anti-reflection (FBAR) stack on a seed grating. The seed grating 1822, which is a transversely, inhomogeneous, periodic index modulation element, includes a plurality of pedestals interleaved with a plurality of grooves (shown to be filled with part of the FBAR stack). Preferably, the width of the pedestals and grooves are selected such that the seed grating, and/or the undulating segment of the FBAR, forms a transverse zeroth order sub-wavelength grating that provides in-plane form birefringence. The seed grating 1822, which is essentially a textured surface, is typically prepared by etching or lifting-off a top dielectric layer from the etch-stop layer 1821 disposed on the transparent substrate 1890. Alternatively, the spatially patterned surface is prepared using another technique. For example, the seed grating is alternatively prepared as an etched substrate (e.g., as shown in FIG. 40), a patterned photo-resist layer on a transparent substrate, a dielectric1/dielectric2 pattern including a physical step, etc. For applications in the wavelength range between 380 nm to 800 nm, the seed grating 1822 will typically have a grating pitch less than about 250 nm, a duty cycle ratio that varies from 5% to 95% (more typically between 20% and 80%), and a modulation height between 5 nm and 200 nm. Some examples of materials suitable for the seed grating include organic dielectrics and inorganic dielectrics such as metal oxides (e.g., $SiO_2$, $Al_2O_3$, $Ta_2O_5$, $Nb_2O_5$, $HfO_2$, $TiO_2$, niobia-tantala, niobia-titania), fluorides such as $MgF_2$, sulphides, silicon nitride, etc. In addition to the binary (rectangular) seed grating pattern shown, other possible diffractive profiles include saw-tooth-like (triangular), blazed, sinusoidal, and/or trapezoidal grating patterns. In fact, any patterned layer that serves to perturb the deposited layers of the subsequent coating is usable as seed grating.

The FBAR stack 1850, which includes the first segment 1860 and the intermediate segment 1862, is shown being formed from two different materials. As illustrated in FIG. 55, the first segment 1860, which is an axially-inhomogeneous, periodic index modulation element, includes a first plurality of layers 1870, each having a first refractive index and a first thickness 1871 $d_1$, alternating with a second plurality of layers 1880, each having a second refractive index and a second layer thickness 1881 $d_2$. The material and layer thicknesses in each of the first and second plurality of layers are selected such that the structure forms a zeroth order sub-wavelength grating that provides negative out-of-plane form birefringence. In general, each of the first and second plurality of layers will typically include between about 10 and 500 layers, and more typically between about 50 to 110 layers. A large difference (e.g. greater than 0.5 and preferably greater than 0.7) between the first and second refractive indices will typically maximize the out-of-plane form birefringence and minimize the thickness of the coating. In addition, the form birefringence is also typically maximized by selecting the layer thickness $d_1$ or $d_2$ to be substantially similar or the same. For the wavelength range of 380 nm to 800 nm, and a duty cycle ration between 20% and 80%, the layer thickness in each of the first and second plurality of layers is typically greater than about 1 nm and less than about 100 nm. While the alternating stack is illustrated with only two different layer materials, it is also possible to use more than two different layer materials. Suitable materials for the first and/or second plurality of layers include organic and inorganic dielectrics.

The intermediate segment 1862, which includes both axially-inhomogeneous and transversely-inhomogeneous periodic index modulation sections, is conveniently formed from the same materials used in the first segment 1860. In this instance, the first 1860 and intermediate segments 1862 are typically deposited during the same procedure, which for example, is performed using a conventional vacuum deposition process. In general, the intermediate segment 1862 is deposited such that the first couple of thin film layers at least partially conform to the shape of the seed grating and provide a periodic undulation along the plane of the substrate 1890. These undulations 1810 give rise to alternating index profiles across the device X-Y plane at numerous longitudinal locations (i.e., provide periodic index modulation in both the traverse plane and the longitudinal directions). Accordingly, A-plate gratlets are created where there are X-Y cross-sections with the transversely inhomogeneous, periodic index modulation. Each gratlet includes a first plurality of regions, each having a first width and a first index of refraction, interleaved with a second plurality of regions, each having a second width and a second index of refraction. The thickness and duty cycle of each gratlet varies continuously (e.g., varies from less than 1% to over 99%). The undulation results in an induced in-plane retardance in the coated layers. In practice, the in-plane retardance of the overall thin film stack 1805 has contributions from both the initial textured surface 1822 and the undulated coated layers 1810. Notably, the in-plane retardance introduced by the coating design and/or coating process, is typically larger than the in-plane retardance of the initial seed grating. Conveniently, the materials and layer thicknesses in the thin film stack 1805 typically allows the intermediate segment 1862 to also function as an inner index matching block.

While the undulating layers have been only described with reference to the intermediate segment 1862, in practice, the boundary between the undulated and non-undulated layers is not always clear. In fact, in many instances the entire thin film stack 1850 will be undulated, with the outer-most layer having the most minute undulation magnitude (<<1 nm peak to valley height difference along the coated layer surface). In any case, the in-plane retardance is given by a distributed effect. More specifically, the in-plane retardance contribution is largest close to the seed layer and reduces progressively towards the outer-most coated layer. The contribution is also non-continuous, since there are fractions of coated layer thickness where a change of material index in the transverse plane does not occur.

Conventionally, the liquid crystal cell sub-assembly 1855 also includes alignment layers 1866, which for example are rubbed polymeric, obliquely evaporated inorganic, or photo-aligned organic layers, and a front transparent conductive electrode 1867, which for example is formed from indium tin oxide (ITO). This LCoS display is shown with VAN-model LC alignment at a pre-tilt angle 1868. The associated LC tilt plane is typically not aligned parallel nor perpendicular to the grating vector (though shown parallel in FIG. 55), according to the over-clocking compensation scheme in FIG. 3. Due to the pre-tilt and the use of positive uniaxial LC material in the display, the residual A/–C-plate retardance of the display in the light-off-state is compensated by the integrated trim retarder compensator 1805.

In order to provide for a high yield integrated compensator/display, the coarse azimuthal angle offset between the trim retarder element 1805 and the display element 1855 may be imposed by mechanical rotating the cover substrate in the plane of the device, having considered the nominal in-plane retardance magnitudes of the two retarder elements. Individual fine-tuning of each integrated compensator/display may involve other non-mechanical means, such as voltage-switching the LC tilt angles in the off-stage to further reduce the overall leakage intensity. It is noted that the A-plate grating 1822/1862 and –C-plate grating 1860/1862 elements may be distributed to both surfaces of the cover substrate, provided that the ITO layer is not sufficiently insulated from the LC layer such that a substantial fraction of the applied voltage is available across the LC layer.

Similar to the embodiments described with reference to FIGS. 17, 18, 24, and 37 the full-function A/–C plate grating trim retarders described with reference to FIGS. 48, 49, 54, and 55 are manufactured such that the A-plate grating and –C-plate grating, at least in part, coincide (i.e., take up the same place in space). More specifically, each of these embodiments includes an overlapping segment (e.g., a series of layers) that provides both A-plate and –C-plate functionality. In the embodiments described with reference to FIGS. 17, 18, 24, and 37, the overlapping segment includes the axially-inhomogeneous regions that form the transversely-inhomogeneous grating pedestals. In the embodiments described with reference to FIGS. 48, 49, 54, and 55, the overlapping segment includes the axially-inhomogeneous regions that fill the grooves of the transversely-inhomogeneous seed grating and/or the axially-inhomogeneous regions that contour the seed grating to provide an increased A-plate retardance by creating additional transverse grating elements (i.e., gratlets). For example, with respect to the latter and referring to FIG. 49, the first thin film stack 1605 includes an axially-inhomogeneous element 1650 and a transversely-inhomogeneous element 1610, wherein the two elements coincide in an overlapping segment 1662.

In each of the above embodiments, the full-function A/–C-plate trim retarder is used as a stand-alone optical compensator or is integrated with another optical component (i.e., is incorporated in a cover plate of a reflective LCD panel). Notably, the above embodiments have been provided as examples only, and it will be appreciated by those of ordinary skill in the art that various modifications, alternate configurations, and/or equivalents will be employed without departing from the spirit and scope of the invention. In particular, while the instant invention has been discussed with reference to trim retarders for compensating a VAN-mode LCoS in a projection display, one skilled in the art will appreciate that the instant invention provides a full-function A/−C grating optical retarder is also useful for compensating transmissive or reflective LCD panels employing other LC phases/modes of operation (e.g., vertical-aligned nematic, pi-cell nematic, twisted nematic, in-plane switching nematic, planar-aligned ferroelectric, etc.).

Further, according to another embodiment the full-function grating retarder is incorporated into one or both substrates of a transmissive LCD panel, wherein the orientation of the grating lines is configured by a predetermined amount versus the fast/slow axes of the LCD layer. In an over-clocking match up between the grating retarder sub-assembly and the LCD sub-assembly, the slow axes of both A-plate retarders are not necessarily aligned at orthogonal directions. The A-plate and −C-plate retardance of the grating retarder sub-assembly in the integrated compensator/display is configured by predetermined amounts in such a way that the dark stage of the panel in a cone illumination (either driven electrically or undriven) has the lowest possible light leakage to the projection screen. Alternatively, the grating-based optical retarder is utilized as a stand-alone contrast compensator in a transmissive LCD projector.

While the optical retarder of the instant invention has been described as being incorporated into a liquid crystal cell sub-assembly or used as a stand-alone device in a liquid crystal microdisplay projection system, it is also within the scope of the instant invention to integrate the optical retarder with other optical components. For example, according to other embodiments the optical retarder is part of an optical device having a wire grid, wherein the wire grid provides the diattenuation function and the grating retarder provides the retardation function; the orientations of the diattenuator (polarizer) and the retarder are aligned non-parallel/non-orthogonal. In a typical application, the combined device is an inhomogeneous elliptical polarizer, or more preferably an inhomogeneous circular polarizer.

Furthermore, while the optical retarder of the instant invention has been described with regards to compensating birefringence in liquid crystal display panels, it is also within the scope of the instant invention to use it in other applications. For example, embodiments are envisioned wherein the optical retarder is used in various CD and/or DVD applications (e.g., for polarization control at wavelengths up to 800 nm).

It is further noted that, although the above embodiments have been largely directed at trim retarders incorporating dielectric layers, the instant invention also includes grating optical retarders incorporating other types of layers. For example, a grating retarder design incorporating semiconductor layers would be applicable in infra-red and near infra-red (IR/NIR) wavelength applications wherein the semiconductor is substantially transparent and wherein the aim is to yield a large retardance with relatively shallow surface structures and/or relatively thin repeat layers in the C-plate gratings. Moreover, according to some embodiments, a reflective multiple-layer film incorporating an A-plate and a C-plate grating may be designed and fabricated on a transparent or opaque substrate. Furthermore, yet other embodiments include incorporating one or more thin metal layers in or around the −C-plate grating as an induced transmission filter, to provide UV/IR wavelength cut-off in addition to retardance compensation.

It is also noted that while the in-plane retarder—obtained by applying thin film coatings on a seed-grating—has been described with a periodic modulation and the retarder targeted for a uniform retardance and axis distributions, the A-plate grating pitch may be tailored to vary across the XY coordinate in a prescribed manner and/or the grating vector (as well as grating line direction) be aligned in a spatially varying manner such that a space-variant retarder is obtained. Such device may be useful in shaping the point-spread functions of an optical system or is used in polarimeters.

In each of the above embodiments, the FBAR (including the undulating FBAR) is typically fabricated using one of a variety of deposition techniques that are well know to those skilled in the art. For example, some common deposition techniques include chemical vapor deposition (CVD), plasma enhanced CVD, electron beam evaporation, thermal evaporation, sputtering, and/or atomic layer deposition. Notably, the coatings can be deposited in a conventional sputter chamber.

In each of the above embodiments, the A-plate grating is typically fabricated using one of a variety of deposition and lithographic patterning techniques that are well known to those skilled in the art. According to one embodiment, the A-plate grating is formed by depositing an etch stop layer, which for example is a 10 nm aluminum oxide layer, on the transparent substrate. The etch stop layer, which for example may be coated with one of the above-described deposition techniques, is then coated with one or more dielectric layers, which for example is a 50 nm silicon dioxide layer, intended to form the pedestals. The one or more dielectric layers are then provided with a patterned resist layer, which is formed using one of a variety of lithographic techniques. For example, some common lithographic techniques include nanoimprint lithography, holographic/interference lithography, electron beam lithography, X-ray lithography or photolithography. Once the patterned resist layer is formed, the one or more dielectric layers are etched using one of a variety of etching techniques. For example, some common etching techniques include reactive ion etching, plasma etching, and wet etching. After the etching process is complete the photo resist is removed and the optional cap layer is deposited. Preferably, the cap layer is deposited at an oblique angle such that the cap layer does not substantially fill the grooves. Subsequently, an AR coating, which for example is a quarter-wave layer of $MgF_2$, is deposited on the cap layer.

Alternatively, the A-plate grating is formed without etching. For example, according to one embodiment the one or more dielectric layers intended to form the pedestals are deposited on a substrate coated with a patterned sacrificial layer. By subsequently washing away the sacrificial material, the pedestals emerge.

In embodiments where the in-plane retardance is provided solely by an A-plate grating (e.g., no undulating FBAR), the A-plate grating is optionally formed using fiber-Bragg grating fabrication techniques. In creating a fiber-Bragg grating, UV beams are brought to interfere to create a diffracted pattern that changes the index of the Ge-doped fiber core. When these techniques are used for fabricating a grating trim retarder, a planar substrate, or its coated layers, is doped with suitable material at the surface followed by an exposure to interfering UV beams, to create a transverse grating pattern. Other techniques involve nano-scale imprinting with a master mask, which may or may not involve step-and-repeat processing.

In terms of fabrication processes suitable for creating the seed grating patterns, the above technologies that provide the desire pedestal/groove structure are suitable, for example the interference lithography and nano-scale imprinting techniques. Other techniques involve the oblique evaporation used in creating the LC alignment and anchoring layer and dielectric thin films with columnal structures. For example, the $SiO_x$ alignment layer has nano-grooves and the overall layer thickness is typically less than 10 nm. This may be made into a thickness and a periodicity suitable for use as the seed grating. The generic class of optical device, called structured thin films (STF) is created by evaporation onto a substrate at an oblique flux angle. The columnal structures are porous and an over-coat is typically applied to enhance the film reliability. According to the instant invention, the over-coat can be an FBAR design where the in-plane retardance of the column structured layer is further increased post conventional coating. The grooves of the porous seed grating layer are filled in completely which helps the reliability aspects. Yet other methods of patterning a substrate may involve "stamping" out a spin-coated non-birefringent organic layer on a substrate similar to the compact-disc (CD) replication process, nano-pattern-transfer by applying pressure, etc. The latter is described in more detail in C. H. Chiu et al., "Nanoimprinting-lithography-induced self-aligned liquid crystals for novel multifunctional optical films," Appl. Phys. Lett. 88, 073509 (2006).

The scope of the invention is therefore intended to be limited solely by the scope of the appended claims.

The invention claimed is:

1. An optical retarder comprising:
an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance;
a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and
at least one substrate for supporting the axially-inhomogeneous and the transversely-inhomogeneous elements.

2. An optical retarder according to claim 1, including an overlapping segment wherein the transversely-inhomogeneous element and the axially-inhomogeneous element at least partially coincide, the overlapping segment providing in-plane retardance and negative out-of-plane retardance simultaneously.

3. An optical retarder according to claim 2, wherein the axially-inhomogeneous element is transparent in the wavelength range from 380 nm and 800 nm, and provides an out-of plane retardance in the range of about 0 nm to −1000 nm for any wavelength between 380 nm and 800 nm.

4. An optical retarder according to claim 3, wherein the transversely-inhomogeneous element is transparent in the wavelength range from 380 nm and 800 and provides an in-plane retardance in the range of about 1 nm to 250 nm for any wavelength between 380 nm and 800 nm.

5. An optical retarder according to claim 4, wherein the overlapping segment includes an undulating segment of the axially-inhomogeneous element.

6. An optical retarder according to claim 5, wherein the undulating segment includes a plurality of undulating layers that contour a transversely-inhomogeneous seed grating.

7. An optical retarder according to claim 6, wherein the seed grating has a modulation height between about 5 nm and 200 nm.

8. An optical retarder according to claim 6, wherein the seed grating has duty cycle between about 20% and 80%.

9. An optical retarder according to claim 6, wherein the seed grating provides a first in-plane retardance, the undulating segment provides a second in-plane retardance, and the second in-plane retardance is larger than the first in-plane retardance.

10. An optical retarder according to claim 6, wherein the plurality of undulating layers have a same modulation period, and wherein a modulation height of the plurality of undulating layers decreases progressively with distance from the seed grating.

11. An optical retarder according to claim 4, wherein the overlapping segment includes etched regions of the axially-inhomogeneous element.

12. An optical retarder according to claim 4, wherein the difference between the first and second refractive indices of each of the first and second plurality of layers is greater than about 0.5.

13. An optical retarder according to claim 4, wherein a modulation height of the transversely-inhomogeneous grating is between 10 nm and 3 μm.

14. An optical retarder according to claim 4, wherein each of the first and second plurality of layers includes between 10 and 500 layers.

15. An optical retarder according to claim 4, including at least one anti-reflection coating disposed for reducing reflections at least one of a grating-grating interface, an air-grating interface, a substrate-grating interface, and a substrate-air interface.

16. An optical retarder according to claim 15, wherein the first and second refractive indices and the first and second thicknesses of the first and second plurality of layers are selected to provide an out-of-plane retardance for compensating for a birefringence of a liquid crystal display panel and a birefringence of the at least one anti-reflection coating.

17. An optical retarder according to claim 1, wherein the transversely-inhomogeneous element and the axially-inhomogeneous element each consist of isotropic materials.

18. An optical retarder according to claim 1, wherein the transversely-inhomogeneous element and the axially-inhomogeneous element each consist of dielectric materials.

19. An optical retarder according to claim 1, wherein the transversely-inhomogeneous element, the axially-inhomogeneous element, and the at least one substrate form an all inorganic dielectric trim retarder for compensating for residual birefringence of a liquid crystal display panel.

20. An optical retarder according to claim 1, wherein the first and second plurality of layers of the axially-inhomogeneous element, and the first and second plurality of regions of the transversely-inhomogeneous element, are selected for improving system contrast in a polarization-based microdisplay projection system.

21. An optical retarder according to claim 1, wherein the axially-inhomogeneous element is a form birefringent thin film anti-reflection element.

22. An optical retarder according to claim 21, wherein the at least one substrate includes a substantially transparent substrate, and wherein the form birefringent thin film anti-reflection element is disposed on a first side of the substantially transparent substrate and the transversely-inhomogeneous element is disposed on a second opposite side of the substantially transparent substrate.

23. An optical retarder according to claim 21, wherein the at least one substrate includes a substantially transparent substrate, and wherein the form birefringent thin film anti-reflection element and the transversely-inhomogeneous element are disposed on a same side of the substantially transparent substrate with the form birefringent thin film anti-reflection element disposed between the transversely-inhomogeneous element and the substantially transparent substrate.

24. An optical retarder according to claim 21, wherein the at least one substrate includes a substantially transparent substrate, and wherein the form birefringent thin film anti-reflection element and the transversely-inhomogeneous element are disposed on a same side of the substantially transparent substrate with the transversely-inhomogeneous element disposed between the form birefringent thin film anti-reflection element and the substantially transparent substrate.

25. An optical retarder according to claim 21, wherein the at least one substrate includes a substantially transparent substrate, and wherein the form birefringent thin film anti-reflection element and the transversely-inhomogeneous element are disposed on a first side of the substantially transparent substrate and an anti-reflection coating is disposed on a second opposite side of the substantially transparent substrate.

26. An optical retarder according to claim 21, wherein the at least one substrate includes a substantially transparent substrate, and wherein the form birefringent thin film anti-reflection element and the transversely-inhomogeneous element are disposed on a first side of the substantially transparent substrate and a second form-birefringent thin film anti-reflection element is disposed on a second opposite side of the substantially transparent substrate.

27. An optical retarder according to claim 21, wherein the transversely-inhomogeneous element includes etched regions of the form birefringent thin film anti-reflection element.

28. An optical retarder according to claim 25, wherein the transversely-inhomogeneous element includes etched regions of the form birefringent thin film anti-reflection element.

29. An optical retarder according to claim 26, wherein the transversely-inhomogeneous element includes etched regions of the form birefringent thin film anti-reflection element.

30. An optical retarder according to claim 21, wherein the at least one substrate includes a first substrate coupled to the transversely-inhomogeneous element, and a second substrate coupled to the axially-inhomogeneous element, and wherein the first and second substrates are laminated together.

31. An optical retarder according to claim 21, wherein the at least one substrate is a cover-substrate in a liquid-crystal display panel.

32. An optical retarder according to claim 27, wherein the at least one substrate is a cover-substrate in a liquid-crystal display panel.

33. An optical retarder according to claim 21, wherein the transversely-inhomogeneous element includes a textured surface, and wherein the form birefringent thin film anti-reflection element includes a plurality of thin film layers that substantially contour a periodic modulation of the textured surface.

34. An optical retarder according to claim 25, wherein the transversely-inhomogeneous element includes a textured surface disposed the first side of the substantially transparent substrate, and wherein the form birefringent thin film anti-reflection element includes a plurality of thin film layers that substantially contour a periodic modulation of the textured surface.

35. An optical retarder according to claim 26, wherein the transversely-inhomogeneous element includes a textured surface disposed the first side of the substantially transparent substrate, and wherein the form birefringent thin film anti-reflection element includes a plurality of thin film layers that substantially contour a periodic modulation of the textured surface.

36. An optical retarder according to claim 35, wherein the second form-birefringent thin film anti-reflection element is disposed on a second textured surface on the second opposite side of the substantially transparent substrate, and wherein the second form birefringent thin film anti-reflection element includes a plurality of thin film layers that substantially contour a periodic modulation of the second textured surface.

37. An optical retarder according to claim 33, wherein the at least one substrate is a cover-substrate in a liquid-crystal display panel.

38. An optical retarder according to claim 21, wherein the form birefringent thin film anti-reflection element and the transversely-inhomogeneous element are non-overlapping.

39. An optical retarder according to claim 38, wherein the transversely-inhomogeneous element includes at least one of a capping layer, an antireflection coating, and an etch-stop layer spanning the grating structure.

40. An optical retarder according to claim 39, wherein each of the first plurality of regions and the second plurality of regions include an inorganic dielectric material.

41. A method of using an optical retarder to improve system contrast in a liquid crystal display based projection system, the method comprising:
positioning the optical retarder in the projection system such that residual retardance of a liquid crystal display panel in the projection system is substantially compensated for, the optical retarder comprising:
an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance;
a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and
at least one substrate for supporting the axially-inhomogeneous and the transversely-inhomogeneous elements.

42. A liquid crystal display based projection system comprising:
a light source;
a first polarizer for receiving light from the light source and transmitting a first linearly polarized light having a first linear polarization axis;
a liquid crystal display panel for optically modulating the first linearly polarized light, the liquid crystal display panel having residual birefringence;

a second polarizer for receiving the optically modulated light and for transmitting a second linearly polarized light having a second linear polarization axis;

a projection lens for projecting the second linearly polarized light onto a screen; and an optical retarder for compensating for the residual birefringence of the liquid crystal display panel, the optical retarder comprising:

an axially-inhomogeneous element including a first plurality of layers having a first refractive index and a first thickness and a second plurality of layers having a second refractive index and a second thickness, the first plurality of layers interleaved with the second plurality of layers, the first and second thicknesses and the first and second refractive indices selected to form a zeroth order sub-wavelength grating structure that provides negative out-of plane retardance;

a transversely-inhomogeneous element including a first plurality of regions having a first refractive index and a first width and a second plurality of regions having a second refractive index and a second width, the first plurality of regions interleaved with the second plurality of regions, the first and second widths and the first and second refractive indices selected to form a zeroth order sub-wavelength grating structure that provides in-plane retardance; and at least one substrate for supporting the axially-inhomogeneous and the transversely-inhomogeneous elements.

43. The liquid crystal display based projection system according to claim 42, wherein the axially-inhomogeneous element is a −C-plate grating element having an out-of-plane retardance of between 0 nm and −1000 nm in a wavelength range between 380 nm and 800 nm for compensating for the out-of-plane residual birefringence of the liquid crystal display panel.

44. The liquid crystal display based projection system according to claim 43, wherein the transversely-inhomogeneous element is an A-plate grating element having in-plane retardance of between 1 nm and 250 nm in a wavelength range between 380 nm to 800 nm for compensating for the in-plane residual birefringence of the liquid crystal display panel.

45. The liquid crystal display based projection system according to claim 42, wherein the optical retarder is a grating trim retarder integrated with the liquid crystal display panel.

46. The liquid crystal display based projection system according to claim 42, wherein the liquid crystal display panel is a VAN-mode LCoS microdisplay panel, and wherein the first and second polarizers are a same polarization beam splitter.

* * * * *